(12) United States Patent
Mukerjee

(10) Patent No.: US 7,590,179 B2
(45) Date of Patent: Sep. 15, 2009

(54) BITPLANE CODING OF PREDICTION MODE INFORMATION IN BI-DIRECTIONALLY PREDICTED INTERLACED PICTURES

(75) Inventor: Kunal Mukerjee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 714 days.

(21) Appl. No.: 10/942,458

(22) Filed: Sep. 15, 2004

(65) Prior Publication Data

US 2005/0053300 A1    Mar. 10, 2005

Related U.S. Application Data

(62) Division of application No. 10/882,135, filed on Jun. 29, 2004.

(60) Provisional application No. 60/501,081, filed on Sep. 7, 2003.

(51) Int. Cl.
*H04N 7/36* (2006.01)
*H04N 7/50* (2006.01)

(52) U.S. Cl. .................. 375/240.15; 375/240.12; 375/240.13; 375/240.14

(58) Field of Classification Search ............... 375/240, 375/240.1, 240.12–240.16
See application file for complete search history.

(56) References Cited

U.S. PATENT DOCUMENTS

| | | | |
|---|---|---|---|
| 4,661,849 A | 4/1987 | Hinman | |
| 4,661,853 A | 4/1987 | Roeder et al. | |
| 4,695,882 A | 9/1987 | Wada et al. | |
| 4,796,087 A | 1/1989 | Guichard et al. | |
| 4,862,267 A | 8/1989 | Gillard et al. | |
| 4,864,393 A | 9/1989 | Harradine et al. | |
| 5,021,879 A | 6/1991 | Vogel | |
| 5,068,724 A | 11/1991 | Krause et al. | |
| 5,089,889 A | 2/1992 | Sugiyama | |
| 5,103,306 A | 4/1992 | Weiman et al. | |
| 5,111,292 A | 5/1992 | Kuriacose et al. | |
| 5,132,792 A | 7/1992 | Yonemitsu et al. | |
| 5,157,490 A | 10/1992 | Kawai et al. | |
| 5,175,618 A | 12/1992 | Ueda | |

(Continued)

FOREIGN PATENT DOCUMENTS

EP    0 279 053    8/1988

(Continued)

OTHER PUBLICATIONS

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

(Continued)

*Primary Examiner*—Mehrdad Dastouri
*Assistant Examiner*—David N. Werner
(74) *Attorney, Agent, or Firm*—Klarquist Sparkman, LLP

(57) ABSTRACT

An encoder sends binary information indicating whether a prediction mode is forward or not-forward for one or more macroblocks in an interlaced B-field. For example, the encoder sends forward/not-forward decision information at B-field level in a compressed bitplane. Sending forward/not-forward prediction mode decision information in a compressed bitplane at B-field level can reduce coding overhead for prediction mode coding. A decoder performs corresponding decoding.

19 Claims, 72 Drawing Sheets

U.S. PATENT DOCUMENTS

| | | |
|---|---|---|
| 5,185,819 A | 2/1993 | Ng et al. |
| 5,193,004 A | 3/1993 | Wang et al. |
| 5,212,549 A | 5/1993 | Ng et al. |
| 5,223,949 A | 6/1993 | Honjo |
| 5,227,878 A * | 7/1993 | Puri et al. ............... 375/240.15 |
| 5,235,618 A | 8/1993 | Sakai et al. |
| 5,260,782 A | 11/1993 | Hui |
| 5,287,420 A | 2/1994 | Barrett |
| 5,298,991 A | 3/1994 | Yagasaki et al. |
| 5,317,397 A | 5/1994 | Odaka et al. |
| 5,335,299 A | 8/1994 | Atkinson |
| 5,343,248 A | 8/1994 | Fujinami |
| 5,347,308 A | 9/1994 | Wai |
| 5,400,075 A | 3/1995 | Savatier |
| 5,412,430 A | 5/1995 | Nagata |
| 5,412,435 A | 5/1995 | Nakajima |
| RE34,965 E | 6/1995 | Sugiyama |
| 5,424,779 A | 6/1995 | Odaka |
| 5,426,464 A | 6/1995 | Casavant et al. |
| 5,428,396 A | 6/1995 | Yagasaki |
| 5,442,400 A | 8/1995 | Sun |
| 5,453,799 A | 9/1995 | Yang et al. |
| 5,461,421 A | 10/1995 | Moon |
| RE35,093 E | 11/1995 | Wang et al. |
| 5,467,134 A | 11/1995 | Laney et al. |
| 5,467,136 A | 11/1995 | Odaka |
| 5,477,272 A | 12/1995 | Zhang et al. |
| RE35,158 E | 2/1996 | Sugiyama |
| 5,491,523 A | 2/1996 | Sato |
| 5,510,840 A | 4/1996 | Yonemitsu et al. |
| 5,565,922 A | 10/1996 | Krause |
| 5,579,430 A | 11/1996 | Grill et al. |
| 5,586,200 A | 12/1996 | Devaney et al. |
| 5,594,504 A | 1/1997 | Ebrahimi |
| 5,598,215 A | 1/1997 | Watanabe |
| 5,598,216 A | 1/1997 | Lee |
| 5,617,144 A | 4/1997 | Lee |
| 5,619,281 A | 4/1997 | Jung |
| 5,621,481 A | 4/1997 | Yasuda et al. |
| 5,623,311 A | 4/1997 | Phillips et al. |
| 5,648,819 A | 7/1997 | Tranchard |
| 5,677,735 A | 10/1997 | Ueno et al. |
| 5,687,097 A | 11/1997 | Mizusawa et al. |
| 5,691,771 A | 11/1997 | Oishi et al. |
| 5,699,476 A | 12/1997 | Van Der Meer |
| 5,701,164 A | 12/1997 | Kato |
| 5,717,441 A | 2/1998 | Serizawa et al. |
| 5,731,850 A | 3/1998 | Maturi et al. |
| 5,748,784 A | 5/1998 | Sugiyama |
| 5,764,807 A | 6/1998 | Pearlman |
| 5,767,898 A | 6/1998 | Urano et al. |
| 5,786,860 A | 7/1998 | Kim et al. |
| 5,787,203 A | 7/1998 | Lee et al. |
| 5,796,438 A | 8/1998 | Hosono |
| 5,798,788 A | 8/1998 | Meehan et al. |
| RE35,910 E | 9/1998 | Nagata et al. |
| 5,819,215 A | 10/1998 | Dobson et al. |
| 5,822,541 A | 10/1998 | Nonomura et al. |
| 5,825,310 A | 10/1998 | Tsutsui |
| 5,835,144 A | 11/1998 | Matsumura et al. |
| 5,835,146 A | 11/1998 | Stone |
| 5,835,149 A | 11/1998 | Astle |
| 5,844,613 A | 12/1998 | Chaddha |
| 5,845,243 A | 12/1998 | Smart et al. |
| 5,847,776 A | 12/1998 | Khmelnitsky |
| 5,859,668 A | 1/1999 | Aono et al. |
| 5,901,248 A | 5/1999 | Fandrianto et al. |
| 5,923,375 A | 7/1999 | Pau |
| 5,926,226 A | 7/1999 | Proctor et al. |
| 5,926,573 A | 7/1999 | Kim et al. |
| 5,929,940 A | 7/1999 | Jeannin |
| 5,946,042 A | 8/1999 | Kato |
| 5,949,489 A | 9/1999 | Nishikawa et al. |
| 5,959,673 A | 9/1999 | Lee et al. |
| 5,963,258 A | 10/1999 | Nishikawa et al. |
| 5,963,673 A | 10/1999 | Kodama et al. |
| 5,970,175 A | 10/1999 | Nishikawa et al. |
| 5,973,743 A | 10/1999 | Han |
| 5,973,755 A | 10/1999 | Gabriel |
| 5,974,184 A | 10/1999 | Eifrig |
| 5,982,438 A | 11/1999 | Lin et al. |
| 5,990,960 A | 11/1999 | Murakami et al. |
| 5,991,447 A * | 11/1999 | Eifrig et al. ................. 382/236 |
| 6,002,439 A | 12/1999 | Murakami et al. |
| 6,005,980 A | 12/1999 | Eifrig et al. |
| RE36,507 E | 1/2000 | Iu |
| 6,011,596 A | 1/2000 | Burl |
| 6,026,195 A | 2/2000 | Eifrig et al. |
| 6,040,863 A | 3/2000 | Kato |
| 6,055,012 A | 4/2000 | Haskell et al. |
| 6,067,322 A | 5/2000 | Wang |
| 6,078,618 A | 6/2000 | Yokoyama et al. |
| 6,081,209 A | 6/2000 | Schuyler et al. |
| 6,094,225 A | 7/2000 | Han |
| RE36,822 E | 8/2000 | Sugiyama |
| 6,097,759 A | 8/2000 | Murakami et al. |
| 6,115,689 A | 9/2000 | Malvar |
| 6,122,318 A | 9/2000 | Yamaguchi et al. |
| 6,130,963 A | 10/2000 | Uz et al. |
| 6,148,109 A | 11/2000 | Boon et al. |
| 6,167,090 A | 12/2000 | Iizuka |
| 6,175,592 B1 | 1/2001 | Kim et al. |
| 6,188,725 B1 | 2/2001 | Sugiyama |
| 6,188,794 B1 | 2/2001 | Nishikawa et al. |
| 6,192,081 B1 | 2/2001 | Chiang et al. |
| 6,201,927 B1 | 3/2001 | Comer |
| 6,205,176 B1 | 3/2001 | Sugiyama |
| 6,226,407 B1 | 5/2001 | Zabih et al. |
| 6,236,806 B1 | 5/2001 | Kojima et al. |
| 6,240,380 B1 | 5/2001 | Malvar |
| RE37,222 E | 6/2001 | Yonemitsu et al. |
| 6,243,418 B1 | 6/2001 | Kim |
| 6,243,497 B1 | 6/2001 | Chiang et al. |
| 6,256,345 B1 * | 7/2001 | Cho ....................... 375/240.08 |
| 6,263,024 B1 | 7/2001 | Matsumoto |
| 6,263,065 B1 | 7/2001 | Durinovic-Johri et al. |
| 6,271,885 B2 | 8/2001 | Sugiyama |
| 6,275,528 B1 | 8/2001 | Isozaki et al. |
| 6,282,243 B1 | 8/2001 | Kazui et al. |
| 6,292,585 B1 | 9/2001 | Yamaguchi et al. |
| 6,295,376 B1 | 9/2001 | Nakaya |
| 6,304,928 B1 | 10/2001 | Mairs et al. |
| 6,307,887 B1 | 10/2001 | Gabriel |
| 6,307,973 B2 | 10/2001 | Nishikawa et al. |
| 6,320,593 B1 | 11/2001 | Sobel et al. |
| 6,324,216 B1 | 11/2001 | Igarashi et al. |
| 6,332,003 B1 | 12/2001 | Matsuura |
| 6,351,563 B1 | 2/2002 | Kim et al. |
| 6,377,628 B1 | 4/2002 | Schultz et al. |
| 6,381,275 B1 * | 4/2002 | Fukuhara et al. ........ 375/240.06 |
| 6,385,345 B1 | 5/2002 | Ribas-Corbera et al. |
| 6,393,059 B1 | 5/2002 | Sugiyama |
| 6,404,813 B1 | 6/2002 | Haskell et al. |
| 6,421,383 B2 | 7/2002 | Beattie |
| 6,421,738 B1 | 7/2002 | Ratan et al. |
| 6,442,204 B1 | 8/2002 | Snook et al. |
| 6,473,409 B1 | 10/2002 | Malvar |
| 6,496,601 B1 | 12/2002 | Migdal et al. |
| 6,519,287 B1 | 2/2003 | Hawkins et al. |
| 6,522,693 B1 | 2/2003 | Lu et al. |
| 6,529,632 B1 | 3/2003 | Nakaya et al. |
| 6,539,056 B1 | 3/2003 | Sato et al. |
| 6,563,953 B2 | 5/2003 | Lin et al. |
| 6,573,905 B1 | 6/2003 | MacInnis et al. |

| | | |
|---|---|---|
| 6,614,442 B1 | 9/2003 | Ouyang et al. |
| 6,636,565 B1 | 10/2003 | Kim |
| 6,647,061 B1 | 11/2003 | Panusopone et al. |
| 6,650,781 B2 | 11/2003 | Nakaya |
| 6,654,419 B1 | 11/2003 | Sriram et al. |
| 6,654,420 B1* | 11/2003 | Snook .................. 375/240.16 |
| 6,683,987 B1 | 1/2004 | Sugahara |
| 6,704,360 B2 | 3/2004 | Haskell et al. |
| 6,728,317 B1 | 4/2004 | Demos |
| 6,735,345 B2 | 5/2004 | Lin et al. |
| 6,778,606 B2 | 8/2004 | Kang et al. |
| 6,785,331 B1 | 8/2004 | Jozawa et al. |
| 6,798,364 B2 | 9/2004 | Chen et al. |
| 6,810,083 B2 | 10/2004 | Chen et al. |
| 6,819,714 B2 | 11/2004 | Yamada et al. |
| 6,862,402 B2 | 3/2005 | Kim |
| 6,873,657 B2 | 3/2005 | Yang et al. |
| 6,920,175 B2 | 7/2005 | Karczewicz et al. |
| 6,975,680 B2 | 12/2005 | Demos |
| 6,980,596 B2 | 12/2005 | Wang et al. |
| 6,999,513 B2 | 2/2006 | Sohn et al. |
| 7,003,035 B2 | 2/2006 | Tourapis et al. |
| 7,020,200 B2 | 3/2006 | Winger |
| 7,054,494 B2 | 5/2006 | Lin et al. |
| 7,092,576 B2* | 8/2006 | Srinivasan et al. .......... 382/238 |
| 7,154,952 B2 | 12/2006 | Tourapis et al. |
| 7,233,621 B2 | 6/2007 | Jeon |
| 7,317,839 B2 | 1/2008 | Holcomb |
| 7,362,807 B2 | 4/2008 | Kondo et al. |
| 7,453,941 B1 | 11/2008 | Yamori et al. |
| 2001/0019586 A1 | 9/2001 | Kang et al. |
| 2001/0040926 A1 | 11/2001 | Hannuksela et al. |
| 2002/0012394 A1 | 1/2002 | Hatano et al. |
| 2002/0105596 A1 | 8/2002 | Selby |
| 2002/0114388 A1 | 8/2002 | Ueda et al. |
| 2002/0154693 A1 | 10/2002 | Demos |
| 2002/0168066 A1 | 11/2002 | Li |
| 2002/0186890 A1 | 12/2002 | Lee et al. |
| 2003/0053537 A1 | 3/2003 | Kim et al. |
| 2003/0099294 A1 | 5/2003 | Wang et al. |
| 2003/0110236 A1 | 6/2003 | Yang et al. |
| 2003/0113026 A1 | 6/2003 | Srinivasan et al. |
| 2003/0142748 A1 | 7/2003 | Tourapis |
| 2003/0142751 A1 | 7/2003 | Hannuksela |
| 2003/0161402 A1 | 8/2003 | Horowitz |
| 2003/0179826 A1* | 9/2003 | Jeon ...................... 375/240.15 |
| 2003/0206589 A1 | 11/2003 | Jeon |
| 2004/0001546 A1 | 1/2004 | Tourapis et al. |
| 2004/0008899 A1 | 1/2004 | Tourapis et al. |
| 2004/0042549 A1 | 3/2004 | Huang et al. |
| 2004/0047418 A1 | 3/2004 | Tourapis et al. |
| 2004/0136457 A1 | 7/2004 | Funnell et al. |
| 2004/0139462 A1 | 7/2004 | Hannuksela et al. |
| 2004/0141651 A1 | 7/2004 | Hara et al. |
| 2004/0146109 A1 | 7/2004 | Kondo et al. |
| 2005/0013497 A1 | 1/2005 | Hsu et al. |
| 2005/0013498 A1 | 1/2005 | Srinivasan et al. |
| 2005/0036759 A1 | 2/2005 | Lin et al. |
| 2005/0053137 A1 | 3/2005 | Holcomb |
| 2005/0053146 A1 | 3/2005 | Mukerjee |
| 2005/0053147 A1 | 3/2005 | Mukerjee et al. |
| 2005/0053149 A1 | 3/2005 | Mukerjee et al. |
| 2005/0053156 A1 | 3/2005 | Lin et al. |
| 2005/0053292 A1 | 3/2005 | Mukerjee et al. |
| 2005/0053297 A1 | 3/2005 | Mukerjee et al. |
| 2005/0053298 A1 | 3/2005 | Mukerjee et al. |
| 2005/0084166 A1 | 4/2005 | Boneh et al. |
| 2005/0097614 A1* | 5/2005 | Pedlow et al. ................. 725/90 |
| 2005/0117642 A1* | 6/2005 | Abe et al. ............. 375/240.12 |
| 2005/0129120 A1 | 6/2005 | Jeon |
| 2005/0135484 A1 | 6/2005 | Lee |
| 2005/0152452 A1* | 7/2005 | Suzuki .................. 375/240.16 |
| 2005/0157797 A1* | 7/2005 | Gaedke ................. 375/240.24 |
| 2005/0254584 A1 | 11/2005 | Kim et al. |
| 2006/0013307 A1 | 1/2006 | Olivier et al. |
| 2006/0072662 A1 | 4/2006 | Tourapis et al. |
| 2006/0280253 A1 | 12/2006 | Tourapis et al. |
| 2007/0064801 A1 | 3/2007 | Wang et al. |

FOREIGN PATENT DOCUMENTS

| | | |
|---|---|---|
| EP | 0 397 402 | 11/1990 |
| EP | 0 526 163 | 2/1993 |
| EP | 0 535 746 | 4/1993 |
| EP | 0 540 350 | 5/1993 |
| EP | 0 588 653 | 3/1994 |
| EP | 0 614 318 | 9/1994 |
| EP | 0 625 853 | 11/1994 |
| EP | 0 771 114 | 5/1997 |
| EP | 0 782 343 | 7/1997 |
| EP | 0 786 907 | 7/1997 |
| EP | 0 830 029 | 3/1998 |
| EP | 0 863 673 A1 | 9/1998 |
| EP | 0 863 674 | 9/1998 |
| EP | 0 863 675 | 9/1998 |
| EP | 0 884 912 | 12/1998 |
| EP | 0 901 289 | 3/1999 |
| EP | 0 944 245 | 9/1999 |
| EP | 1 006 732 | 7/2000 |
| EP | 1085763 A2 * | 3/2001 |
| GB | 2328337 | 2/1999 |
| GB | 2332115 | 6/1999 |
| GB | 2343579 | 5/2000 |
| JP | 62 213 494 | 9/1987 |
| JP | 2562499 | 1/1991 |
| JP | 3 129 986 | 3/1991 |
| JP | 03-238970 | 10/1991 |
| JP | 6 078 298 | 3/1994 |
| JP | 6-078295 | 3/1994 |
| JP | 06-225279 | 8/1994 |
| JP | 06-276481 | 9/1994 |
| JP | 06-276511 | 9/1994 |
| JP | 6-292188 | 10/1994 |
| JP | 07-135660 | 5/1995 |
| JP | 7-274171 | 10/1995 |
| JP | 08-140099 | 5/1996 |
| JP | 09-055936 | 2/1997 |
| JP | 09-322163 | 12/1997 |
| JP | 11 136683 | 12/1997 |
| JP | 10 056 644 | 2/1998 |
| JP | 2000-270332 | 9/2000 |
| JP | 2000-287177 | 10/2000 |
| JP | 2002-152752 | 5/2002 |
| KR | 1003538510000 | 1/2002 |
| RU | 2182727 C2 | 5/2002 |
| WO | WO 9803018 A2 * | 1/1998 |
| WO | WO 00/33581 | 8/2000 |
| WO | WO 0262074 A1 * | 8/2002 |
| WO | WO 03/026296 | 3/2003 |
| WO | WO 2005/004491 | 1/2005 |

OTHER PUBLICATIONS

Mook, "Next-Gen Windows Media Player Leaks to the Web," *BetaNews*, 17 pp. (Jul. 19, 2002) [Downloaded from the World Wide Web on Aug. 8, 2003].

ITU-T, "ITU-T Recommendation H.261: Video Codec for Audiovisual Services at $p \times 64$ kbits," 28 pp. (1993).

ITU-T, "ITU-T Recommendation H.262: Information Technology—Generic Coding of Moving Pictures and Associated Audio Information: Video1," 218 pp. (1995).

ITU-T, "ITU-T Recommendation H.263: Video Coding for Low Bit Rate Communication," 167 pp. (1998).

ISO/IEC, "ISO/IEC 11172-2: Information Technology—Coding of Moving Pictures and Associated Audio for Storage Media at up to About 1,5 Mbit/s," 122 pp. (1993).

ISO/IEC, "Information Technology—Coding of Audio-Visual Objects: Visual, ISO/IEC 14496-2, Committee Draft," 330 pp. (1998).

U.S. Appl. No. 60/341,674, filed Dec. 17, 2001, Lee et al.

U.S. Appl. No. 60/488,710, filed Jul. 18, 2003, Srinivasan et al.

Joint Video Team of ISO/IEC MPEG and ITU-T VCEG, "Final Joint Committee Draft of Joint Video Specification (ITU-T Recommendation H.264, ISO/IEC 14496-10 AVC," 206 pp. (Aug. 2002).

Reader, "History of MPEG Video Compression—Ver. 4.0," 99 pp., document marked Dec. 16, 2003.

Sjoberg et al., "Run-length Coding of Skipped Macroblocks," ITU-T SG16/Q.6 VCEG-M57, pp. 1-5 (Apr. 2001).

Printouts of FTP directories from http://ftp3.itu.ch , 8 pp. (downloaded from the World Wide Web on September 20, 2005.).

Wu et al., "Joint estimation of forward and backward motion vectors for interpolative prediction of video," *IEEE Transactions on Image Processing* 3(5):684-687 (Sep. 1994).

Chalidabhongse et al., "Fast motion vector estimation using multiresolution spatio-temporal correlations," IEEE Transactions on Circuits and Systems for Video Technology, pp. 477-488 (Jun. 1997).

ISO, "MPEG-4 Video Verification Model Version 18.0," ISO/IEC JTC1/SC29/WG11 N3908, Pisa, pp. 1-10,299-311 (Jan. 2001).

ISO/IEC, "MPEG-4 Video Verification Model Version 10.0," ISO/IEC JTC1/SC29/WG11, MPEG98/N1992, 306 pp. (1998).

ITU-T Recommendation T.6: Facsimile Coding Schemes and Coding Control Functions for Group 4 Facsimile Apparatus, Facicle VII.3 of the Blue Book (1988).

ITU—Q15-F-24, "MVC Video Codec—Proposal for H.26L," Study Group 16, Video Coding Experts Group (Question 15), 28 pp. (document marked as generated in 1998).

Joint Video Team (JVT) of ISO/IEC MPEG and ITU-T VCEG, "Joint Model No. 1, Revision 1 (JM-1r1)," JVT-A003r1, Pattaya, Thailand, 80 pp. (Dec. 2001).

Joint Video Team (JVT) of ISO/IEC MPEG and ITU-T VCEG, "Study of Final Committee Draft of Joint Video Specification," JVT-F100, Awaji Island, 242 pp. (Dec. 2002).

Kossentini et al., "Predictive RD Optimized Motion Estimation for Very Low Bit-rate Video Coding," IEEE J. on Selected Areas in Communications, vol. 15, No. 9 pp. 1752-1763 (Dec. 1997).

Lainema et al., "Skip Mode Motion Compensation," Joint Video Team (JVT) of ISO/IEC MPEG & ITU-T VCEG (ISO/IEC JTC1/SC29/WG11 and ITU-T SG16 Q.6), Document JVT-C027, 8 pp. (May 2002).

Panusopone et al., "Direct Prediction for Predictive (P) Picture in Field Coding mode," Joint Video Team (JVT) of ISO/IEC MPEG & ITU-T VCEG, Document JVT-D046, 8 pp. (Jul. 2002).

Schwarz et al., "Tree-structured macroblock partition," ITU-T SG16/Q.6 VCEG-O17, 6 pp. (Dec. 2001).

Schwarz et al., "Core Experiment Results On Improved Macroblock Prediction Modes," Joint Video Team (JVT) of ISO/IEC MPEG & ITU-T VCEG (ISO/IEC JTC1/SC29/WG11 and ITU-T SG16 Q.6), Document JVT-B054, 10 pp. (Jan.-Feb. 2002).

Sullivan et al., "The H.264/AVC Advanced Video Coding Standard: Overview and Introduction to the Fidelity Range Extensions," 21 pp. (Aug. 2004).

"The TML Project WEB-Page and Archive," (including pages of code marked "image.cpp for H.26L decoder, Copyright 1999" and "image.c"), 24 pp.

Tourapis et al., "Direct Prediction for Predictive (P) and Bidirectionally Predictive (B) frames in Video Coding ," Joint Video Team (JVT) of ISO/IEC MPEG & ITU-T VCEG (ISO/IEC JTC1/SC29/WG11 and ITU-T SG16 Q.6), Document JVT-C128, 11 pp. (May 2002).

Tourapis et al., "Motion Vector Prediction in Bidirectionally Predictive (B) frames with regards to Direct Mode," Joint Video Team (JVT) of ISO/IEC MPEG & ITU-T VCEG (ISO/IEC JTC1/SC29/WG11 and ITU-T SG16 Q.6), Document JVT-C127, 7 pp. (May 2002).

Tourapis et al., "Timestamp Independent Motion Vector Prediction for P and B frames with Division Elimination," Joint Video Team (JVT) of ISO/IEC MPEG & ITU-T VCEG (ISO/IEC JTC1/SC29/WG11 and ITU-T SG16 Q.6), Document JVT-D040, 18 pp. (Jul. 2002).

Tourapis et al., "Performance Comparison of Temporal and Spatial Direct mode," Joint Video Team (JVT) of ISO/IEC MPEG & ITU-T VCEG (ISO/IEC JTC1/SC29/WG11 and ITU-T SG16 Q.6), Document JVT-E026, 7 pp. (Oct. 2002).

Wang et al., "Interlace Coding Tools for H.26L Video Coding," ITU-T SG16/Q.6 VCEG-O37, pp. 1-20 (Dec. 2001).

Wiegand et al., "Long-term Memory Motion Compensated Prediction," IEEE Transactions on Circuits & Systems for Video Technology, vol. 9, No. 1, pp. 70-84 (Feb. 1999).

Wien, "Variable Block-Size Transforms for Hybrid Video Coding," Dissertation, 182 pp. (Feb. 2004).

Vetro et al., "An Overview of MPEG-4 Object-Based Encoding Algorithms," IEEE 2001 Int'l Symp. on Information Tech. (ITTC 2001), Las Vegas, NV, pp. 366-369 (2001).

Joint Video Team of ISO/IEC MPEG and ITU-T VCEG, "Text of Committee Draft of Joint Video Specification (ITU-T Rec. H.264, ISO/IEC 14496-10 AVC)," Document JVT-C167, 142 pp. (May 2002).

Lainema et al., "Skip Mode Motion Compensation," Joint Video Team (JVT) of ISO/IEC MPEG & ITU-T VCEG (ISO/IEC JTC1/SC29/WG11 and ITU-T SG16 Q.6), Document JVT-C027, 8 pp. (May 2002).

Wiegand et al., "Motion-compensating Long-term Memory Prediction," Proc. Int'l Conf. on Image Processing, 4 pp. (Oct. 1997).

Wien, "Variable Block-Size Transforms for Hybrid Video Coding," Dissertation, 182 pp. (Feb. 2004).

Zhu, "RTP Payload Format for H.263 Video Streams," *IETF Request for Comments 2190*, 12 pp. (Sep. 1997.).

Hsu et al., "A Low Bit-Rate Video Codec Based on Two-Dimensional Mesh Motion Compensation with Adaptive Interpolation," *IEEE Transactions on Circuits and Systems for Video Technology*, vol. 11, No. 1, pp. 111-117 (Jan. 2001).

Tourapis et al., "Predictive Motion Vector Field Adaptive Search Technique (PMVFAST)—Enhancing Block Based Motion Estimation," *Proc. Visual Communications and Image Processing*, 10 pp. (Jan. 2001).

International Search Report dated Sep. 22, 2008, from International Application No. PCT/US04/29000.

Borgwardt, "Core Experiment on Interlaced Video Coding," ITU Study Group 16 Question 16, VCEG-N85, 10 pp. (Oct. 2001).

Written Opinion dated Sep. 22, 2008, from International Application No. PCT/US04/29000, 15 pp.

\* cited by examiner

Figure 1, prior art
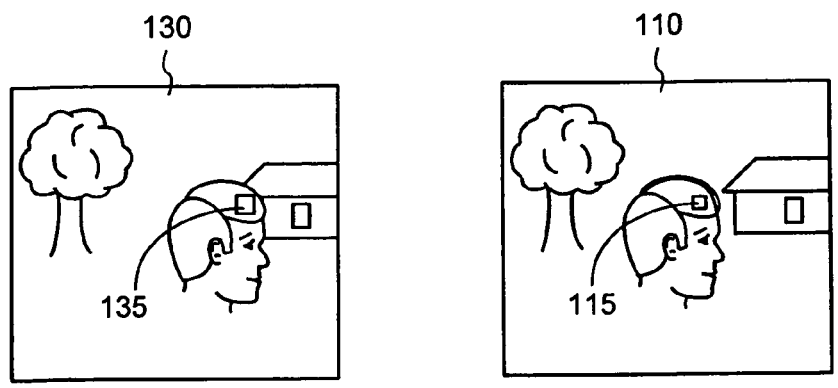
Figure 4, prior art
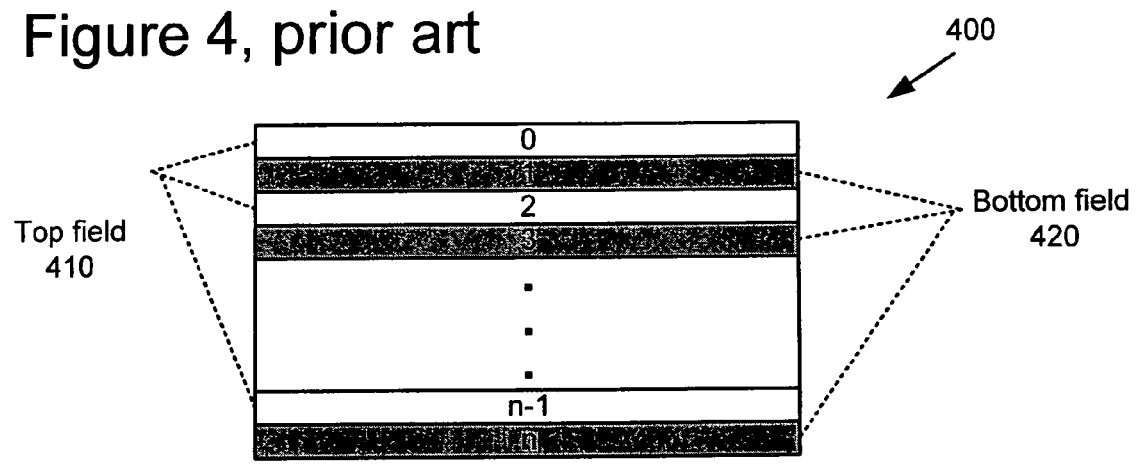

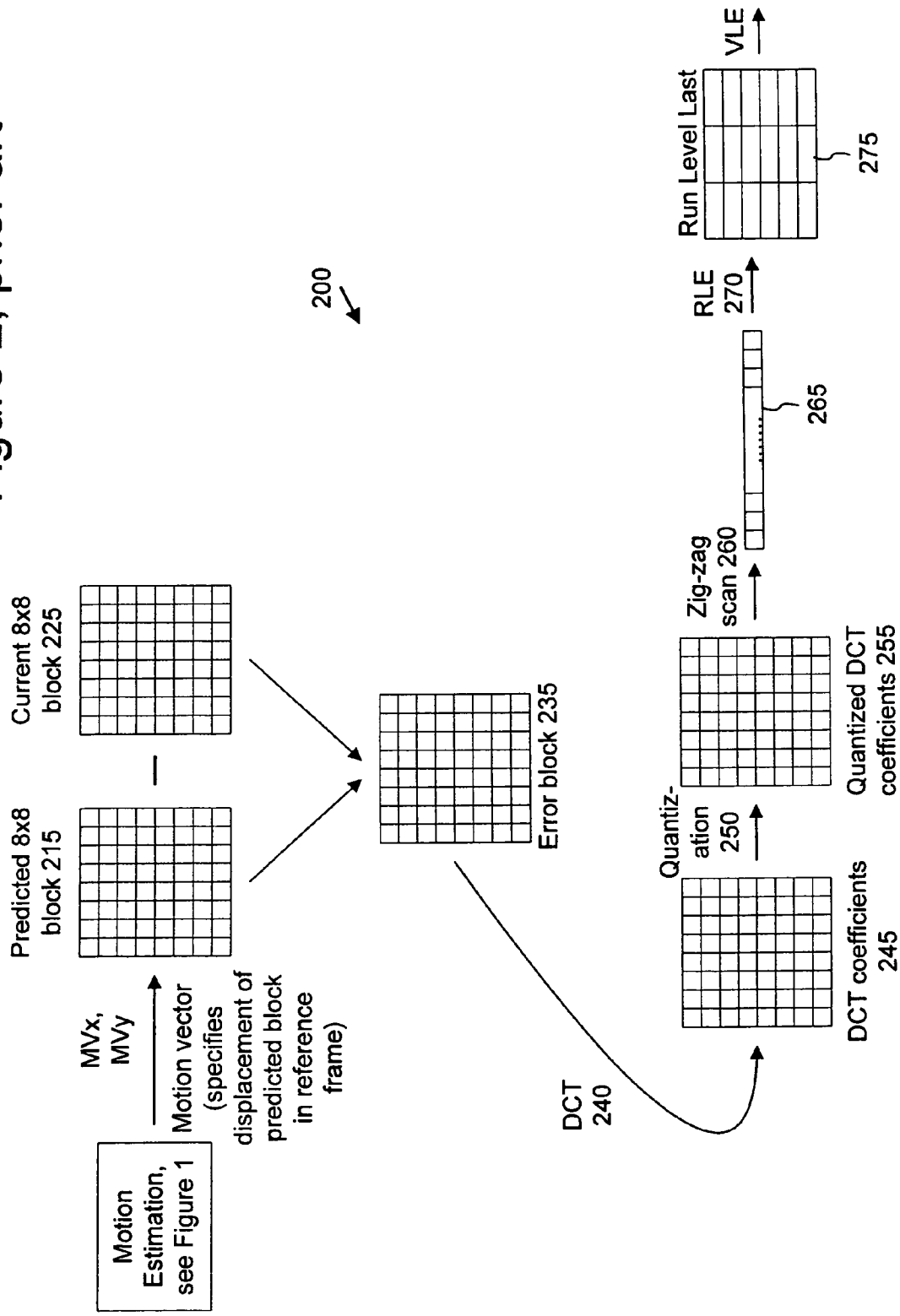
Figure 2, prior art

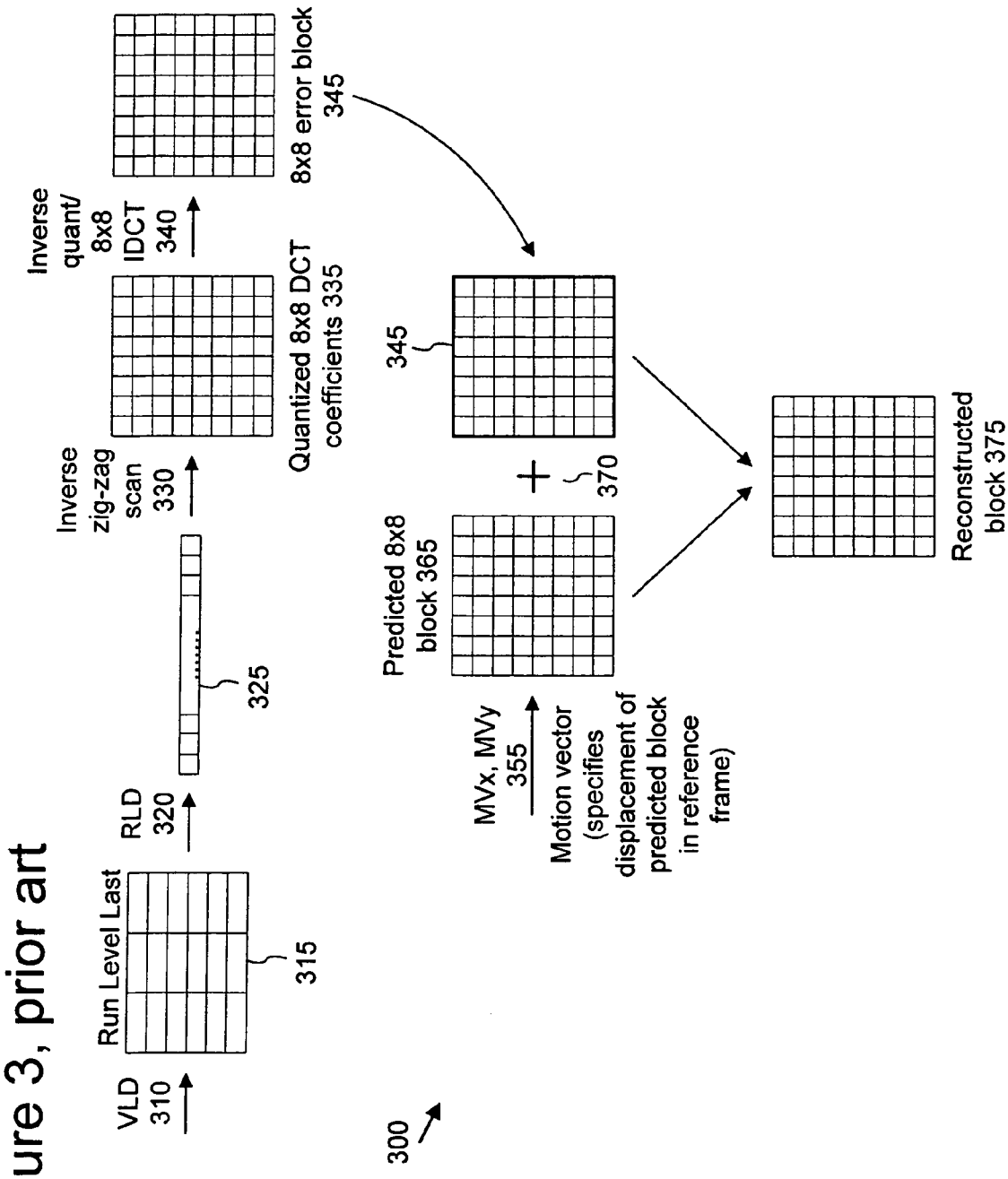
Figure 3, prior art

Figure 5A, prior art
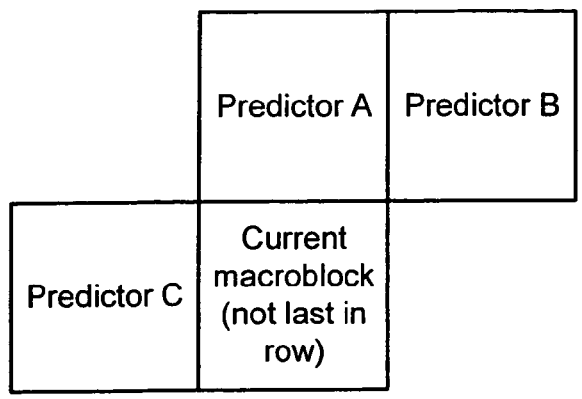
Figure 5B, prior art
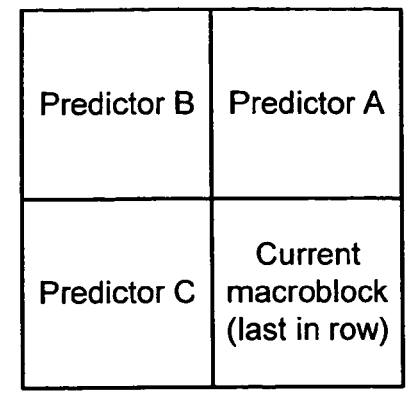
Figure 6A, prior art
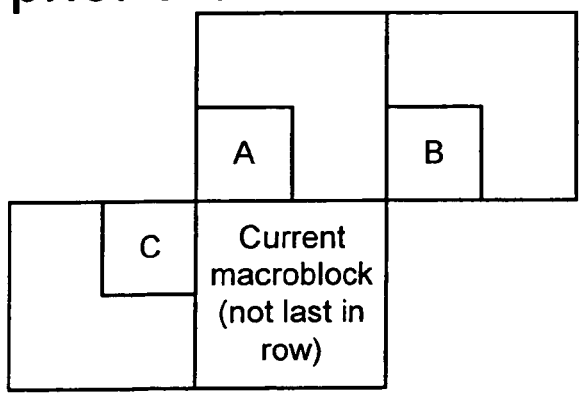
Figure 6B, prior art
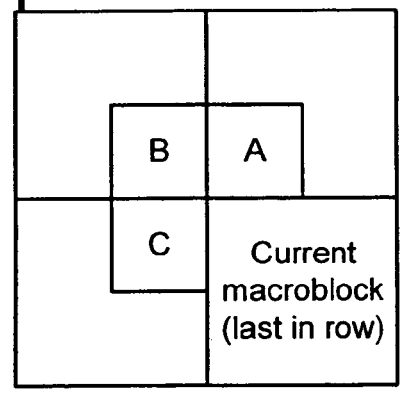

Figure 7A, prior art
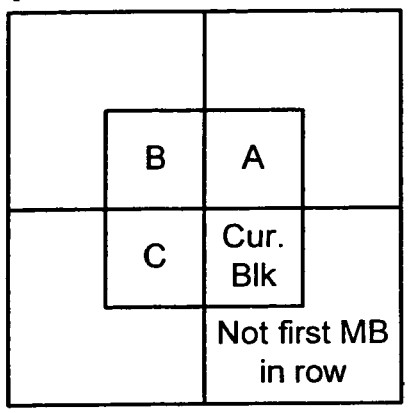
Figure 7B, prior art
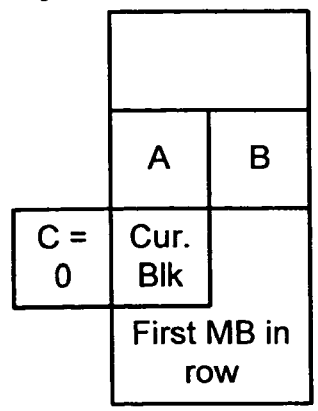
Figure 8A, prior art
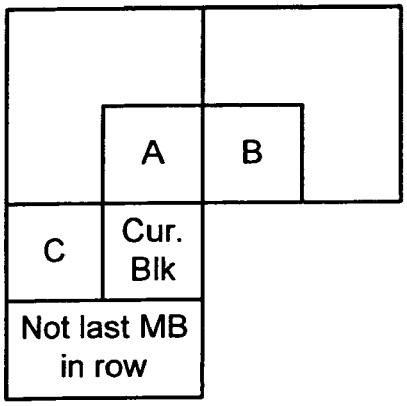
Figure 8B, prior art
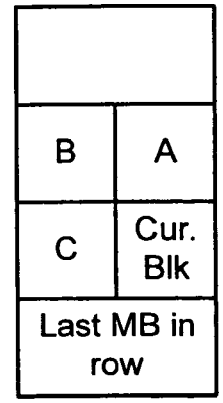
Figure 9, prior art
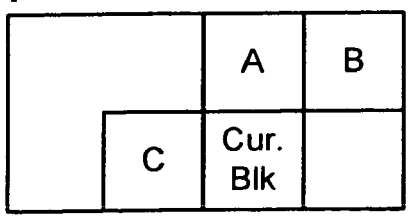
Figure 10, prior art
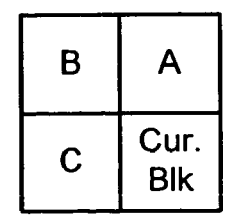

Figure 11, prior art

| Predictor A (compute average if field-coded) | Predictor B (compute average if field-coded) |
|---|---|
| Predictor C (compute average if field-coded) / Current macroblock | |

(Predictor C is to the left of Current macroblock; Predictors A and B are above.)

Figure 12A, prior art

|  |  |
|---|---|
| Predictor A | Predictor B |
|  |  |
| Predictor C | Current |

Figure 12B, prior art

| Predictor A | Predictor B |
|---|---|
|  |  |
| Predictor C | Current |
|  |  |

```
Median3 (a, b, c) {
    if (a > b) {
        if (b > c)
            median = b
        else if (a > c)
            median = c
        else
            median = a
    }
    else if (a > c)
        median = a
    else if (b > c)
        median = c
    else median = b
    return median
}
```

```
Median4 (a, b, c, d) {
    max = min = a
        if (b > max)
            max = b
        else if (b < min)
            min = b
        if (c > max)
            max = c
        else if (c < min)
            min = c
        if (d > max)
            max = d
        else if (d < min)
            min = d median = (a + b + c + d - max - min / 2
    return median
}
```

Figure 15, prior art
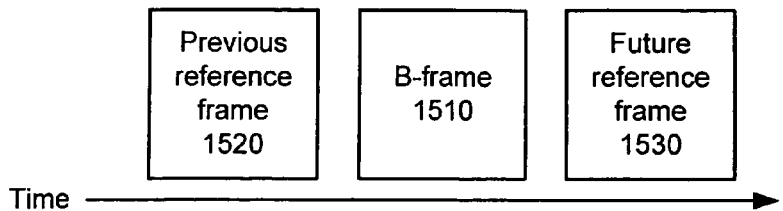
Figure 16, prior art
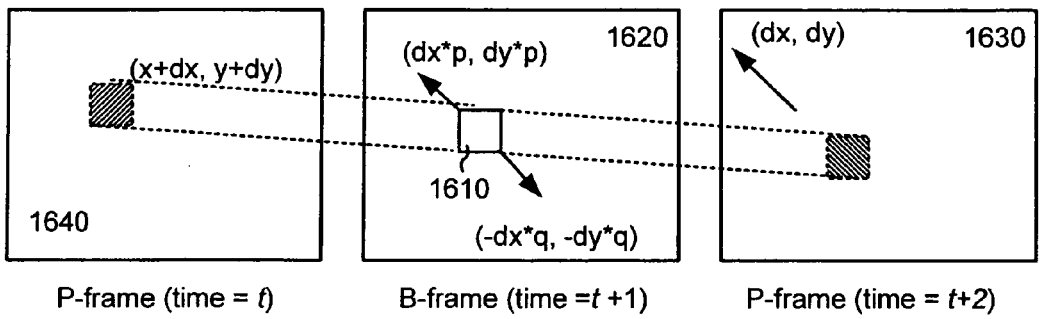
P-frame (time = t)   B-frame (time = t+1)   P-frame (time = t+2)
Figure 17, Prior Art
1700
| BFRACTION VLC | Fraction | BFRACTION VLC | Fraction | BFRACTION VLC | Fraction |
|---|---|---|---|---|---|
| 000 | 1/2 | 1110000 | 3/5 | 1110111 | 4/7 |
| 001 | 1/3 | 1110001 | 4/5 | 1111000 | 5/7 |
| 010 | 2/3 | 1110010 | 1/6 | 1111001 | 6/7 |
| 011 | 1/4 | 1110011 | 5/6 | 1111010 | 1/8 |
| 100 | 3/4 | 1110100 | 1/7 | 1111011 | 3/8 |
| 101 | 1/5 | 1110101 | 2/7 | 1111100 | 5/8 |
| 110 | 2/5 | 1110110 | 3/7 | 1111101 | 7/8 |

Figure 18, Prior Art

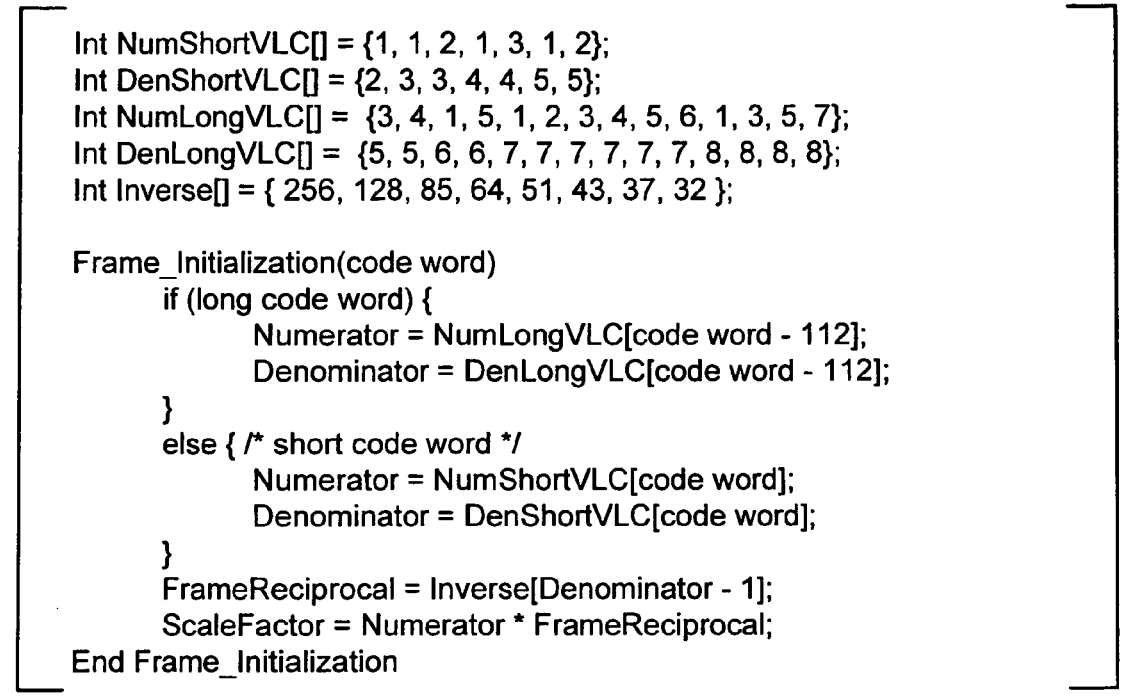

```
Int NumShortVLC[] = {1, 1, 2, 1, 3, 1, 2};
Int DenShortVLC[] = {2, 3, 3, 4, 4, 5, 5};
Int NumLongVLC[] = {3, 4, 1, 5, 1, 2, 3, 4, 5, 6, 1, 3, 5, 7};
Int DenLongVLC[] = {5, 5, 6, 6, 7, 7, 7, 7, 7, 7, 8, 8, 8, 8};
Int Inverse[] = { 256, 128, 85, 64, 51, 43, 37, 32 };

Frame_Initialization(code word)
    if (long code word) {
        Numerator = NumLongVLC[code word - 112];
        Denominator = DenLongVLC[code word - 112];
    }
    else { /* short code word */
        Numerator = NumShortVLC[code word];
        Denominator = DenShortVLC[code word];
    }
    FrameReciprocal = Inverse[Denominator - 1];
    ScaleFactor = Numerator * FrameReciprocal;
End Frame_Initialization
```

Figure 19, Prior Art

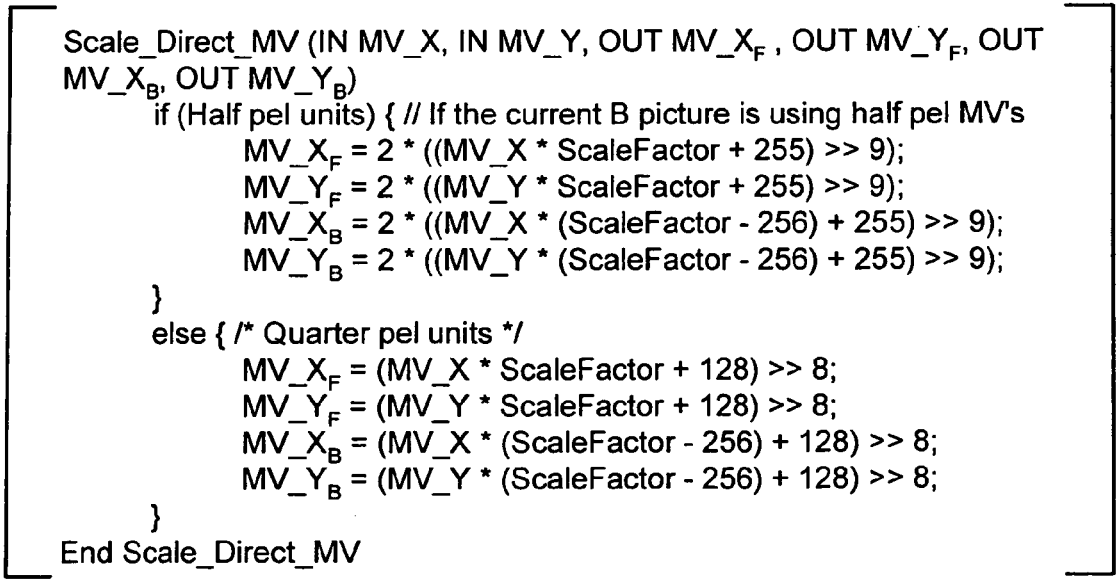

```
Scale_Direct_MV (IN MV_X, IN MV_Y, OUT MV_X_F, OUT MV_Y_F, OUT MV_X_B, OUT MV_Y_B)
    if (Half pel units) { // If the current B picture is using half pel MV's
        MV_X_F = 2 * ((MV_X * ScaleFactor + 255) >> 9);
        MV_Y_F = 2 * ((MV_Y * ScaleFactor + 255) >> 9);
        MV_X_B = 2 * ((MV_X * (ScaleFactor - 256) + 255) >> 9);
        MV_Y_B = 2 * ((MV_Y * (ScaleFactor - 256) + 255) >> 9);
    }
    else { /* Quarter pel units */
        MV_X_F = (MV_X * ScaleFactor + 128) >> 8;
        MV_Y_F = (MV_Y * ScaleFactor + 128) >> 8;
        MV_X_B = (MV_X * (ScaleFactor - 256) + 128) >> 8;
        MV_Y_B = (MV_Y * (ScaleFactor - 256) + 128) >> 8;
    }
End Scale_Direct_MV
```

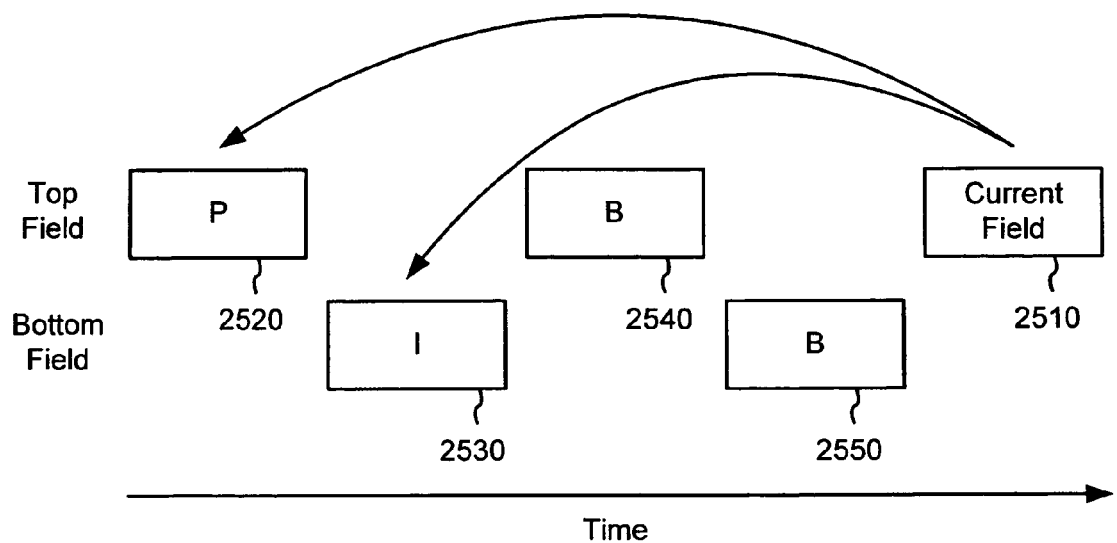
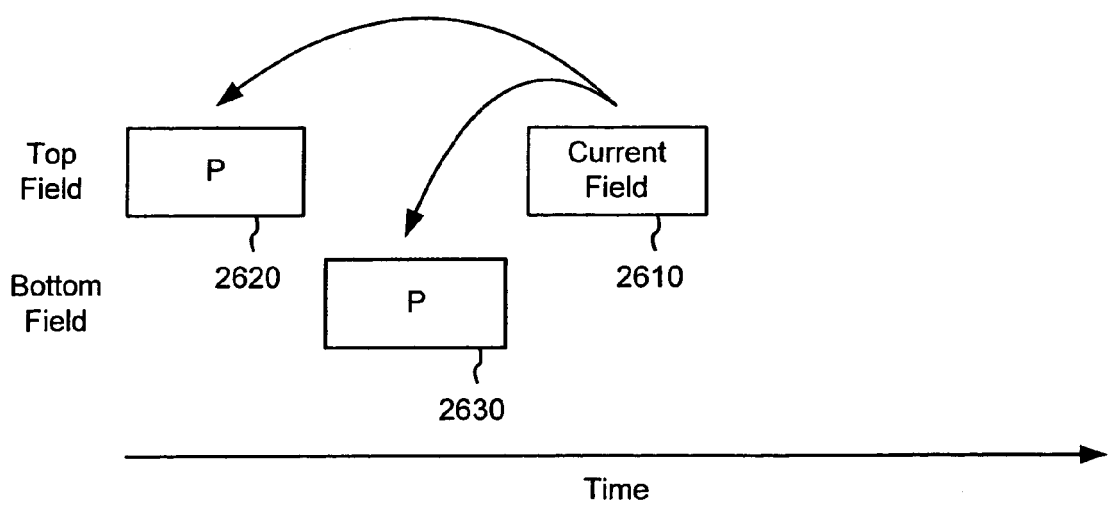

```
if (predictorA is not out of bounds) {
    if (predictorC is not out of bounds) {
        if (predictorA is intra) {
            predictorA_x = 0
            predictorA_y = 0
        }
        if (predictorB is intra) {
            predictorB_x = 0
            predictorB_y = 0
        }
        if (predictorC is intra) {
            predictorC_x = 0
            predictorC_y = 0
        }
        if (predictorA is from same field) {
            samecount = samecount + 1
            samefieldpredA_x = predictorA_x
            samefieldpredA_y = predictorA_y
            oppositefieldpredA_x = scaleforopposite_x(predictorA_x)
            oppositefieldpredA_y = scaleforopposite_y(predictorA_y)
        }
        else {
            oppositecount = oppositecount + 1
            oppositefieldpredA_x = predictorA_x
            oppositefieldpredA_y = predictorA_y
            samefieldpredA_x = scaleforsame_x(predictorA_x)
            samefieldpredA_y = scaleforsame_y(predictorA_y)
        }
        if (predictorB is from same field) {
            samecount = samecount + 1
            samefieldpredB_x = predictorB_x
            samefieldpredB_y = predictorB_y
            oppositefieldpredB_x = scaleforopposite_x(predictorB_x)
            oppositefieldpredB_y = scaleforopposite_y(predictorB_y)
        }
        else {
            oppositecount = oppositecount + 1
            oppositefieldpredB_x = predictorB_x
            oppositefieldpredB_y = predictorB_y
            samefieldpredB_x = scaleforsame_x(predictorB_x)
            samefieldpredB_y = scaleforsame_y(predictorB_y)
        }
```

```
if (predictorC is from same field) {
    samecount = samecount + 1
    samefieldpredC_x = predictorC_x
    samefieldpredC_y = predictorC_y
    oppositefieldpredC_x = scaleforopposite_x(predictorC_x)
    oppositefieldpredC_y = scaleforopposite_y(predictorC_y)
}
else {
    oppositecount = oppositecount + 1
    oppositefieldpredC_x = predictorC_x
    oppositefieldpredC _y = predictorC_y
    samefieldpredC _x = scaleforsame_x(predictorC_x)
    samefieldpredC _y = scaleforsame_y(predictorC_y)
}
samefieldpred_x =
    median (samefieldpredA_x, samefieldpredB_x, samefieldpredC_x)
samefieldpred_y =
    median (samefieldpredA_y, samefieldpredA_y, samefieldpredC_y)
oppositefieldpred_x =
    median (oppositefieldpredA_x, oppositefieldpredB_x, oppositefieldpredC_x)
oppositefieldpred_y =
    median (oppositefieldpredA_y, oppositefieldpredB_y, oppositefieldpredC_y)

if (samecount > oppositecount)
    dominantpredictor = samefield
else
    dominantpredictor = oppositefield
}
```

```
else {
    // predictorC is out of bounds
    if (only 1 macroblock per row) {
        if (predictorA is intra) {
            samefieldpred_x = oppositefieldpred_x = 0
            samefieldpred_y = oppositefieldpred_y = 0
            dominantpredictor = oppositefield
        }
        else {
            // Use predictorA
            if (predictorA is from same field) {
                samefieldpred_x = predictorA_x
                samefieldpred_y = predictorA_y
                oppositefieldpred_x = scaleforopposite_x(predictorA_x)
                oppositefieldpred_y = scaleforopposite_y(predictorA_y)
                dominantpredictor = samefield
            }
            else {
                oppositefieldpred_x = predictorA_x
                oppositefieldpred_y = predictorA_y
                samefieldpred_x = scaleforsame_x(predictorA_x)
                samefieldpred_y = scaleforsame_y(predictorA_y)
                dominantpredictor = oppositefield
            }
        }
    }
}
```

```
else {
    // PredictorC is out of bounds, use PredictorA and PredictorB
    predictorC_x = 0
    predictorC_y = 0
    if (predictorA is intra) {
       predictorA_x = 0
       predictorA_y = 0
    }
    if (predictorB is intra) {
       predictorB_x = 0
       predictorB_y = 0
    }
    if (predictorC is intra) {
       predictorC_x = 0
       predictorC_y = 0
    }
    if (predictorA is from same field) {
       samecount = samecount + 1
       samefieldpredA_x = predictorA_x
       samefieldpredA_y = predictorA_y
       oppositefieldpredA_x = scaleforopposite_x(predictorA_x)
       oppositefieldpredA_y = scaleforopposite_y(predictorA_y)
    }
    else {
       oppositecount = oppositecount + 1
       oppositefieldpredA_x = predictorA_x
       oppositefieldpredA _y = predictorA_y
       samefieldpredA_x = scaleforsame_x(predictorA_x)
       samefieldpredA_y = scaleforsame_y(predictorA_y)
    }
```

```
if (predictorB is from same field) {
    samecount = samecount + 1
    samefieldpredB_x = predictorB_x
    samefieldpredB_y = predictorB_y
    oppositefieldpredB_x = scaleforopposite_x(predictorB_x)
    oppositefieldpredB_y = scaleforopposite_y(predictorB_y)
}
else {
    oppositecount = oppositecount + 1
    oppositefieldpredB_x = predictorB_x
    oppositefieldpredB_y = predictorB_y
    samefieldpredB_x = scaleforsame_x(predictorB_x)
    samefieldpredB_y = scaleforsame_y(predictorB_y)
}
samefieldpred_x =
    median (samefieldpredA_x, samefieldpredB_x, 0)
samefieldpred_y =
    median (samefieldpredA_y, samefieldpredA_y, 0)
oppositefieldpred_x =
    median (oppositefieldpredA_x, oppositefieldpredB_x, 0)
oppositefieldpred_y =
    median (oppositefieldpredA_y, oppositefieldpredB_y, 0)
if (samecount > oppositecount)
    dominantpredictor = samefield
else
    dominantpredictor = oppositefield
        }
    }
}
```

Figure 33F

```
else {
    // Predictor A is out of bounds
    if (predictorC is out of bounds) {
        samefieldpred_x = oppositefieldpred_x = 0
        samefieldpred_y = oppositefieldpred_y = 0
        dominantpredictor = oppositefield
    }
    else {
        // Use predictorC
        if (predictorC is from same field) {
            samefieldpred_x = predictorC_x
            samefieldpred_y = predictorC_y
            oppositefieldpred_x = scaleforopposite_x(predictorC_x)
            oppositefieldpred_y = scaleforopposite_y(predictorC_y)
            dominantpredictor = samefield
        }
        else {
            oppositefieldpred_x = predictorC_x
            oppositefieldpred_y = predictorC_y
            samefieldpred_x = scaleforsame_x(predictorC_x)
            samefieldpred_y = scaleforsame_y(predictorC_y)
            dominantpredictor = oppositefield
        }
    }
}
```

```
scaleforopposite_x (n) {
    int scaledvalue
    scaledvalue = (n * SCALEOPP) >> 8
    return scaledvalue
} scaleforopposite_y (n) {
    int scaledvalue
    if (current field is top)
        scaledvalue = ((n * SCALEOPP) >> 8) - 2
    else  //current field is bottom
        scaledvalue = ((n * SCALEOPP) >> 8) + 2
    return scaledvalue
}
```

```
scaleforsame_x (n) {
  if (abs (n) < SCALEZONE1_X)
    scaledvalue = (n * SCALESAME1) >> 8
  else {
    if (n < 0)
        scaledvalue = ((n * SCALESAME2) >> 8) - ZONE1OFFSET_X
    else
        scaledvalue = ((n * SCALESAME2) >> 8) + ZONE1OFFSET_X
  }
  return scaledvalue
} scaleforsame_y (n) {
  if (current field is top) {
  if (abs (n) < SCALEZONE1_Y)
    scaledvalue = (n * SCALESAME1) >> 8
  else {
    if (n < 0)
        scaledvalue = ((n * SCALESAME2) >> 8) - ZONE1OFFSET_Y
    else
        scaledvalue = ((n * SCALESAME2) >> 8) + ZONE1OFFSET_Y
  }
 }
    else { //current field is bottom
      if (abs (n) < SCALEZONE1_Y)
         scaledvalue = (n * SCALESAME1) >> 8
      else {
        if (n < 0)
          scaledvalue = ((n * SCALESAME2) >> 8) - ZONE1OFFSET_Y
        else
          scaledvalue = ((n * SCALESAME2) >> 8) + ZONE1OFFSET_Y
      }
   }
    return scaledvalue
 }
```

Figure 35

| | Reference Frame Distance | | | |
|---|---|---|---|---|
| | 1 | 2 | 3 | 4 or greater |
| SCALEOPP | 128 | 192 | 213 | 224 |
| SCALESAME1 | 512 | 341 | 307 | 293 |
| SCALESAME2 | 219 | 236 | 242 | 245 |
| SCALEZONE1_X | 32 * N | 48 * N | 53 * N | 56 * N |
| SCALEZONE1_Y | 8 * N | 12 * N | 13 * N | 14 * N |
| ZONE1OFFSET_X | 37 * N | 20 * N | 14 * N | 11 * N |
| ZONE1OFFSET_Y | 10 * N | 5 * N | 4 * N | 3 * N |

Figure 36

| | Reference Frame Distance | | | |
|---|---|---|---|---|
| | 1 | 2 | 3 | 4 or greater |
| SCALEOPP | 128 | 64 | 43 | 32 |
| SCALESAME1 | 512 | 1024 | 1536 | 2048 |
| SCALESAME2 | 219 | 204 | 200 | 198 |
| SCALEZONE1_X | 32 * N | 16 * N | 11 * N | 8 * N |
| SCALEZONE1_Y | 8 * N | 4 * N | 3 * N | 2 * N |
| ZONE1OFFSET_X | 37 * N | 52 * N | 56 * N | 11 * N |
| ZONE1OFFSET_Y | 10 * N | 5 * N | 4 * N | 3 * N |

Figure 37
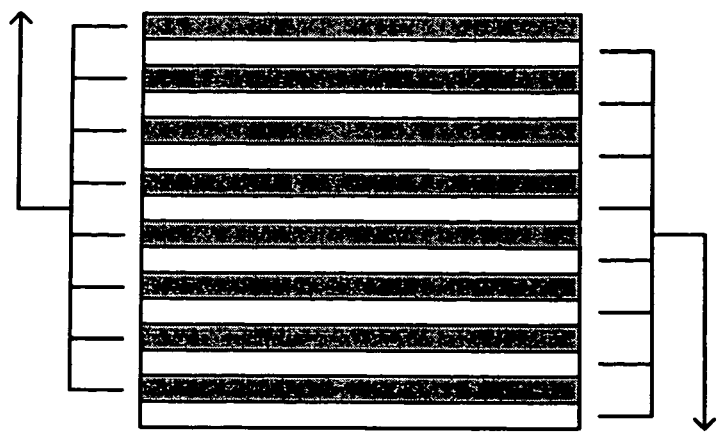
Top Field MV
Luminance Blocks
Bottom Field MV
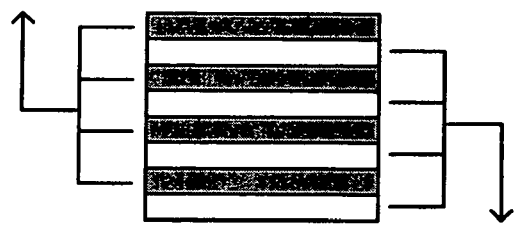
Derived Top Field MV
Chrominance Block
Derived Bottom Field MV
Figure 38
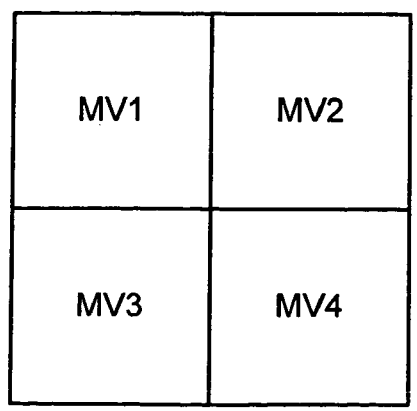 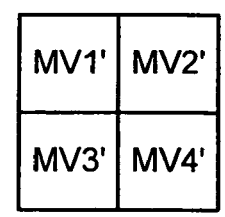
Luminance Blocks
Chrominance Block

Figure 39
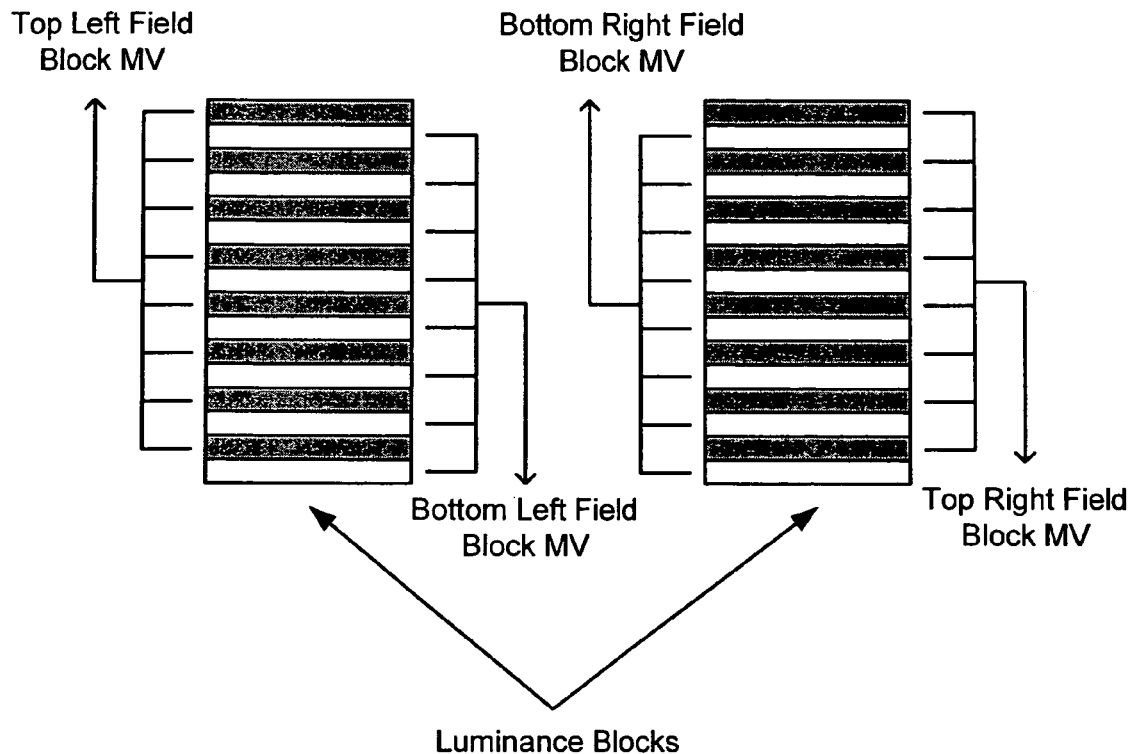
Luminance Blocks
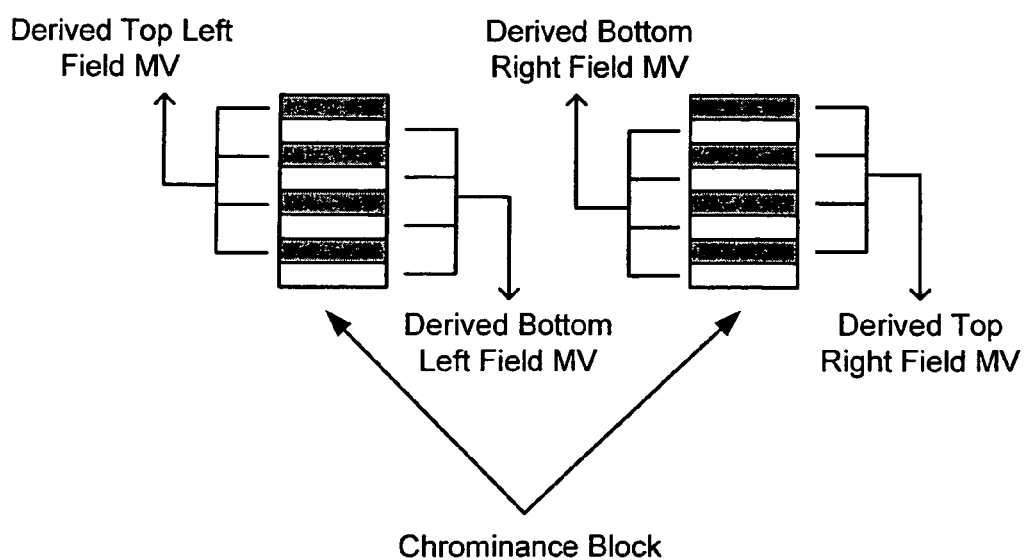
Chrominance Block

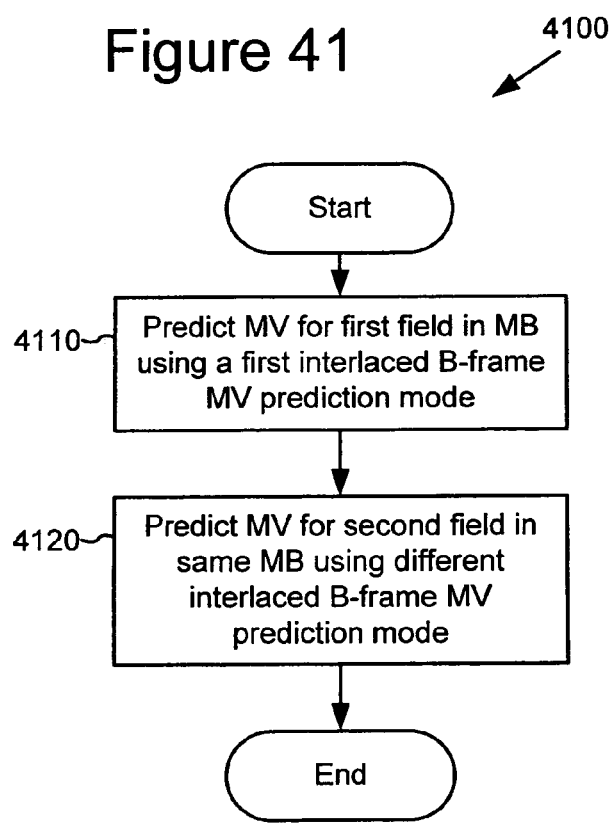

```
PredictedMV PredictMVFieldBPicture (Type of pred) // real or "hole filling"
{
    if (Type of prediction = Real) {
        // in this case we received an actual MV of this type
        then use the normal field MV prediction described above with the
        polarity of the real MV received
    }
    else {
        // hole filling prediction - when we did not receive an
        // actual MV of this type
        use the field MV prediction, and pick the predicted MV of the most
        dominant field
    }
    return the predicted MV
}
```

```
scaleforsame_x (n) {
        int scaledvalue
        scaledvalue = (n * SCALESAME) >> 8
        return scaledvalue
} scaleforsame_y (n) {
        int scaledvalue
        if (current field is top)
                scaledvalue = ((n * SCALESAME) >> 8) - 2
        else  //current field is bottom
                scaledvalue = ((n * SCALESAME) >> 8) + 2
        return scaledvalue
}
```

```
scaleforopposite_x (n) {
  if (abs (n) < SCALEZONE1_X)
      scaledvalue = (n * SCALEOPP1) >> 8
  else {
      if (n < 0)
              scaledvalue = ((n * SCALEOPP2) >> 8) - ZONE1OFFSET_X
      else
              scaledvalue = ((n * SCALEOPP2) >> 8) + ZONE1OFFSET_X
  }
  return scaledvalue
}
scaleforopposite_y (n) {
  if (current field is top) {
  if (abs (n) < SCALEZONE1_Y)
      scaledvalue = ((n + 2) * SCALEOPP1) >> 8
  else {
      if (n < 0)
              scaledvalue = (((n + 2) * SCALEOPP2) >> 8) - ZONE1OFFSET_Y
      else
              scaledvalue = (((n + 2) * SCALEOPP2) >> 8) + ZONE1OFFSET_Y
  }
  }
    else {      //current field is bottom
    if (abs (n) < SCALEZONE1_Y)
        scaledvalue = ((n - 2) * SCALEOPP1) >> 8
    else {
        if (n < 0)
                scaledvalue = (((n - 2) * SCALEOPP2) >> 8) - ZONE1OFFSET_Y
        else
                scaledvalue = (((n - 2) * SCALEOPP2) >> 8) + ZONE1OFFSET_Y
    }
  } return scaledvalue
}
```

Figure 49        4900

|  | Reference Picture Distance | | | |
| --- | --- | --- | --- | --- |
|  | 1 | 2 | 3 | 4 or greater |
| SCALESAME | 171 | 205 | 219 | 228 |
| SCALEOPP1 | 384 | 320 | 299 | 288 |
| SCALEOPP2 | 230 | 239 | 244 | 246 |
| SCALEZONE1_X | 32 * N | 48 * N | 53 * N | 56 * N |
| SCALEZONE1_Y | 8 * N | 12 * N | 13 * N | 14 * N |
| ZONE1OFFSET_X | 37 * N | 20 * N | 14 * N | 11 * N |
| ZONE1OFFSET_Y | 10 * N | 5 * N | 4 * N | 3 * N |

P1   P2   P3   P4

Field Pictures

P1   B2   P3   B4

Field B Pictures

Figure 53

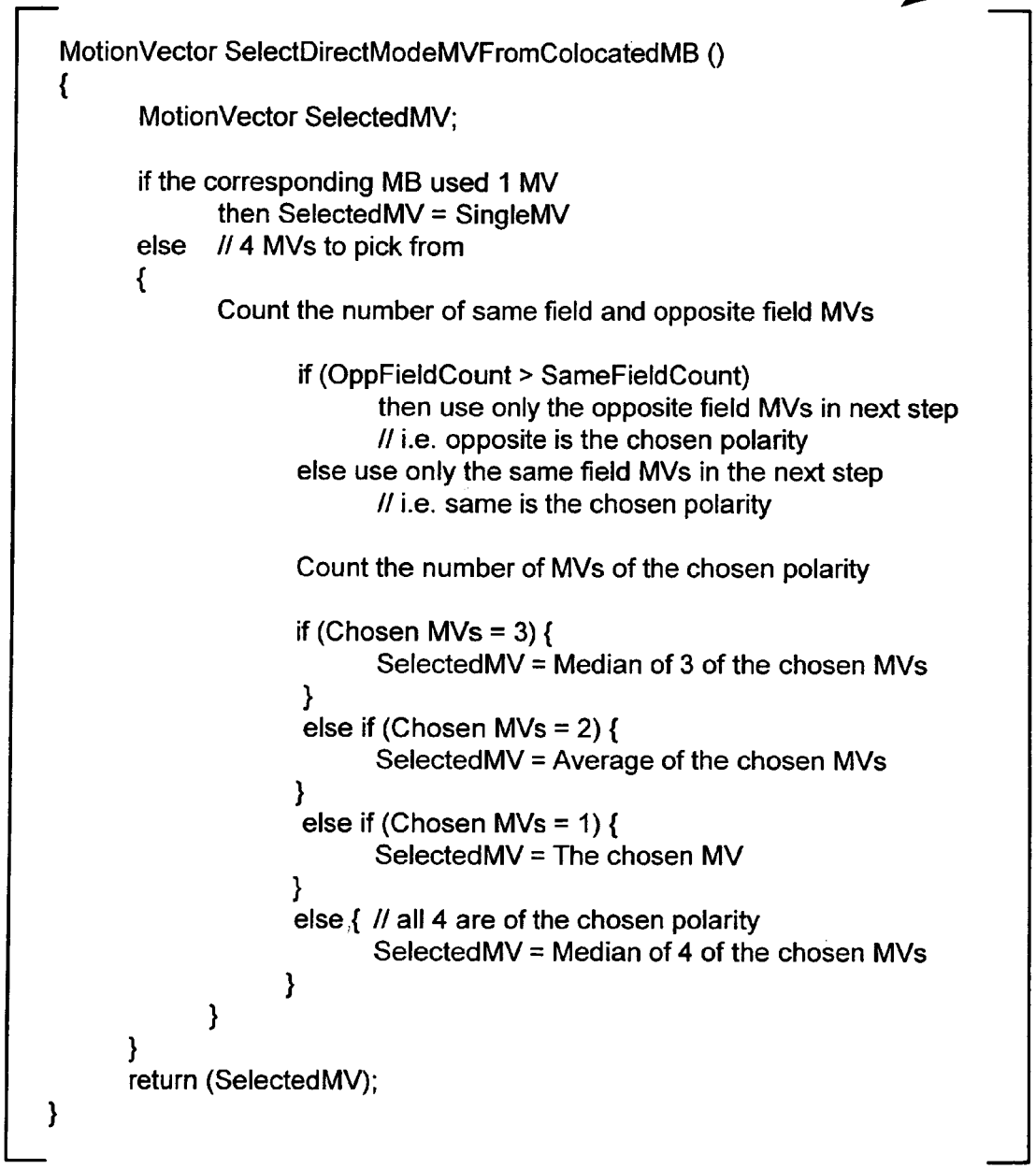

```
MotionVector SelectDirectModeMVFromColocatedMB ()
{
        MotionVector SelectedMV;

if the corresponding MB used 1 MV
                then SelectedMV = SingleMV
        else    // 4 MVs to pick from
        {
                Count the number of same field and opposite field MVs if (OppFieldCount > SameFieldCount)
                                then use only the opposite field MVs in next step
                                // i.e. opposite is the chosen polarity
                        else use only the same field MVs in the next step
                                // i.e. same is the chosen polarity Count the number of MVs of the chosen polarity if (Chosen MVs = 3) {
                        SelectedMV = Median of 3 of the chosen MVs
                }
                else if (Chosen MVs = 2) {
                        SelectedMV = Average of the chosen MVs
                }
                else if (Chosen MVs = 1) {
                        SelectedMV = The chosen MV
                }
                else { // all 4 are of the chosen polarity
                        SelectedMV = Median of 4 of the chosen MVs
                }
        }
        return (SelectedMV);
}
```

Field Layer
Interlace BI-field
Bitstream Syntax
5600

Macroblock Layer Interlace BI-field Bitstream Syntax 5800

Frame Layer Interlace B-frame Bitstream Syntax 5900

Macroblock Layer Interlace B-frame Bitstream Syntax 6000

Figure 61A

```
size_table[16] = {0, 0, 1, 1, 2, 2, 3, 3, 4, 4, 5, 5, 6, 6, 7, 7}
offset_table1[9] = {0, 1, 2, 4, 8, 16, 32, 64, 128}
offset_table2[9] = {0, 1, 3, 7, 15, 31, 63, 127, 255}
index = vlc_decode()  // Use the Huffman table indicated by MVTAB
if (index == 125)
{
        dmv_x = get_bits(k_x)
        dmv_y = get_bits(k_y)
        predictor_flag = dmv_y & 1
        dmv_y = dmv_y >> 1
}
else
{
    if (extend_x == 1)
       offset_table = offset_table2
    else
       offset_table = offset_table1
    index1 = (index + 1) % 9
    if (index1 != 0)
    {
       val = get_bits (index1 + extend_x)
       sign = 0 - (val & 1)
       dmv_x = sign ^ ((val >> 1) + offset_table[index1])
       dmv_x = dmv_x - sign
    }
    else
       dmv_x = 0
    if (extend_y == 1)
       offset_table = offset_table2
    else
       offset_table = offset_table1
    index1 = (index + 1) / 9
    if (index1 != 0)
    {
       val = get_bits (size_table[index1 + 2 * extend_y])
       sign = 0 - (val & 1)
       dmv_y = sign ^ ((val >> 1) + offset_table[index1 >> 1])
       dmv_y = dmv_y - sign
       predictor_flag = index1 & 1
    }
    else
    {
       dmv_y = 0
       predictor_flag = 0
    }
}
```

```
size_table[14] = {0, 0, 1, 1, 2, 2, 3, 3, 4, 4, 5, 5, 6, 6}
offset_table[9] = {0, 1, 2, 4, 8, 16, 32, 64, 128}
index = vlc_decode()      // Use the Huffman table indicated by MVTAB in
the picture layer
if (index == 0) {
        dmv_x = 1 - 2 * get_bits(1)
        dmv_y = 0
        predictor_flag = 0
}
if (index == 125)
{
        dmv_x = get_bits(k_x - halfpel_flag)
        dmv_y = get_bits(k_y - halfpel_flag)
        predictor_flag = dmv_y & 1
        dmv_y = dmv_y >> 1
}
else
{
index1 = (index + 1) % 9
    val = get_bits (index1)
    sign = 0 - (val & 1)
    dmv_x = sign ^ ((val >> 1) + offset_table[index1])
    dmv_x = dmv_x - sign index1 = (index + 1) / 9
    val = get_bits (size_table[index1])
    sign = 0 - (val & 1)
    dmv_y = sign ^ ((val >> 1) + offset_table[index1])
    dmv_y = dmv_y - sign
    predictor_flag = index1 & 1
}
```

```
samecount = 0;
oppositecount = 0;
if (predictorA is not out of bounds) {
    if (predictorC is not out of bounds) {
        if (predictorA is intra) {
            samefieldpred_x = oppositefieldpred_x = samefieldpredA_x = oppositefieldpredA_x = 0
            samefieldpred_y = oppositefieldpred_y = samefieldpredA_y = oppositefieldpredA_y = 0
        }
        if (predictorB is intra) {
            samefieldpred_x = oppositefieldpred_x = samefieldpredB_x = oppositefieldpredB_x = 0
            samefieldpred_y = oppositefieldpred_y = samefieldpredB_y = oppositefieldpredB_y = 0
        }
        if (predictorC is intra) {
            samefieldpred_x = oppositefieldpred_x = samefieldpredC_x = oppositefieldpredC_x = 0
            samefieldpred_x = oppositefieldpred_x = samefieldpredC_y = oppositefieldpredC_y = 0
        }
        if (predictorA is not intra) {
            if (predictorA is from same field) {
                samecount = samecount + 1
                samefieldpred_x  = samefieldpredA_x = predictorA_x
                samefieldpred_y  = samefieldpredA_y = predictorA_y
                oppositefieldpred_x  = oppositefieldpredA_x = scaleforopposite_x(predictorA_x)
                oppositefieldpred_y  = oppositefieldpredA_y = scaleforopposite_y(predictorA_y)
            }
            else {
                oppositecount = oppositecount + 1
                oppositefieldpred_x  = oppositefieldpredA_x = predictorA_x
                oppositefieldpred_y  = oppositefieldpredA_y = predictorA_y
                samefieldpred_x  = samefieldpredA_x = scaleforsame_x(predictorA_x)
                samefieldpred_y  = samefieldpredA_y = scaleforsame_y(predictorA_y)
            }
        }
        if (predictorB is not intra) {
            If (predictorB is from same field) {
                samecount = samecount + 1
                samefieldpred_x = samefieldpredB_x = predictorB_x
                samefieldpred_y = samefieldpredB_y = predictorB_y
                oppositefieldpred_x = oppositefieldpredB_x = scaleforopposite_x(predictorB_x)
                oppositefieldpred_y = oppositefieldpredB_y = scaleforopposite_y(predictorB_y)
            }
            else {
                oppositecount  = oppositecount + 1
                oppositefieldpred_x = oppositefieldpredB_x = predictorB_x
                oppositefieldpred_y = oppositefieldpredB _y = predictorB_y
                samefieldpred_x = samefieldpredB_x = scaleforsame_x(predictorB_x)
                samefieldpred_y = samefieldpredB_y = scaleforsame_y(predictorB_y)
            }
        }
    }
}
```

```
if (predictorC is not intra) {
    if (predictorC is from same field) {
        samecount = samecount + 1
        samefieldpred_x = samefieldpredC_x = predictorC_x
        samefieldpred_y = samefieldpredC_y = predictorC_y
        oppositefieldpred_x = oppositefieldpredC_x = scaleforopposite_x(predictorC_x)
        oppositefieldpred_y = oppositefieldpredC_y = scaleforopposite_y(predictorC_y)
    }
    else {
        oppositecount = oppositecount + 1
        oppositefieldpred_x  = oppositefieldpredC_x = predictorC_x
        oppositefieldpred_y = oppositefieldpredC _y = predictorC_y
        samefieldpred_x = samefieldpredC _x = scaleforsame_x(predictorC_x)
        samefieldpred_y = samefieldpredC _y = scaleforsame_y(predictorC_y)
    }
}
if ((samecount + oppositecount) > 1) {
    samefieldpred_x =
        median (samefieldpredA_x, samefieldpredB_x, samefieldpredC_x)
    samefieldpred_y =
        median (samefieldpredA_y, samefieldpredA_y, samefieldpredC_y)
    oppositefieldpred_x =
        median (oppositefieldpredA_x, oppositefieldpredB_x, oppositefieldpredC_x)
    oppositefieldpred_y =
        median (oppositefieldpredA_y, oppositefieldpredB_y, oppositefieldpredC_y)
} if (samecount > oppositecount)
    dominantpredictor = samefield
else
    dominantpredictor = oppositefield
}
```

Figure 62C

```
else {
    // predictorC is out of bounds
    if (only 1 macroblock per row) {
        if (predictorA is intra) {
            samefieldpred_x = oppositefieldpred_x = 0
            samefieldpred_y = oppositefieldpred_y = 0
            dominantpredictor = oppositefield
        }
        else {
            // Use predictorA
            if (predictorA is from same field) {
                samefieldpred_x = predictorA_x
                samefieldpred_y = predictorA_y
                oppositefieldpred_x = scaleforopposite_x(predictorA_x)
                oppositefieldpred_y = scaleforopposite_y(predictorA_y)
                dominantpredictor = samefield
            }
            else {
                oppositefieldpred_x = predictorA_x
                oppositefieldpred_y = predictorA_y
                samefieldpred_x = scaleforsame_x(predictorA_x)
                samefieldpred_y = scaleforsame_y(predictorA_y)
                dominantpredictor = oppositefield
            }
        }
    }
```

```
else {
    // Predictor C is out of bounds, use Predictor and PredictorB
    predictorC_x = 0
    predictorC_y = 0
    if (predictorA is intra) {
        samefieldpred_x = oppositefieldpred_x = samefieldpredA_x = oppositefieldpredA_x = 0
        samefieldpred_y = oppositefieldpred_y = samefieldpredA_y = oppositefieldpredA_y = 0
    }
    if (predictorB is intra) {
        samefieldpred_x = oppositefieldpred_x = samefieldpredB_x = oppositefieldpredB_x = 0
        samefieldpred_y = oppositefieldpred_y = samefieldpredB_y = oppositefieldpredB_y = 0
    }
    if (predictorC is intra) {
        samefieldpred_x = oppositefieldpred_x = samefieldpredC_x = oppositefieldpredC_x = 0
        samefieldpred_x = oppositefieldpred_x = samefieldpredC_y = oppositefieldpredC_y = 0
    }
    if (predictorA is not intra) {
        if (predictorA is from same field) {
            samecount = samecount + 1
            samefieldpred_x = samefieldpredA_x = predictorA_x
            samefieldpred_y = samefieldpredA_y = predictorA_y
            oppositefieldpred_x = oppositefieldpredA_x = scaleforopposite_x(predictorA_x)
            oppositefieldpred_y = oppositefieldpredA_y = scaleforopposite_y(predictorA_y)
        }
        else {
            oppositecount = oppositecount + 1
            oppositefieldpred_x = oppositefieldpredA_x = predictorA_x
            oppositefieldpred_y = oppositefieldpredA _y = predictorA_y
            samefieldpred_x = samefieldpredA_x = scaleforsame_x(predictorA_x)
            samefieldpred_y = samefieldpredA_y = scaleforsame_y(predictorA_y)
        }
    }
}
```

```
if (predictorB is not intra) {
    if (predictorB is from same field) {
        samecount  = samecount + 1
        samefieldpred_x = samefieldpredB_x = predictorB_x
        samefieldpred_y = samefieldpredB_y = predictorB_y
        oppositefieldpred_x = oppositefieldpredB_x = scaleforopposite_x(predictorB_x)
        oppositefieldpred_y = oppositefieldpredB_y = scaleforopposite_y(predictorB_y)
    }
    else {
        oppositecount = oppositecount + 1
        oppositefieldpred_x = oppositefieldpredB_x = predictorB_x
        oppositefieldpred_y = oppositefieldpredB_y = predictorB_y
        samefieldpred_x = samefieldpredB_x = scaleforsame_x(predictorB_x)
        samefieldpred_y = samefieldpredB_y = scaleforsame_y(predictorB_y)
    }
}
if ((samecount + oppositecount) > 1) {
    samefieldpred_x =
        median (samefieldpredA_x, samefieldpredB_x, samefieldpredC_x)
    samefieldpred_y =
        median (samefieldpredA_y, samefieldpredA_y, samefieldpredC_y)
    oppositefieldpred_x =
        median (oppositefieldpredA_x, oppositefieldpredB_x, oppositefieldpredC_x)
    oppositefieldpred_y =
        median (oppositefieldpredA_y, oppositefieldpredB_y, oppositefieldpredC_y)
}
if (samecount > oppositecount)
    dominantpredictor = samefield
else
    dominantpredictor = oppsositefield
    }
  }
}
```

```
else {
    // Predictor A is out of bounds
    if (predictorC is out of bounds) {
        samefieldpred_x = oppositefieldpred_x = 0
        samefieldpred_y = oppositefieldpred_y = 0
        dominantpredictor = oppositefield
    }
    else {
        // Use predictorC
        if (predictorC is from same field) {
            samefieldpred_x = predictorC_x
            samefieldpred_y = predictorC_y
            oppositefieldpred_x = scaleforopposite_x(predictorC_x)
            oppositefieldpred_y = scaleforopposite_y(predictorC_y)
            dominantpredictor = samefield
        }
        else {
            oppositefieldpred_x = predictorC_x
            oppositefieldpred_y = predictorC_y
            samefieldpred_x = scaleforsame_x(predictorC_x)
            samefieldpred_y = scaleforsame_y(predictorC_y)
            dominantpredictor = oppositefield
        }
    }
}
```

```
if (predictor_flag == 0) {
        if (dominantpredictor == samefield)
                reference is from same field as current field
        else
                reference is from opposite field as current field
}
else {
        // predictor_flag == 1
        if (dominantpredictor == samefield)
                reference is from opposite field as current field
        else
                reference is from same field as current field
}
```

```
if (A exists and A is not intra coded) {
  if (A is 1 MV) {
    Add MV of A to the set of candidate MVs.
  } else if (A is 4 Frame MV) {
    Add the top right block MV of A to the set of candidate motion vectors.
  } else if (A is 2 Field MV) {
    Average the two field MVs of A and add the resulting MV to the set of candidate MVs.
  } else if (A is 4 Field MV) {
    Average the top right block field MV and bottom right block field MV of A and add the
        resulting MV to the set of candidate MVs.
  }
} if (B exists and B is not intra coded) {
  if (B is 1 MV) {
    Add MV of B to the set of candidate MVs.
  } else if (B is 4 Frame MV) {
    Add the bottom left block MV of B to the set of candidate MVs.
  } else if (B is 2 Field MV) {
    Average the two field MVs of B and add the resulting MV to the set of candidate MVs.
  } else if (B is 4 Field MV) {
    Average the top left block field MV and bottom left block field MV of B and add the resulting
    MV to the set of candidate MVs.
  }
} if (C exists and C is not intra coded) {
  if (C is 1 MV) {
    Add MV of C to the set of candidate MVs.
  } else if (C is 4 Frame MV) {
    if (C is top right MB) {
      Add the bottom left block MV of C to the set of candidate MVs.
    } else { // C is top left MB
      Add the bottom right block MV of C to the set of candidate MVs.
    }
  } else if (C is 2 Field MV) {
    Average the two field MVs of C and add the resulting MV to the set of candidate MVs.
  } else if (C is 4 Field MV) {
    if (C is top right MB) {
      Average the top left block field MV and bottom left block field MV of C and add the
      resulting MV to the set of candidate MVs.
    } else { // C is top left MB
      Average the top right block field MV and bottom right block field MV of C and add the
      resulting MV to the set of candidate MVs.
    }
  }
}
```

```
// Top Left Block MV
if (A exists and A is not intra coded) {
  if (A is 1 MV) {
    Add MV of A to the set of candidate MVs.
  } else if (A is 4 Frame MV) {
    Add the top right block MV of A to the set of candidate MVs.
  } else if (A is 2 Field MV) {
    Average the two field MVs of A and add the resulting MV to the set of candidate MVs.
  } else if (A is 4 Field MV) {
    Average the top right block field MV and bottom right block field MV of A and add the
    resulting MV to the set of candidate MVs.
  }
}
if (B exists and B is not intra coded) {
  if (B is 1 MV) {
    Add MV of B to the set of candidate MVs.
  } else if (B is 4 Frame MV) {
    Add the bottom left block MV of B to the set of candidate MVs.
  } else if (B is 2 Field MV) {
    Average the two field MVs of B and add the resulting MV to the set of candidate MVs.
  } else if (B is 4 Field MV) {
    Average the top left block field MV and bottom left block field MV of B and add the resulting
    MV to the set of candidate MVs.
  }
}
if (C exists and C is not intra coded) {
  if (C is 1 MV) {
    Add MV of C to the set of candidate MVs.
  } else if (C is 4 Frame MV) {
    if (C is top right MB) {
      Add the bottom left block MV of C to the set of candidate MVs.
    } else { // C is top left MB
      Add the bottom right block MV of C to the set of candidate MVs.
    }
  } else if (C is 2 Field MV) {
    Average the two field MVs of C and add the resulting MV to the set of candidate MVs.
  } else if (C is 4 Field MV) {
    if (C is top right MB) {
      Average the top left block field MV and bottom left block field MV of C and add the
      resulting MV to the set of candidate MVs.
    } else { // C is top left MB
      Average the top right block field MV and bottom right block field MV of C and add the
      resulting MV to the set of candidate MVs.
    }
  }
}
```

```
// Top Right Block MV
Add the top left block MV of the current MB to the set of candidate MVs.

if (B exists and B is not intra coded) {
   if (B is 1 MV) {
      Add MV of B to the set of candidate MVs.
   } else if (B is 4 Frame MV) {
      Add the bottom right block MV of B to the set of candidate MVs.
   } else if (B is 2 Field MV) {
      Average the two field MVs of B and add the resulting MV to the set of candidate MVs.
   } else if (B is 4 Field MV) {
      Average the top right block field MV and bottom right
      block field MV of B and add the resulting MV to the set of candidate MVs.
   }
} if (C exists and C is not intra coded) {
   if (C is 1 MV) {
      Add MV of C to the set of candidate MVs.
   } else if (C is 4 Frame MV) {
      if (C is top right MB) {
         Add the bottom left block MV of C to the set of candidate MVs.
      } else { // C is top left MB
         Add the bottom right block MV of C to the set of candidate MVs.
      }
   } else if (C is 2 Field MV) {
      Average the two field MVs of C and add the resulting MV to the set of candidate MVs.
   } else if (C is 4 Field MV) {
      if (C is top right MB) {
         Average the top left block field MV and bottom left block field MV of C and add the
         resulting MV to the set of candidate MVs.
      } else { // C is top left MB
         Average the top right block field MV and bottom right block field MV of C and add the
         resulting MV to the set of candidate MVs.
      }
   }
}
```

```
// Bottom Left Block MV
if (A exists and A is not intra coded) {
    if (A is 1 MV) {
        Add MV of A to the set of candidate MVs.
    } else if (A is 4 Frame MV) {
        Add the bottom right block MV of A to the set of candidate MVs.
    } else if (A is 2 Field MV) {
        Average the two field MVs of A and add the resulting MV to the set of candidate
        MVs.
    } else if (A is 4 Field MV) {
        Average the top right block field MV and bottom right block field MV of A and add the
        resulting MV to the set of candidate MVs.
    }
}

Add the top left block MV of the current MB to the set of candidate MVs.

Add the top right block MV of the current MB to the set of candidate MVs.
```

```
// Bottom Right Block MV
Add the bottom left block MV of the current MB to the set of candidate MVs.

Add the top left block MV of the current MB to the set of candidate MVs.

Add the top right block MV of the current MB to the set of candidate MVs.
```

```
// Top Field MV
if (A exists and A is not intra coded) {
   if (A is 1 MV) {
      Add MV of A to the set of candidate MVs.
   } else if (A is 4 Frame MV) {
      Add the top right block MV of A to the set of candidate MVs.
   } else if (A is 2 Field MV) {
      Add the top field MV of A to the set of candidate MVs.
   } else if (A is 4 Field MV) {
      Add the top right field block MV of A to the set of candidate MVs.
   }
}
if (B exists and B is not intra coded) {
   if (B is 1 MV) {
      Add MV of B to the set of candidate MVs.
   } else if (B is 4 Frame MV) {
      Add the bottom left block MV of B to the set of candidate MVs.
   } else if (B is 2 Field MV) {
      Add the top field MV of B to the set of candidate MVs.
   } else if (B is 4 Field MV) {
      Add the top left field block MV of B to the set of candidate MVs.
   }
}
if (C exists and C is not intra coded) {
   if (C is 1 MV) {
      Add MV of C to the set of candidate MVs.
   } else if (C is 4 Frame MV) {
      if (C is top right MB) {
         Add the bottom left block MV of C to the set of candidate MVs.
      } else { // C is top left MB
         Add the bottom right block MV of C to the set of candidate MVs.
      }
   } else if (C is 2 Field MV) {
      Add the top field MV of C to the set of candidate MVs.
   } else if (C is 4 Field MV) {
      if (C is top right MB) {
         Add the top left field block MV of C to the set of candidate MVs.
      } else { // C is top left MB
         Add the top right field block MV of C to the set of candidate MVs.
      }
   }
}
```

```
// Bottom Field MV
if (A exists and A is not intra coded) {
   if (A is 1 MV) {
      Add MV of A to the set of candidate MVs.
   } else if (A is 4 Frame MV) {
      Add the bottom right block MV of A to the set of candidate MVs.
   } else if (A is 2 Field MV) {
      Add the bottom field MV of A to the set of candidate MVs.
   } else if (A is 4 Field MV) {
      Add the bottom right field block MV of A to the set of candidate MVs.
   }
}
if (B exists and B is not intra coded) {
   if (B is 1 MV) {
      Add MV of B to the set of candidate MVs.
   } else if (B is 4 Frame MV) {
      Add the bottom left block MV of B to the set of candidate MVs.
   } else if (B is 2 Field MV) {
      Add the bottom field MV of B to the set of candidate MVs.
   } else if (B is 4 Field MV) {
      Add the bottom left field block MV of B to the set of candidate MVs.
   }
}
if (C exists and C is not intra coded) {
   if (C is 1 MV) {
      Add MV of C to the set of candidate MVs.
   } else if (C is 4 Frame MV) {
      if (C is top right MB) {
         Add the bottom left block MV of C to the set of candidate MVs.
      } else { // C is top left MB
         Add the bottom right block MV of C to the set of candidate MVs.
      }
   } else if (C is 2 Field MV) {
      Add the bottom field MV of C to the set of candidate MVs.
   } else if (C is 4 Field MV) {
      if (C is top right MB) {
         Add the bottom left field block MV of C to the set of candidate MVs.
      } else { // C is top left MB
         Add the bottom right field block MV of C to the set of candidate MVs.
      }
   }
}
```

```
// Top Left Field Block MV
if (A exists and A is not intra coded) {
   if (A is 1 MV) {
      Add MV of A to the set of candidate MVs.
   } else if (A is 4 Frame MV) {
      Add the top right block MV of A to the set of candidate MVs.
   } else if (A is 2 Field MV) {
      Add the top field MV of A to the set of candidate MVs.
   } else if (A is 4 Field MV) {
      Add the top right field block MV of A to the set of candidate MVs.
   }
}
if (B exists and B is not intra coded) {
   if (B is 1 MV) {
      Add MV of B to the set of candidate MVs.
   } else if (B is 4 Frame MV) {
      Add the bottom left block MV of B to the set of candidate MVs.
   } else if (B is 2 Field MV) {
      Add the top field MV of B to the set of candidate MVs.
   } else if (B is 4 Field MV) {
      Add the top left field block MV of B to the set of candidate MVs.
   }
}
if (C exists and C is not intra coded) {
   if (C is 1 MV) {
      Add MV of C to the set of candidate MVs.
   } else if (C is 4 Frame MV) {
      if (C is top right MB) {
         Add the bottom left block MV of C to the set of candidate MVs.
      } else { // C is top left MB
         Add the bottom right block MV of C to the set of candidate MVs.
      }
   } else if (C is 2 Field MV) {
      Add the top field MV of C to the set of candidate MVs.
   } else if (C is 4 Field MV) {
      if (C is top right MB) {
         Add the top left field block MV of C to the set of candidate MVs.
      } else { // C is top left MB
         Add the top right field block MV of C to the set of candidate MVs.
      }
   }
}
```

```
// Top Right Field Block MV
Add the top left field block MV of the current MB to the set of candidate MVs.

if (B exists and B is not intra coded) {
   if (B is 1 MV) {
      Add MV of B to the set of candidate MVs.
   } else if (B is 4 Frame MV) {
      Add the bottom right block MV of B to the set of candidate MVs.
   } else if (B is 2 Field MV) {
      Add the top field MV of B to the set of candidate MVs.
   } else if (B is 4 Field MV) {
      Add the top right field block MV of B to the set of candidate MVs.
   }
} if (C exists and C is not intra coded) {
   if (C is 1 MV) {
      Add MV of C to the set of candidate MVs.
   } else if (C is 4 Frame MV) {
      if (C is top right MB) {
         Add the bottom left block MV of C to the set of candidate MVs.
      } else { // C is top left MB
         Add the bottom right block MV of C to the set of candidate MVs.
      }
   } else if (C is 2 Field MV) {
      Add the top field MV of C to the set of candidate MVs.
   } else if (C is 4 Field MV) {
      if (C is top right MB) {
         Add the top left field block MV of C to the set of candidate MVs.
      } else { // C is top left MB
         Add the top right field block MV of C to the set of candidate MVs.
      }
   }
}
```

```
// Bottom Left Field Block MV
if (A exists and A is not intra coded) {
    if (A is 1 MV) {
        Add MV of A to the set of candidate MVs.
    } else if (A is 4 Frame MV) {
        Add the bottom right block MV of A to the set of candidate MVs.
    } else if (A is 2 Field MV) {
        Add the bottom field MV of A to the set of candidate MVs.
    } else if (A is 4 Field MV) {
        Add the bottom right field block MV of A to the set of candidate MVs.
    }
}
if (B exists and B is not intra coded) {
    if (B is 1 MV) {
        Add MV of B to the set of candidate MVs.
    } else if (B is 4 Frame MV) {
        Add the bottom left block MV of B to the set of candidate MVs.
    } else if (B is 2 Field MV) {
        Add the bottom field MV of B to the set of candidate MVs.
    } else if (B is 4 Field MV) {
        Add the bottom left field block MV of B to the set of candidate MVs.
    }
}
if (C exists and C is not intra coded) {
    if (C is 1 MV) {
        Add MV of C to the set of candidate MVs.
    } else if (C is 4 Frame MV) {
        if (C is top right MB) {
            Add the bottom left block MV of C to the set of candidate MVs.
        } else { // C is top left MB
            Add the bottom right block MV of C to the set of candidate MVs.
        }
    } else if (C is 2 Field MV) {
        Add the bottom field MV of C to the set of candidate MVs.
    } else if (C is 4 Field MV) {
        if (C is top right MB) {
            Add the bottom left field block MV of C to the set of candidate MVs.
        } else { // C is top left MB
            Add the bottom right field block MV of C to the set of candidate MVs.
        }
    }
}
```

```
// Bottom Right Field Block MV
Add the bottom left field block MV of the current MB to the set of candidate MVs.

if (B exists and B is not intra coded) {
   if (B is 1 MV) {
      Add MV of B to the set of candidate MVs.
   } else if (B is 4 Frame MV) {
      Add the bottom right block MV of B to the set of candidate MVs.
   } else if (B is 2 Field MV) {
      Add the bottom field MV of B to the set of candidate MVs.
   } else if (B is 4 Field MV) {
      Add the bottom right field block MV of B to the set of candidate MVs.
   }
} if (C exists and C is not intra coded) {
   if (C is 1 MV) {
      Add MV of C to the set of candidate MVs.
   } else if (C is 4 Frame MV) {
      if (C is top right MB) {
         Add the bottom left block MV of C to the set of candidate MVs.
      } else { // C is top left MB
         Add the bottom right block MV of C to the set of candidate MVs.
      }
   } else if (C is 2 Field MV) {
      Add the bottom field MV of C to the set of candidate MVs.
   } else if (C is 4 Field MV) {
      if (C is top right MB) {
         Add the bottom left field block MV of C to the set of candidate MVs.
      } else { // C is top left MB
         Add the bottom right field block MV of C to the set of candidate MVs.
      }
   }
}
```

Figure 75

```
if (TotalValidMV >= 2) {
    // Note that if there are only two valid MVs, then the
    // third ValidMV is set to be (0, 0)
    PMVx = median3 (ValidMVx [0], ValidMVx [1], ValidMVx [2]);
    PMVy = median3 (ValidMVy [0], ValidMVy [1], ValidMVy [2]);
} else if (TotalValidMV is 1) {
    PMVx = ValidMVx [0];
    PMVy = ValidMVy [0];
} else {
    PMVx = 0;
    PMVy = 0;
}
```

Figure 76

```
if (TotalValidMV == 3) {
    if (NumSameFieldMV == 3 || NumOppFieldMV == 3) {
        PMVx = median3 (ValidMVx [0], ValidMVx [1], ValidMVx [2]);
        PMVy = median3 (ValidMVy [0], ValidMVy [1], ValidMVy [2]);
    } else if (NumSameFieldMV >= NumOppFieldMV) {
        PMVx = SameFieldMVx [0];
        PMVy = SameFieldMVy [0];
    } else {
        PMVx = OppFieldMVx [0];
        PMVy = OppFieldMVy [0];
    }
} else if (TotalValidMV == 2) {
    if (NumSameFieldMV >= NumOppFieldMV) {
        PMVx = SameFieldMVx [0];
        PMVy = SameFieldMVy [0];
    } else {
        PMVx = OppFieldMVx [0];
        PMVy = OppFieldMVy [0];
    }
} else if (TotalValidMV == 1) {
    PMVx = ValidMVx [0];
    PMVy = ValidMVy [0];
} else {
    PMVx = 0;
    PMVy = 0;
}
```

```
offset_table1[9] = {0, 1, 2, 4, 8, 16, 32, 64, 128,}
offset_table2[9] = {0, 1, 3, 7, 15, 31, 63, 127, 255}
index = vlc_decode()      // Use the Huffman table indicated by MVTAB in
the picture layer
if (index == 71)
{
        dmv_x = get_bits(k_x)
        dmv_y = get_bits(k_y)
}
else
{
    if (extend_x == 1)
       offset_table = offset_table2
    else
       offset_table = offset_table1
index1 = (index + 1) % 9
    if (index1 != 0)
    {
       val = get_bits (index1 + extend_x)
       sign = 0 - (val & 1)
       dmv_x = sign ^ ((val >> 1) + offset_table[index1])
       dmv_x = dmv_x - sign
    }
    else
       dmv_x = 0
    if (extend_y == 1)
       offset_table = offset_table2
    else
       offset_table = offset_table1
index1 = (index + 1) / 9
    if (index1 != 0)
    {
       val = get_bits (index1 + extend_y)
       sign = 0 - (val & 1)
       dmv_y = sign ^ ((val >> 1) + offset_table[index1])
       dmv_y = dmv_y - sign
    }
    else
       dmv_y = 0
}
```

```
offset_table[9] = {0, 1, 2, 4, 8, 16, 32, 64, 128}
index = vlc_decode()      // Use the Huffman table indicated by MVTAB in
the picture layer
if (index == 0) {
        dmv_x = 1 - 2 * get_bits(1)
        dmv_y = 0
}
if (index == 125)
{
        dmv_x = get_bits(k_x - halfpel_flag)
        dmv_y = get_bits(k_y - halfpel_flag)
}
else
{
index1 = (index + 1) % 9
     val = get_bits (index1)
     sign = 0 - (val & 1)
     dmv_x = sign ^ ((val >> 1) + offset_table[index1])
     dmv_x = dmv_x - sign index1 = (index + 1) / 9
     val = get_bits (index1)
     sign = 0 - (val & 1)
     dmv_y = sign ^ ((val >> 1) + offset_table[index1])
     dmv_y = dmv_y - sign
}
```

```
Int s_RndTbl [] = {0, 0, 0, 1};
Int s_RndTblField [] = {0, 0, 1, 2, 4, 4, 5, 6, 2, 2, 3, 8, 6, 6, 7, 12};
CMVX = (LMVX + s_RndTbl[LMVX & 3]) >> 1;
if (LMV is a field motion vector) {
CMVY = (LMVY >> 4)*8 + s_RndTblField [LMVY & 0xF];
    } else {
        CMVY = (LMVY + s_RndTbl[LMVY & 3]) >> 1;
        }
```

7900

7901

7902

BITPLANE CODING OF PREDICTION MODE INFORMATION IN BI-DIRECTIONALLY PREDICTED INTERLACED PICTURES

RELATED APPLICATION INFORMATION

This application is a divisional of U.S. patent application Ser. No. 10/882,135, entitled, "Advanced Bi-directional Predictive Coding of Interlaced Video," filed Jun. 29, 2004, which claims the benefit of U.S. Provisional Patent Application No. 60/501,081, entitled "Video Encoding and Decoding Tools and Techniques," filed Sep. 7, 2003, both of which are hereby incorporated by reference.

The following co-pending U.S. patent applications relate to the present application and are hereby incorporated by reference: 1) U.S. patent application Ser. No. 10/622,378, entitled, "Advanced Bi-Directional Predictive Coding of Video Frames," filed Jul. 18, 2003; 2) U.S. patent application Ser. No. 10/622,284, entitled, "Intraframe and Interframe Interlace Coding and Decoding," filed Jul. 18, 2003; 3) U.S. patent application Ser. No. 10/622,841, entitled, "Coding of Motion Vector Information," filed Jul. 18, 2003; and 4) U.S. patent application Ser. No. 10/857,453, entitled, "Predicting Motion Vectors for Fields of Forward-predicted Interlaced Video Frames," filed May 27, 2004.

TECHNICAL FIELD

Techniques and tools for interlaced video coding and decoding are described. For example, a video encoder encodes bi-directionally predicted macroblocks in interlaced video.

BACKGROUND

Digital video consumes large amounts of storage and transmission capacity. A typical raw digital video sequence includes 15 or 30 pictures per second. Each picture can include tens or hundreds of thousands of pixels (also called pels). Each pixel represents a tiny element of the picture. In raw form, a computer commonly represents a pixel with 24 bits or more. Thus, the number of bits per second, or bit rate, of a typical raw digital video sequence can be 5 million bits/second or more.

Most computers and computer networks lack the resources to process raw digital video. For this reason, engineers use compression (also called coding or encoding) to reduce the bit rate of digital video. Compression can be lossless, in which quality of the video does not suffer but decreases in bit rate are limited by the complexity of the video. Or, compression can be lossy, in which quality of the video suffers but decreases in bit rate are more dramatic. Decompression reverses compression.

In general, video compression techniques include "intra" compression and "inter" or predictive compression. Intra compression techniques compress individual pictures, typically called I-frames or key frames. Inter compression techniques compress frames with reference to preceding and/or following frames, and inter-compressed frames are typically called predicted frames, P-frames, or B-frames.

I. Inter Compression in Windows Media Video, Versions 8 and 9

Microsoft Corporation's Windows Media Video, Version 8 ["WMV8"] includes a video encoder and a video decoder. The WMV8 encoder uses intra and inter compression, and the WMV8 decoder uses intra and inter decompression. Windows Media Video, Version 9 ["WMV9"] uses a similar architecture for many operations.

Inter compression in the WMV8 encoder uses block-based motion compensated prediction coding followed by transform coding of the residual error. FIGS. 1 and 2 illustrate the block-based inter compression for a predicted frame in the WMV8 encoder. In particular, FIG. 1 illustrates motion estimation for a predicted frame 110 and FIG. 2 illustrates compression of a prediction residual for a motion-compensated block of a predicted frame.

For example, in FIG. 1, the WMV8 encoder computes a motion vector for a macroblock 115 in the predicted frame 110. To compute the motion vector, the encoder searches in a search area 135 of a reference frame 130. Within the search area 135, the encoder compares the macroblock 115 from the predicted frame 110 to various candidate macroblocks in order to find a candidate macroblock that is a good match. The encoder outputs information specifying the motion vector (entropy coded) for the matching macroblock.

Since a motion vector value is often correlated with the values of spatially surrounding motion vectors, compression of the data used to transmit the motion vector information can be achieved by selecting a motion vector predictor from neighboring macroblocks and predicting the motion vector for the current macroblock using the predictor. The encoder can encode the differential between the motion vector and the predictor. After reconstructing the motion vector by adding the differential to the predictor, a decoder uses the motion vector to compute a prediction macroblock for the macroblock 115 using information from the reference frame 130, which is a previously reconstructed frame available at the encoder and the decoder. The prediction is rarely perfect, so the encoder usually encodes blocks of pixel differences (also called the error or residual blocks) between the prediction macroblock and the macroblock 115 itself.

FIG. 2 illustrates an example of computation and encoding of an error block 235 in the WMV8 encoder. The error block 235 is the difference between the predicted block 215 and the original current block 225. The encoder applies a discrete cosine transform ["DCT"] 240 to the error block 235, resulting in an 8×8 block 245 of coefficients. The encoder then quantizes 250 the DCT coefficients, resulting in an 8×8 block of quantized DCT coefficients 255. The encoder scans 260 the 8×8 block 255 into a one-dimensional array 265 such that coefficients are generally ordered from lowest frequency to highest frequency. The encoder entropy encodes the scanned coefficients using a variation of run length coding 270. The encoder selects an entropy code from one or more run/level/last tables 275 and outputs the entropy code.

FIG. 3 shows an example of a corresponding decoding process 300 for an inter-coded block. In summary of FIG. 3, a decoder decodes (310, 320) entropy-coded information representing a prediction residual using variable length decoding 310 with one or more run/level/last tables 315 and run length decoding 320. The decoder inverse scans 330 a one-dimensional array 325 storing the entropy-decoded information into a two-dimensional block 335. The decoder inverse quantizes and inverse discrete cosine transforms (together, 340) the data, resulting in a reconstructed error block 345. In a separate motion compensation path, the decoder computes a predicted block 365 using motion vector information 355 for displacement from a reference frame. The decoder combines 370 the predicted block 365 with the reconstructed error block 345 to form the reconstructed block 375.

The amount of change between the original and reconstructed frames is the distortion and the number of bits required to code the frame indicates the rate for the frame. The amount of distortion is roughly inversely proportional to the rate.

II. Interlaced Video and Progressive Video

A video frame contains lines of spatial information of a video signal. For progressive video, these lines contain samples starting from one time instant and continuing through successive lines to the bottom of the frame. A progressive I-frame is an intra-coded progressive video frame. A progressive P-frame is a progressive video frame coded using forward prediction, and a progressive B-frame is a progressive video frame coded using bi-directional prediction.

A typical interlaced video frame consists of two fields scanned starting at different times. For example, referring to FIG. 4, an interlaced video frame 400 includes top field 410 and bottom field 420. Typically, the even-numbered lines (top field) are scanned starting at one time (e.g., time t) and the odd-numbered lines (bottom field) are scanned starting at a different (typically later) time (e.g., time t+1). This timing can create jagged tooth-like features in regions of an interlaced video frame where motion is present because the two fields are scanned starting at different times. For this reason, interlaced video frames can be rearranged according to a field structure, with the odd lines grouped together in one field, and the even lines grouped together in another field. This arrangement, known as field coding, is useful in high-motion pictures for reduction of such jagged edge artifacts. On the other hand, in stationary regions, image detail in the interlaced video frame may be more efficiently preserved without such a rearrangement. Accordingly, frame coding is often used in stationary or low-motion interlaced video frames, in which the original alternating field line arrangement is preserved.

A typical progressive video frame consists of one frame of content with non-alternating lines. In contrast to interlaced video, progressive video does not divide video frames into separate fields, and an entire frame is scanned left to right, top to bottom starting at a single time.

III. P-frame Coding and Decoding in a Previous WMV Encoder and Decoder

A previous WMV encoder and decoder use progressive and interlace coding and decoding in P-frames. In interlaced and progressive P-frames, a motion vector is encoded in the encoder by computing a differential between the motion vector and a motion vector predictor, which is computed based on neighboring motion vectors. And, in the decoder, the motion vector is reconstructed by adding the motion vector differential to the motion vector predictor, which is again computed (this time in the decoder) based on neighboring motion vectors. A predictor for the current macroblock or field of the current macroblock is selected based on the candidate predictors, and a motion vector differential is calculated based on the predictor. The motion vector can be reconstructed by adding the motion vector differential to the selected motion vector predictor at either the encoder or the decoder side. Typically, luminance motion vectors are reconstructed from the encoded motion information, and chrominance motion vectors are derived from the reconstructed luminance motion vectors.

A. Progressive P-frame Coding and Decoding

For example, in a previous WMV encoder and decoder, progressive P-frames can contain macroblocks encoded in one motion vector (1MV) mode or in four motion vector (4MV) mode, or skipped macroblocks, with a decision generally made on a macroblock-by-macroblock basis. P-frames with only 1MV macroblocks (and, potentially, skipped macroblocks) are referred to as 1MV P-frames, and P-frames with both 1MV and 4MV macroblocks (and, potentially, skipped macroblocks) are referred to as Mixed-MV P-frames. One motion vector is associated with each 1MV macroblock, and four motion vectors are associated with each 4MV macroblock (one for each block).

FIGS. 5A and 5B are diagrams showing the locations of macroblocks considered for candidate motion vector predictors for a macroblock in a 1MV progressive P-frame. The candidate predictors are taken from the left, top and top-right macroblocks, except in the case where the macroblock is the last macroblock in the row. In this case, Predictor B is taken from the top-left macroblock instead of the top-right. For the special case where the frame is one macroblock wide, the predictor is always Predictor A (the top predictor). When Predictor A is out of bounds because the macroblock is in the top row, the predictor is Predictor C. Various other rules address other special cases such as intra-coded predictors.

FIGS. 6A-10 show the locations of the blocks or macroblocks considered for the up-to-three candidate motion vectors for a motion vector for a 1MV or 4MV macroblock in a Mixed-MV frame. In the following figures, the larger squares are macroblock boundaries and the smaller squares are block boundaries. For the special case where the frame is one macroblock wide, the predictor is always Predictor A (the top predictor). Various other rules address other special cases such as top row blocks for top row 4MV macroblocks, top row 1MV macroblocks, and intra-coded predictors.

FIGS. 6A and 6B are diagrams showing locations of blocks considered for candidate motion vector predictors for a 1MV current macroblock in a Mixed-MV frame. The neighboring macroblocks may be 1MV or 4MV macroblocks. FIGS. 6A and 6B show the locations for the candidate motion vectors assuming the neighbors are 4MV (i.e., predictor A is the motion vector for block 2 in the macroblock above the current macroblock, and predictor C is the motion vector for block 1 in the macroblock immediately to the left of the current macroblock). If any of the neighbors is a 1MV macroblock, then the motion vector predictor shown in FIGS. 5A and 5B is taken to be the motion vector predictor for the entire macroblock. As FIG. 6B shows, if the macroblock is the last macroblock in the row, then Predictor B is from block 3 of the top-left macroblock instead of from block 2 in the top-right macroblock as is the case otherwise.

FIGS. 7A-10 show the locations of blocks considered for candidate motion vector predictors for each of the 4 luminance blocks in a 4MV macroblock. FIGS. 7A and 7B are diagrams showing the locations of blocks considered for candidate motion vector predictors for a block at position 0; FIGS. 8A and 8B are diagrams showing the locations of blocks considered for candidate motion vector predictors for a block at position 1; FIG. 9 is a diagram showing the locations of blocks considered for candidate motion vector predictors for a block at position 2; and FIG. 10 is a diagram showing the locations of blocks considered for candidate motion vector predictors for a block at position 3. Again, if a neighbor is a 1MV macroblock, the motion vector predictor for the macroblock is used for the blocks of the macroblock.

For the case where the macroblock is the first macroblock in the row, Predictor B for block 0 is handled differently than block 0 for the remaining macroblocks in the row (see FIGS. 7A and 7B). In this case, Predictor B is taken from block 3 in the macroblock immediately above the current macroblock instead of from block 3 in the macroblock above and to the left of current macroblock, as is the case otherwise. Similarly, for the case where the macroblock is the last macroblock in the row, Predictor B for block 1 is handled differently (FIGS. 8A and 8B). In this case, the predictor is taken from block 2 in the macroblock immediately above the current macroblock instead of from block 2 in the macroblock above and to the right of the current macroblock, as is the case otherwise. In general, if the macroblock is in the first macroblock column, then Predictor C for blocks 0 and 2 are set equal to 0.

B. Interlaced P-frame Coding and Decoding in a Previous WMV Encoder and Decoder

A previous WMV encoder and decoder use a 4:1:1 macroblock format for interlaced P-frames, which can contain macroblocks encoded in field mode or in frame mode, or skipped macroblocks, with a decision generally made on a macroblock-by-macroblock basis. Two motion vectors are associated with each field-coded macroblock (one motion vector per field), and one motion vector is associated with each frame-coded macroblock. An encoder jointly encodes motion information, including horizontal and vertical motion vector differential components, potentially along with other signaling information.

FIGS. 11 and 12A-B show examples of candidate predictors for motion vector prediction for frame-coded 4:1:1 macroblocks and field-coded 4:1:1 macroblocks, respectively, in interlaced P-frames in a previous WMV encoder and decoder. FIG. 11 shows candidate predictors A, B and C for a current frame-coded 4:1:1 macroblock in an interior position in an interlaced P-frame (not the first or last macroblock in a macroblock row, not in the top row). Predictors can be obtained from different candidate directions other than those labeled A, B, and C (e.g., in special cases such as when the current macroblock is the first macroblock or last macroblock in a row, or in the top row, since certain predictors are unavailable for such cases). For a current frame-coded macroblock, predictor candidates are calculated differently depending on whether the neighboring macroblocks are field-coded or frame-coded. For a neighboring frame-coded macroblock, the motion vector is simply taken as the predictor candidate. For a neighboring field-coded macroblock, the candidate motion vector is determined by averaging the top and bottom field motion vectors.

FIGS. 12A-B show candidate predictors A, B and C for a current field in a field-coded 4:1:1 macroblock in an interior position in the field. In FIG. 12A, the current field is a bottom field, and the bottom field motion vectors in the neighboring macroblocks are used as candidate predictors. In FIG. 12B, the current field is a top field, and the top field motion vectors in the neighboring macroblocks are used as candidate predictors. Thus, for each field in a current field-coded macroblock, the number of motion vector predictor candidates for each field is at most three, with each candidate coming from the same field type (e.g., top or bottom) as the current field. Again, various special cases (not shown) apply when the current macroblock is the first macroblock or last macroblock in a row, or in the top row, since certain predictors are unavailable for such cases.

To select a predictor from a set of predictor candidates, the previous WMV encoder and decoder in question use different selection algorithms, such as a median-of-three algorithm or a median-of-four algorithm. A procedure for median-of-three prediction is described in pseudo-code 1300 in FIG. 13. A procedure for median-of-four prediction is described in pseudo-code 1400 in FIG. 14.

IV. Bi-directional Prediction

Bi-directionally predicted frames (or B-frames) use two frames from the source video as reference (or anchor) frames rather than the one anchor used in P-frames. Among anchor frames for a typical B-frame, one anchor frame is from the temporal past and one anchor frame is from the temporal future. Referring to FIG. 15, a B-frame 1510 in a video sequence has a temporally previous reference frame 1520 and a temporally future reference frame 1530. Use of B-frames provides benefits for efficient compression in terms of greater bit rate economy (e.g., in the presence of certain types movement, such as occlusion). Encoded bit streams with B-frames typically use less bits than encoded bit streams with no B-frames, while providing similar visual quality. B-frames also provide more options and flexibility when used in a small device space. For example, a decoder can accommodate space and time restrictions by opting not to decode or display B-frames, since B-frames are not generally used as reference frames. Estimates for rate-distortion improvement in video sequences using B-frames range from 0 through 50%.

V. B-frame Coding and Decoding in a Previous WMV Encoder and Decoder

A previous WMV encoder and decoder use B-frames. While macroblocks in forward-predicted frames (e.g., P-frames) have only one directional mode of prediction (forward, from previous I- or P-frames), macroblocks in B-frames can be predicted using five different prediction modes: forward, backward, direct, interpolated and intra. The encoder selects and signals different prediction modes in the bit stream. For example, the previous WMV encoder in question sends a compressed bitplane at frame level indicating a direct/non-direct mode decision for each macroblock of a B-frame, while non-direct modes (such as forward, backward and interpolated modes) are indicated at macroblock level.

Forward mode is similar to conventional P-frame prediction. In forward mode, a macroblock is derived from a temporally previous anchor. In backward mode, a macroblock is derived from a temporally subsequent anchor. Macroblocks predicted in direct or interpolated modes use both forward and backward anchors for prediction. The direct and interpolated modes use round-up averaging for combining the pixel values of the two references into one set of macroblock pixels according to the following equation:

Average pixel value=(Forward interp. value+Backward interp. value+1)>>1

A. Fraction Coding and Scaling of Co-located Motion Vectors

In the previous WMV encoder and decoder in question, the encoder implicitly derives direct mode motion vectors by scaling a co-located motion vector for the forward anchor. The scaling operation depends on the temporal position of the current B-frame relative to its anchors. To encode the temporal position of a reference picture, the encoder uses fraction coding.

In fraction coding, the encoder explicitly codes a temporal position for a current B-frame as a fraction of the distance between its two anchors. The variable BFRACTION is used to represent different fractions and is sent at frame level. The fraction takes on a limited set of discrete values between 0 and 1. For direct mode motion vectors, the encoder and decoder use this fraction to scale a co-located motion vector (MV) in a reference frame, thereby deriving implied direct mode motion vectors ($MV_F$ and $MV_B$) for the current B-frame by implementing the following scaling operations:

$$MV_F \times \text{Fraction} * MV$$

$$MV_B = (\text{Fraction}-1) * MV$$

FIG. 16 shows how fraction coding allows the encoder to arbitrarily scale the motion between surrounding reference frames. To derive $MV_F$ and $MV_B$ for the current macroblock 1610 being encoded in the B-frame 1620, the encoder and decoder scale the motion vector (MV) of the corresponding macroblock in the future reference frame 1630 using fraction coding. In the example shown in FIG. 16, for the fractions p and q, p+q=1. The encoder and decoder use the two implied motion vectors to address macroblocks in the previous reference frame 1640 and the future reference frame 1630, and uses the average of these to predict the current macroblock 1610. For example, in FIG. 16, $MV_F=(dx*p, dy*p)$ and $MV_B=(-dx*q, -dy*q)$.

Table 1700 in FIG. 17 is a variable-length code (VLC) table for the bitstream element BFRACTION. In the example shown in table 1700, the 3-bit code words are the "short" code words, and the 7-bit code words are the "long" code words. The decoder finds a scaling factor based on the numerator and denominator of the fraction according to the pseudo-code 1800 shown in FIG. 18.

Once the scaling factor has been determined, the decoder uses it to scale the x- and y-elements of the motion vector for the co-located macroblock. Given that the subsequent anchor frame was a P-frame (for I-frames, all the motion vectors are assumed to be (0, 0)) and that the co-located macroblock contains a motion vector (MV_X, MV_Y), the decoder derives two motion vectors, with one ($MV\_X_F$, $MV\_Y_F$) referencing the forward (previous) anchor frame, and the other ($MV\_X_B$, $MV\_Y_B$) referencing the backward (subsequent) anchor frame.

The decoder performs the scaling according to the pseudo-code 1900 shown in FIG. 19. In the function Scale_Direct_MV in pseudo-code 1900, the inputs MV_X and MV_Y are the x- and y-elements of the motion vector from the co-located macroblock of the future reference picture, and the outputs $MV\_X_F$, $MV\_Y_F$, $MV\_X_B$ and $MV\_Y_B$ are the x- and y-elements of the forward and backward pointing motion vectors for the macroblock being decoded.

B. B/I Frames

The previous WMV encoder and decoder in question also use intra B-frames ("B/I-frames") in progressive coding and decoding. B/I-frames are coded like I-frames, in that they do not depend on reference frames. But unlike I-frames, B/I-frames are not key frames; other frames are not permitted to use B/I-frames as anchors.

C. Interlaced B-frames

The previous WMV encoder and decoder in question also use interlaced B-frames. Macroblocks in interlaced B-frames can be field-coded or frame-coded. Frame-coded macroblocks can have one, two (e.g., forward and backward motion vectors for interpolated mode, derived forward and backward motion vectors for direct mode), or no motion vectors, and field-coded macroblocks can have up to four motion vectors, depending on prediction mode. For example, in a direct mode field-coded macroblock, four implicit motion vectors are derived: a forward and a backward motion vector for the top field, and a forward and a backward motion vector for the bottom field.

Although the previous WMV encoder and decoder in question use interlaced B-frames, they are limited in several important ways. For example, only one macroblock prediction mode (e.g., direct mode, forward mode, etc.) is allowed per macroblock, 4MV coding (i.e., one motion vector for each block of a macroblock) is not used, and no part of any B-frame can be a reference for motion compensation for any frame. As another example, interlaced coding and decoding in the previous WMV encoder and decoder in question (including interlaced B-frames) is performed using only a 4:1:1 macroblock format.

VI. Standards for Video Compression and Decompression

Aside from previous WMV encoders and decoders, several international standards relate to video compression and decompression. These standards include the Motion Picture Experts Group ["MPEG"] 1, 2, and 4 standards and the H.261, H.262, H.263, and H.264 standards from the International Telecommunication Union ["ITU"]. One of the primary methods used to achieve data compression of digital video sequences in the international standards is to reduce the temporal redundancy between pictures. These popular compression schemes (MPEG-1, MPEG-2, MPEG-4, H.261, H.263, etc) use motion estimation and compensation. For example, a current frame is divided into uniform square regions (e.g., blocks and/or macroblocks). A matching region for each current region is specified by sending motion vector information for the region. The motion vector indicates the location of the region in a previously coded (and reconstructed) frame that is to be used as a predictor for the current region. A pixel-by-pixel difference, called the error signal, between the current region and the region in the reference frame is derived. This error signal usually has lower entropy than the original signal. Therefore, the information can be encoded at a lower rate. As in previous WMV encoders and decoders, since a motion vector value is often correlated with spatially surrounding motion vectors, compression of the data used to represent the motion vector information can be achieved by coding the differential between the current motion vector and a predictor based upon previously coded, neighboring motion vectors.

Some international standards describe motion estimation and compensation in interlaced video frames. The H.262 standard allows an interlaced video frame to be encoded as a single frame or as two fields, where the frame encoding or field encoding can be adaptively selected on a frame-by-frame basis. The H.262 standard describes field-based prediction, which is a prediction mode using only one field of a reference frame. The H.262 standard also describes dual-prime prediction, which is a prediction mode in which two forward field-based predictions are averaged for a 16×16 block in an interlaced P-picture. Section 7.6 of the H.262 standard describes "field prediction," including selecting between two reference fields to use for motion compensation for a macroblock of a current field of an interlaced video frame. Section 7.6.3 describes motion vector prediction and reconstruction, in which a reconstructed motion vector for a given macroblock becomes the motion vector predictor for a subsequently encoded/decoded macroblock. Such motion vector prediction fails to adequately predict motion vectors for macroblocks of fields of interlaced video frames in many cases.

In addition, Section 7.6 of the H.262 standard describes "field prediction" and "frame prediction" of B-pictures. In field prediction and frame prediction, prediction is performed for B-pictures using the two most recently reconstructed reference frames (omitting other intervening B-pictures), which may have been coded as either two fields or as a single frame.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

In summary, the detailed description is directed to various techniques and tools for encoding and decoding bi-directionally predicted interlaced video frames (e.g., interlaced B-fields, interlaced B-frames). Described techniques and tools improve rate/distortion performance and facilitate better support for devices with lower CPU resources (e.g., in devices with smaller form factors).

Described embodiments implement one or more of the described techniques and tools for coding and/or decoding interlaced B-pictures including, but not limited to, the following:

In one aspect, for interlaced B-fields, an encoder sends binary information indicating whether a prediction mode is forward or not-forward for one or more macroblocks in an interlaced B-field. For example, the encoder sends forward/not-forward decision information at B-field level in a compressed bitplane. Sending forward/not-forward prediction mode decision information in a compressed bitplane at B-field level can reduce coding overhead for prediction mode coding. A decoder performs corresponding decoding.

The various techniques and tools can be used in combination or independently.

Additional features and advantages will be made apparent from the following detailed description of different embodiments that proceeds with reference to the accompanying drawings.

BRIEF DESCRIPTION OF THE DRAWINGS

FIG. 1 is a diagram showing motion estimation in a video encoder according to the prior art.

FIG. 2 is a diagram showing block-based compression for an 8×8 block of prediction residuals in a video encoder according to the prior art.

FIG. 3 is a diagram showing block-based decompression for an 8×8 block of prediction residuals in a video encoder according to the prior art.

FIG. 4 is a diagram showing an interlaced frame according to the prior art.

FIGS. 5A and 5B are diagrams showing locations of macroblocks for candidate motion vector predictors for a 1MV macroblock in a progressive P-frame according to the prior art.

FIGS. 6A and 6B are diagrams showing locations of blocks for candidate motion vector predictors for a 1MV macroblock in a mixed 1MV/4MV progressive P-frame according to the prior art.

FIGS. 7A, 7B, 8A, 8B, 9, and 10 are diagrams showing the locations of blocks for candidate motion vector predictors for a block at various positions in a 4MV macroblock in a mixed 1MV/4MV progressive P-frame according to the prior art.

FIG. 11 is a diagram showing candidate motion vector predictors for a current frame-coded macroblock in an interlaced P-frame according to the prior art.

FIGS. 12A-12B are diagrams showing candidate motion vector predictors for a current field-coded macroblock in an interlaced P-frame according to the prior art.

FIGS. 13 and 14 are code diagrams showing pseudo-code for performing median-of-3 and median-of-4 calculations, respectively, according to the prior art.

FIG. 15 is a diagram showing a B-frame with past and future reference frames according to the prior art.

FIG. 16 is a diagram showing direct mode prediction with fraction coding according to the prior art.

FIG. 17 shows a VLC table for the bitstream element BFRACTION according to the prior art.

FIGS. 18 is a code listing showing pseudo-code for finding a scaling factor for scaling a motion vector for a co-located macroblock in direct mode prediction according to the prior art.

FIGS. 19 is a code listing showing pseudo-code for scaling the x- and y-elements of a motion vector in a co-located macroblock according to a scaling factor according to the prior art.

FIGS. 25 and 26 are diagrams showing interlaced P-fields having two reference fields.

FIGS. 33A-33F are code listings showing pseudo-code for calculating motion vector predictors in two-reference field interlaced P- or B-fields.

FIGS. 34A-34B are code listings showing pseudo-code for scaling a predictor from one field to derive a predictor from another field.

FIGS. 35 and 36 are tables showing scaling operation values associated with different reference frame distances.

FIG. 37 is a diagram showing motion vectors for luminance blocks and derived motion vectors for chrominance blocks in a 2 field MV macroblock of an interlaced P-frame.

FIG. 38 is a diagram showing different motion vectors for each of four luminance blocks, and derived motion vectors for each of four chrominance sub-blocks, in a 4 frame MV macroblock of an interlaced P-frame.

FIG. 39 is a diagram showing motion vectors for luminance blocks and derived motion vectors for chrominance blocks in a 4 field MV macroblock of an interlaced P-frame.

FIGS. 40A-40B are diagrams showing candidate predictors for a current macroblock of an interlaced P-frame.

FIG. 41 is a flow chart showing a technique for predicting motion vectors for individual fields in a field-coded macroblock in an interlaced B-frame using different prediction modes.

FIG. 47 is a code listing showing pseudo-code describing the polarity selection process for real value buffering and hole-filling in interlaced B-field motion vector prediction.

FIGS. 48A-48B are code listings showing pseudo-code for scaling a predictor from one field to derive a predictor from another field for a backward-predicted interlaced B-field.

FIG. 49 is a table showing scaling operation values associated with different reference frame distances for a first interlaced B-field.

FIG. 53 is a code listing showing pseudo-code describing a selection process for a motion vector to use as a basis for direct mode motion vectors in interlace B-fields.

FIGS. 61A-61B are code listings showing pseudo-code for decoding motion vector differential and dominant/non-dominant predictor information in a combined implementation.

FIGS. 62A-62F are code listings showing pseudo-code for calculating motion vector predictors in two-reference interlaced P-fields in a combined implementation.

FIG. 64 is a code listing showing pseudo-code for collecting candidate motion vectors for 1MV macroblocks in an interlaced P-frame in a combined implementation.

FIGS. 65, 66, 67, and 68 are code listings showing pseudo-code for collecting candidate motion vectors for 4 Frame MV macroblocks in an interlaced P-frame in a combined implementation.

FIGS. 69 and 70 are code listings showing pseudo-code for collecting candidate motion vectors for 2 Field MV macroblocks in an interlaced P-frame in a combined implementation.

FIGS. 71, 72, 73, and 74 are code listings showing pseudo-code for collecting candidate motion vectors for 4 Field MV macroblocks in an interlaced P-frame in a combined implementation.

FIG. 75 is a code listing showing pseudo-code for computing motion vector predictors for frame motion vectors in an interlaced P-frame in a combined implementation.

FIG. 76 is a code listing showing pseudo-code for computing motion vector predictors for field motion vectors in an interlaced P-frame in a combined implementation.

FIG. 77A and 77B are code listings showing pseudo-code for decoding a motion vector differential for an interlaced P-frames and B-frames in a combined implementation.

DETAILED DESCRIPTION

The present application relates to techniques and tools for efficient compression and decompression of interlaced video. In various described embodiments, a video encoder and decoder incorporate techniques for encoding and decoding bi-directionally predicted interlaced video frames, and corresponding signaling techniques for use with a bit stream format or syntax comprising different layers or levels (e.g., sequence level, frame level, field level, macroblock level, and/or block level).

Various alternatives to the implementations described herein are possible. For example, techniques described with reference to flowchart diagrams can be altered by changing the ordering of stages shown in the flowcharts, by repeating or omitting certain stages, etc. As another example, although some implementations are described with reference to specific macroblock formats, other formats also can be used. Further, techniques and tools described with reference to bidirectional prediction may also be applicable to other types of prediction.

The various techniques and tools can be used in combination or independently. Different embodiments implement one or more of the described techniques and tools. Some techniques and tools described herein can be used in a video encoder or decoder, or in some other system not specifically limited to video encoding or decoding.

I. Computing Environment

Figure 20:
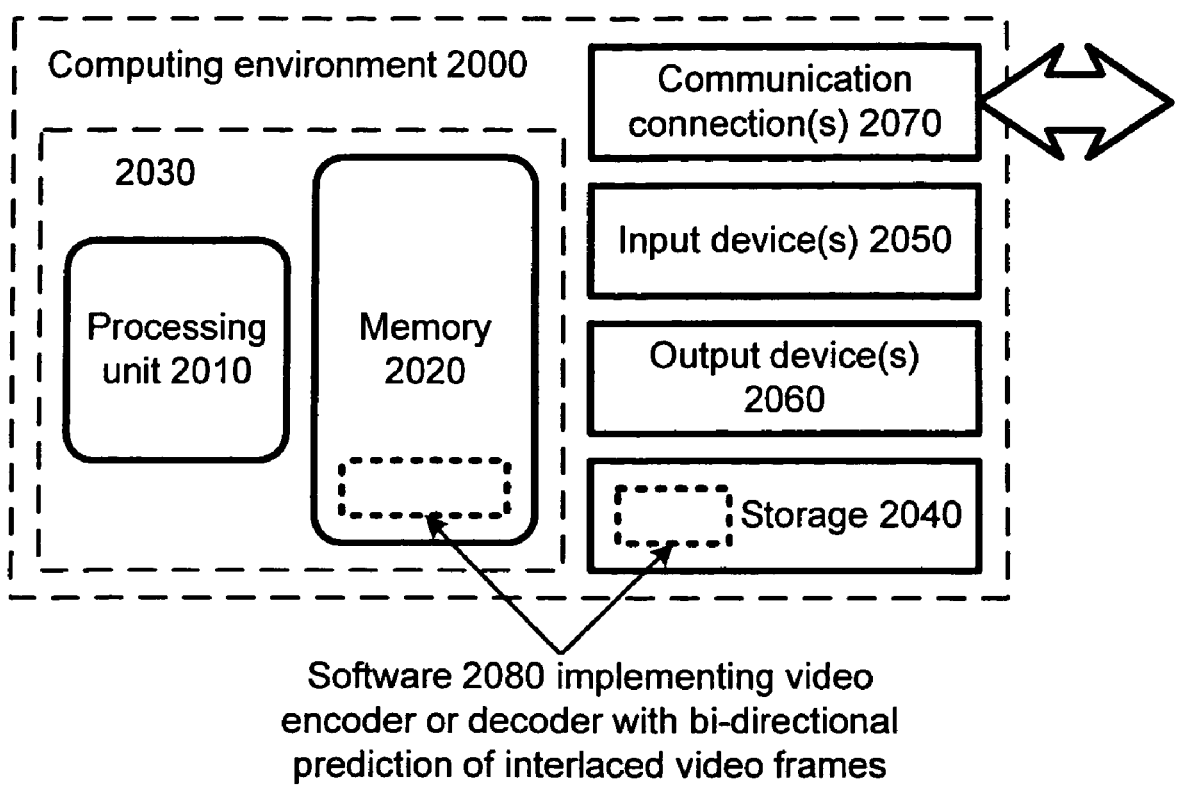
FIG. 20 is a block diagram of a suitable computing environment in conjunction with which several described embodiments may be implemented.

FIG. 20 illustrates a generalized example of a suitable computing environment 2000 in which several of the described embodiments may be implemented. The computing environment 2000 is not intended to suggest any limitation as to scope of use or functionality, as the techniques and tools may be implemented in diverse general-purpose or special-purpose computing environments.

With reference to FIG. 20, the computing environment 2000 includes at least one processing unit 2010 and memory 2020. In FIG. 20, this most basic configuration 2030 is included within a dashed line. The processing unit 2010 executes computer-executable instructions and may be a real or a virtual processor. In a multi-processing system, multiple processing units execute computer-executable instructions to increase processing power. The memory 2020 may be volatile memory (e.g., registers, cache, RAM), non-volatile memory (e.g., ROM, EEPROM, flash memory, etc.), or some combination of the two. The memory 2020 stores software 2080 implementing a video encoder or decoder with bidirectional prediction of interlaced video frames.

A computing environment may have additional features. For example, the computing environment 2000 includes storage 2040, one or more input devices 2050, one or more output devices 2060, and one or more communication connections 2070. An interconnection mechanism (not shown) such as a bus, controller, or network interconnects the components of the computing environment 2000. Typically, operating system software (not shown) provides an operating environment for other software executing in the computing environment 2000, and coordinates activities of the components of the computing environment 2000.

The storage 2040 may be removable or non-removable, and includes magnetic disks, magnetic tapes or cassettes, CD-ROMs, DVDs, or any other medium which can be used to store information and which can be accessed within the computing environment 2000. The storage 2040 stores instructions for the software 2080 implementing the video encoder or decoder.

The input device(s) 2050 may be a touch input device such as a keyboard, mouse, pen, or trackball, a voice input device, a scanning device, or another device that provides input to the computing environment 2000. For audio or video encoding, the input device(s) 2050 may be a sound card, video card, TV tuner card, or similar device that accepts audio or video input in analog or digital form, or a CD-ROM or CD-RW that reads audio or video samples into the computing environment 2000. The output device(s) 2060 may be a display, printer, speaker, CD-writer, or another device that provides output from the computing environment 2000.

The communication connection(s) 2070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 2000, computer-readable media include memory 2020, storage 2040, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "estimate," "compensate," "predict," and "apply" to describe computer operations in a computing environment. These terms are high-level abstractions for operations performed by a computer, and should not be confused with acts performed by a human being. The actual computer operations corresponding to these terms vary depending on implementation.

II. Generalized Video Encoder and Decoder

Figure 21:
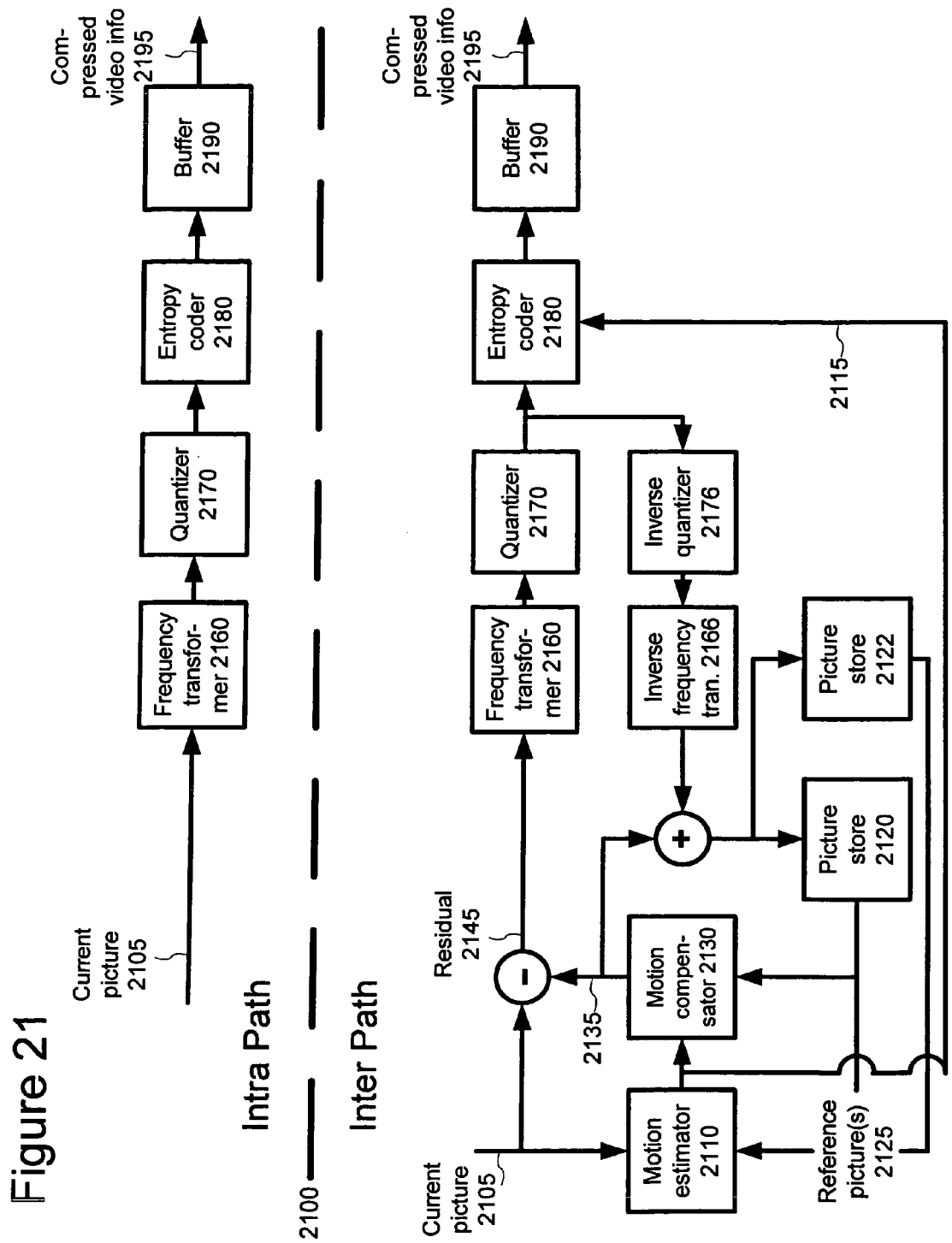
FIG. 21 is a block diagram of a generalized video encoder system in conjunction with which several described embodiments may be implemented.
Figure 22:
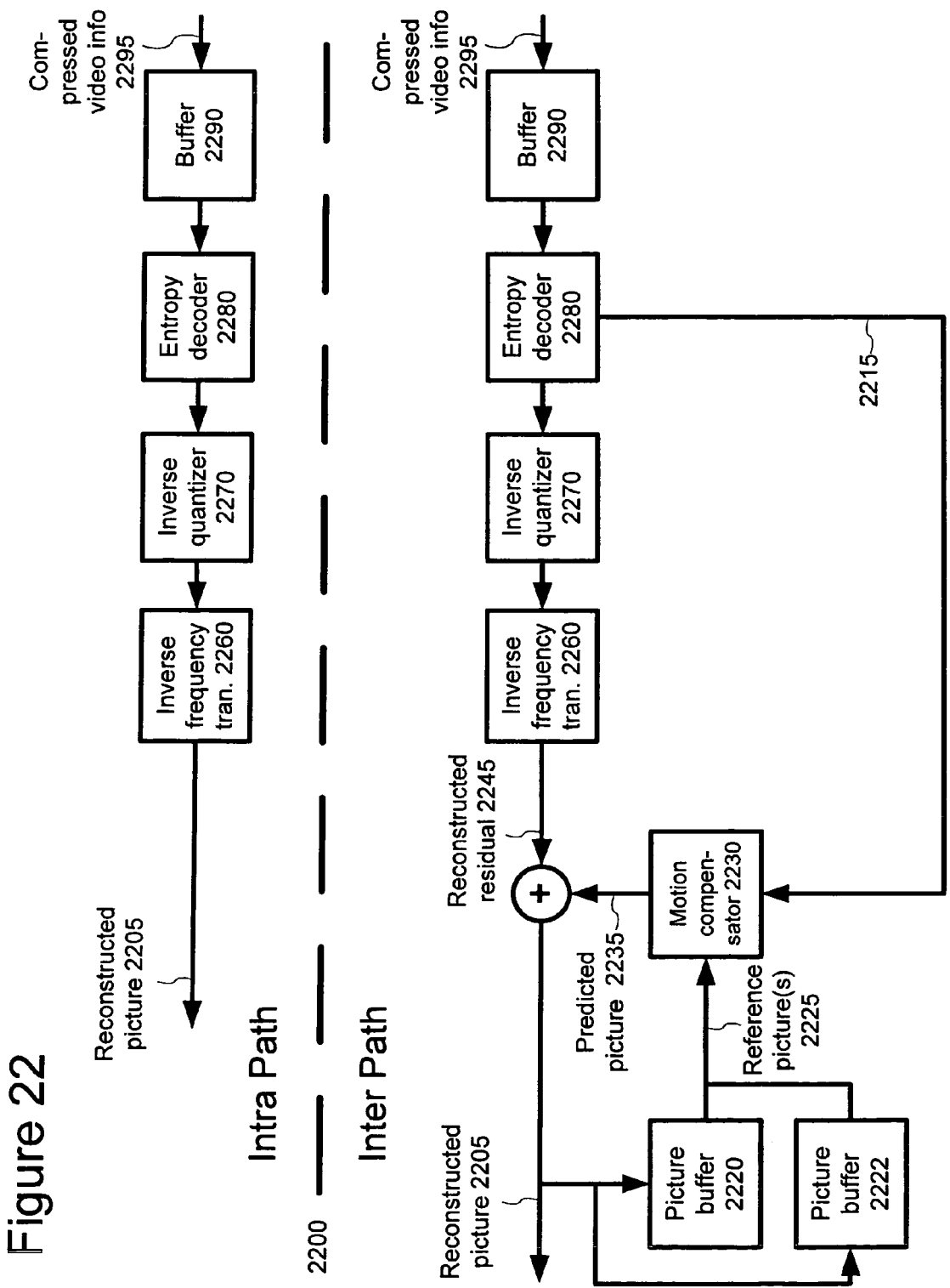
FIG. 22 is a block diagram of a generalized video decoder system in conjunction with which several described embodiments may be implemented.

FIG. 21 is a block diagram of a generalized video encoder 2100 in conjunction with which some described embodiments may be implemented. FIG. 22 is a block diagram of a generalized video decoder 2200 in conjunction with which some described embodiments may be implemented.

The relationships shown between modules within the encoder 2100 and decoder 2200 indicate general flows of information in the encoder and decoder; other relationships are not shown for the sake of simplicity. In particular, FIGS. 21 and 22 usually do not show side information indicating the encoder settings, modes, tables, etc. used for a video sequence, picture, macroblock, block, etc. Such side information is sent in the output bitstream, typically after entropy encoding of the side information. The format of the output bitstream can be a Windows Media Video version 9 format or other format.

The encoder 2100 and decoder 2200 process video pictures, which may be video frames, video fields or combinations of frames and fields. The bitstream syntax and semantics at the picture and macroblock levels may depend on whether frames or fields are used. There may be changes to macroblock organization and overall timing as well. The encoder 2100 and decoder 2200 are block-based and use a 4:2:0 macroblock format for frames, with each macroblock including four 8×8 luminance blocks (at times treated as one 16×16 macroblock) and two 8×8 chrominance blocks. For fields, the same or a different macroblock organization and format may be used. The 8×8 blocks may be further sub-divided at different stages, e.g., at the frequency transform and entropy encoding stages. Example video frame organizations are described in more detail below. Alternatively, the encoder 2100 and decoder 2200 are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoders or decoders with different modules and/or other configurations of modules perform one or more of the described techniques.

A. Video Frame Organizations

In some implementations, the encoder 2100 and decoder 2200 process video frames organized as follows. A frame contains lines of spatial information of a video signal. For progressive video, these lines contain samples starting from one time instant and continuing through successive lines to the bottom of the frame. A progressive video frame is divided into macroblocks such as the macroblock 2300 shown in FIG. 23. The macroblock 2300 includes four 8×8 luminance blocks (Y1 through Y4) and two 8×8 chrominance blocks that are co-located with the four luminance blocks but half resolution horizontally and vertically, following the conventional 4:2:0 macroblock format. The 8×8 blocks may be further sub-divided at different stages, e.g., at the frequency transform (e.g., 8×4, 4×8 or 4×4 DCTs) and entropy encoding stages. A progressive I-frame is an intra-coded progressive video frame. A progressive P-frame is a progressive video frame coded using forward prediction, and a progressive B-frame is a progressive video frame coded using bi-directional prediction. Progressive P- and B-frames may include intra-coded macroblocks as well as different types of predicted macroblocks.

Figure 24A:
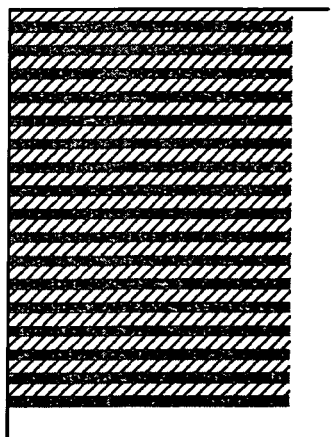
FIG. 24A is a diagram of part of an interlaced video frame, showing alternating lines of a top field and a bottom field.

An interlaced video frame consists of two scans of a frame—one comprising the even lines of the frame (the top field) and the other comprising the odd lines of the frame (the bottom field). The two fields may represent two different time periods or they may be from the same time period. FIG. 24A shows part of an interlaced video frame 2400, including the alternating lines of the top field and bottom field at the top left part of the interlaced video frame 2400.

Figure 23:
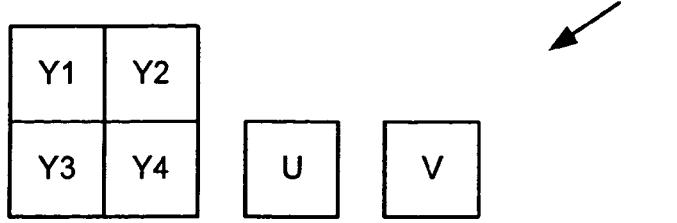
FIG. 23 is a diagram of a macroblock format used in several described embodiments.
Figure 24B:
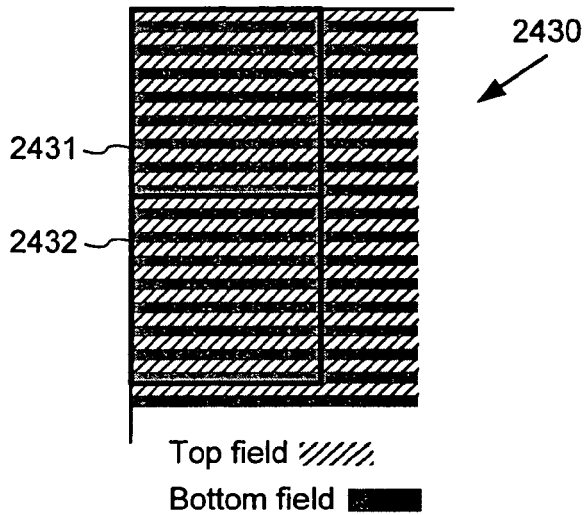
FIG. 24B is a diagram of the interlaced video frame organized for encoding/decoding as a frame.

FIG. 24B shows the interlaced video frame 2400 of FIG. 24A organized for encoding/decoding as a frame 2430. The interlaced video frame 2400 has been partitioned into macroblocks such as the macroblocks 2431 and 2432, which use a 4:2:0 format as shown in FIG. 23. In the luminance plane, each macroblock 2431, 2432 includes 8 lines from the top field alternating with 8 lines from the bottom field for 16 lines total, and each line is 16 pixels long. (The actual organization and placement of luminance blocks and chrominance blocks within the macroblocks 2431, 2432 are not shown, and in fact may vary for different encoding decisions.) Within a given macroblock, the top-field information and bottom-field information may be coded jointly or separately at any of various phases. An interlaced I-frame is two intra-coded fields of an interlaced video frame, where a macroblock includes information for the two fields. An interlaced P-frame is two fields of an interlaced video frame coded using forward prediction, and an interlaced B-frame is two fields of an interlaced video frame coded using bidirectional prediction, where a macroblock includes information for the two fields. Interlaced P and B-frames may include intra-coded macroblocks as well as different types of predicted macroblocks.

Figure 24C:
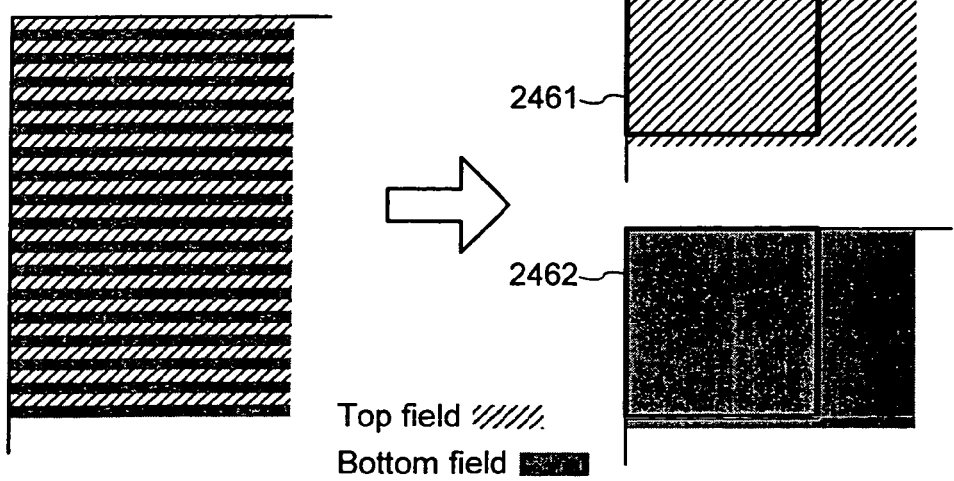
FIG. 24C is a diagram of the interlaced video frame organized for encoding/decoding as fields.

FIG. 24C shows the interlaced video frame 2400 of FIG. 24A organized for encoding/decoding as fields 2460. Each of the two fields of the interlaced video frame 2400 is partitioned into macroblocks. The top field is partitioned into macroblocks such as the macroblock 2461, and the bottom field is partitioned into macroblocks such as the macroblock 2462. (Again, the macroblocks use a 4:2:0 format as shown in FIG. 23, and the organization and placement of luminance blocks and chrominance blocks within the macroblocks are not shown.) In the luminance plane, the macroblock 2461 includes 16 lines from the top field and the macroblock 2462 includes 16 lines from the bottom field, and each line is 16 pixels long. An interlaced I-field is a single, separately represented field of an interlaced video frame. An interlaced P-field is a single, separately represented field of an interlaced video frame coded using forward prediction, and an interlaced B-field is a single, separately represented field of an interlaced video frame coded using bi-directional prediction. Interlaced P- and B-fields may include intra-coded macroblocks as well as different types of predicted macroblocks.

The term picture generally refers to source, coded or reconstructed image data. For progressive video, a picture is a progressive video frame. For interlaced video, a picture may refer to an interlaced video frame, the top field of the frame, or the bottom field of the frame, depending on the context.

Alternatively, the encoder 2100 and decoder 2200 are object-based, use a different macroblock or block format, or perform operations on sets of pixels of different size or configuration than 8×8 blocks and 16×16 macroblocks.

B. Video Encoder

FIG. 21 is a block diagram of a generalized video encoder system 2100. The encoder system 2100 receives a sequence of video pictures including a current picture 2105 (e.g., progressive video frame, interlaced video frame, or field of an interlaced video frame), and produces compressed video information 2195 as output. Particular embodiments of video encoders typically use a variation or supplemented version of the generalized encoder 2100.

The encoder system 2100 compresses predicted pictures and key pictures. For the sake of presentation, FIG. 21 shows a path for key pictures through the encoder system 2100 and a path for predicted pictures. Many of the components of the encoder system 2100 are used for compressing both key pictures and predicted pictures. The exact operations performed by those components can vary depending on the type of information being compressed.

A predicted picture (e.g., progressive p-frame or b-frame, interlaced p-field or b-field, or interlaced p-frame or b-frame) is represented in terms of prediction (or difference) from one or more other pictures (which are typically referred to as reference pictures or anchors). A prediction residual is the difference between what was predicted and the original picture. In contrast, a key picture (e.g., progressive I-frame, interlaced I-field, or interlaced I-frame) is compressed without reference to other pictures.

If the current picture 2105 is a forward-predicted picture, a motion estimator 2110 estimates motion of macroblocks or other sets of pixels of the current picture 2105 with respect to one or more reference pictures, for example, the reconstructed previous picture 2125 buffered in the picture store 2120. If the current picture 2105 is a bi-directionally-predicted picture, a motion estimator 2110 estimates motion in the current picture 2105 with respect to up to four reconstructed reference pictures (for an interlaced B-field, for example). Typically, a motion estimator estimates motion in a B-picture with respect to one or more temporally previous reference pictures and one or more temporally future reference pictures. Accordingly, the encoder system 2100 can use the separate stores 2120 and 2122 for multiple reference pictures. For more information on progressive B-frames, see U.S. patent application Ser. No. 10/622,378, entitled, "Advanced Bi-Directional Predictive Coding of Video Frames," filed Jul. 18, 2003.

The motion estimator 2110 can estimate motion by pixel, ½ pixel, ¼ pixel, or other increments, and can switch the resolution of the motion estimation on a picture-by-picture basis or other basis. The motion estimator 2110 (and compensator 2130) also can switch between types of reference picture pixel interpolation (e.g., between bicubic and bilinear) on a per-frame or other basis. The resolution of the motion estimation can be the same or different horizontally and vertically. The motion estimator 2110 outputs as side information motion information 2115 such as differential motion vector information. The encoder 2100 encodes the motion information 2115 by, for example, computing one or more predictors for motion vectors, computing differentials between the motion vectors and predictors, and entropy coding the differentials. To reconstruct a motion vector, a motion compensator 2130 combines a predictor with differential motion vector information. Various techniques for computing motion vector predictors, computing differential motion vectors, and reconstructing motion vectors for interlaced B-fields and interlaced B-frames are described below.

The motion compensator 2130 applies the reconstructed motion vector to the reconstructed picture(s) 2125 to form a motion-compensated current picture 2135. The prediction is rarely perfect, however, and the difference between the motion-compensated current picture 2135 and the original current picture 2105 is the prediction residual 2145. During later reconstruction of the picture, the prediction residual 2145 is added to the motion compensated current picture 2135 to obtain a reconstructed picture that is closer to the original current picture 2105. In lossy compression, however, some information is still lost from the original current picture 2105. Alternatively, a motion estimator and motion compensator apply another type of motion estimation/compensation.

A frequency transformer 2160 converts the spatial domain video information into frequency domain (i.e., spectral) data. For block-based video pictures, the frequency transformer 2160 applies a DCT, variant of DCT, or other block transform to blocks of the pixel data or prediction residual data, producing blocks of frequency transform coefficients. Alternatively, the frequency transformer 2160 applies another conventional frequency transform such as a Fourier transform or uses wavelet or sub-band analysis. The frequency transformer 2160 may apply an 8×8, 8×4, 4×8, 4×4 or other size frequency transform.

A quantizer 2170 then quantizes the blocks of spectral data coefficients. The quantizer applies uniform, scalar quantization to the spectral data with a step-size that varies on a picture-by-picture basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder 2100 can use frame dropping, adaptive filtering, or other techniques for rate control.

The encoder 2100 may use special signaling for a skipped macroblock, which is a macroblock that has no information of certain types (e.g., no motion information for the macroblock and no residual information).

When a reconstructed current picture is needed for subsequent motion estimation/compensation, an inverse quantizer 2176 performs inverse quantization on the quantized spectral data coefficients. An inverse frequency transformer 2166 then performs the inverse of the operations of the frequency transformer 2160, producing a reconstructed prediction residual (for a predicted picture) or a reconstructed key picture. If the current picture 2105 was a key picture, the reconstructed key picture is taken as the reconstructed current picture (not shown). If the current picture 2105 was a predicted picture, the reconstructed prediction residual is added to the motion-compensated current picture 2135 to form the reconstructed current picture. One or both of the picture stores 2120, 2122 buffers the reconstructed current picture for use in motion compensated prediction. In some embodiments, the encoder applies a de-blocking filter to the reconstructed frame to adaptively smooth discontinuities and other artifacts in the picture.

The entropy coder 2180 compresses the output of the quantizer 2170 as well as certain side information (e.g., motion information 2115, quantization step size). Typical entropy coding techniques include arithmetic coding, differential coding, Huffman coding, run length coding, LZ coding, dictionary coding, and combinations of the above. The entropy coder 2180 typically uses different coding techniques for different kinds of information (e.g., DC coefficients, AC coefficients, different kinds of side information), and can choose from among multiple code tables within a particular coding technique.

The entropy coder 2180 provides compressed video information 2195 to the multiplexer ["MUX"] 2190. The MUX 2190 may include a buffer, and a buffer level indicator may be fed back to bit rate adaptive modules for rate control. Before or after the MUX 2190, the compressed video information 2195 can be channel coded for transmission over the network. The channel coding can apply error detection and correction data to the compressed video information 2195.

C. Video Decoder

FIG. 22 is a block diagram of a general video decoder system 2200. The decoder system 2200 receives information 2295 for a compressed sequence of video pictures and produces output including a reconstructed picture 2205 (e.g., progressive video frame, interlaced video frame, or field of an interlaced video frame). Particular embodiments of video decoders typically use a variation or supplemented version of the generalized decoder 2200.

The decoder system 2200 decompresses predicted pictures and key pictures. For the sake of presentation, FIG. 22 shows a path for key pictures through the decoder system 2200 and a path for forward-predicted pictures. Many of the components of the decoder system 2200 are used for decompressing both key pictures and predicted pictures. The exact operations performed by those components can vary depending on the type of information being decompressed.

A DEMUX 2290 receives the information 2295 for the compressed video sequence and makes the received information available to the entropy decoder 2280. The DEMUX 2290 may include a jitter buffer and other buffers as well. Before or after the DEMUX 2290, the compressed video information can be channel decoded and processed for error detection and correction.

The entropy decoder 2280 entropy decodes entropy-coded quantized data as well as entropy-coded side information (e.g., motion information 2215, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder 2280 typically uses different decoding techniques for different kinds of information (e.g., DC coefficients, AC coefficients, different kinds of side information), and can choose from among multiple code tables within a particular decoding technique.

The decoder 2200 decodes the motion information 2215 by, for example, computing one or more predictors for motion vectors, entropy decoding differential motion vectors, and combining decoded differential motion vectors with predictors to reconstruct motion vectors. Various techniques for computing motion vector predictors, computing differential motion vectors, and reconstructing motion vectors for interlaced B-fields and interlaced B-frames are described below.

A motion compensator 2230 applies motion information 2215 to one or more reference pictures 2225 to form a prediction 2235 of the picture 2205 being reconstructed. For example, the motion compensator 2230 uses one or more macroblock motion vector to find macroblock(s) in the reference picture(s) 2225. One or more picture stores (e.g., picture store 2220, 2222) store previous reconstructed pictures for use as reference pictures. Typically, B-pictures have more than one reference picture (e.g., at least one temporally previous reference picture and at least one temporally future reference picture). Accordingly, the decoder system 2200 can use separate picture stores 2220 and 2222 for multiple reference pictures. The motion compensator 2230 can compensate for motion at pixel, ½ pixel, ¼ pixel, or other increments, and can switch the resolution of the motion compensation on a picture-by-picture basis or other basis. The motion compensator 2230 also can switch between types of reference picture pixel interpolation (e.g., between bicubic and bilinear) on a per-frame or other basis. The resolution of the motion compensation can be the same or different horizontally and vertically. Alternatively, a motion compensator applies another type of motion compensation. The prediction by the motion compensator is rarely perfect, so the decoder 2200 also reconstructs prediction residuals.

An inverse quantizer 2270 inverse quantizes entropy-decoded data. In general, the inverse quantizer applies uniform, scalar inverse quantization to the entropy-decoded data with a step-size that varies on a picture-by-picture basis or other basis. Alternatively, the inverse quantizer applies another type of inverse quantization to the data, for example, to reconstruct after a non-uniform, vector, or non-adaptive quantization, or directly inverse quantizes spatial domain data in a decoder system that does not use inverse frequency transformations.

An inverse frequency transformer 2260 converts the quantized, frequency domain data into spatial domain video information. For block-based video pictures, the inverse frequency transformer 2260 applies an inverse DCT ["IDCT"], variant of IDCT, or other inverse block transform to blocks of the frequency transform coefficients, producing pixel data or prediction residual data for key pictures or predicted pictures, respectively. Alternatively, the inverse frequency transformer 2260 applies another conventional inverse frequency transform such as an inverse Fourier transform or uses wavelet or sub-band synthesis. The inverse frequency transformer 2260 may apply an 8×8, 8×4, 4×8, 4×4, or other size inverse frequency transform.

For a predicted picture, the decoder 2200 combines the reconstructed prediction residual 2245 with the motion compensated prediction 2235 to form the reconstructed picture 2205. When the decoder needs a reconstructed picture 2205 for subsequent motion compensation, one or both of the picture stores (e.g., picture store 2220) buffers the reconstructed picture 2205 for use in predicting the next picture. In some embodiments, the decoder 2200 applies a de-blocking filter to the reconstructed picture to adaptively smooth discontinuities and other artifacts in the picture.

III. Interlaced P-fields and Interlaced P-frames

A typical interlaced video frame consists of two fields (e.g., a top field and a bottom field) scanned at different times. In general, it is more efficient to encode stationary regions of an interlaced video frame by coding fields together ("frame mode" coding). On the other hand, it is often more efficient to code moving regions of an interlaced video frame by coding fields separately ("field mode" coding), because the two fields tend to have different motion. A forward-predicted interlaced video frame may be coded as two separate forward-predicted fields—interlaced P-fields. Coding fields separately for a forward-predicted interlaced video frame may be efficient, for example, when there is high motion throughout the interlaced video frame, and hence much difference between the fields.

Or, a forward-predicted interlaced video frame may be coded using a mixture of field coding and frame coding, as an interlaced P-frame. For a macroblock of an interlaced P-frame, the macroblock includes lines of pixels for the top and bottom fields, and the lines may be coded collectively in a frame-coding mode or separately in a field-coding mode.

A. Interlaced P-fields

An interlaced P-field references one or more previously decoded fields. For example, in some implementations, an interlaced P-field references either one or two previously decoded fields, whereas interlaced B-fields refer to up to two previous and two future reference fields (i.e., up to a total of four reference fields). (Encoding and decoding techniques for interlaced B-fields are described in detail below.)

FIGS. 25 and 26 show examples of interlaced P-fields having two reference fields. In FIG. 25, current field 2510 refers to a top field 2520 and bottom field 2530 in a temporally previous interlaced video frame. Since fields 2540 and 2550 are interlaced B-fields, they are not used as reference fields. In FIG. 26, current field 2610 refers to a top field 2620 and bottom field 2630 in an interlaced video frame immediately previous to the interlaced video frame containing the current field 2610. For more information on two-reference interlaced P-fields, see U.S. patent application Ser. No. xx/yyy,zzz, entitled, "Predicting Motion Vectors for Fields of Forward-predicted Interlaced Video Frames," filed May 27, 2004.

Figure 27:
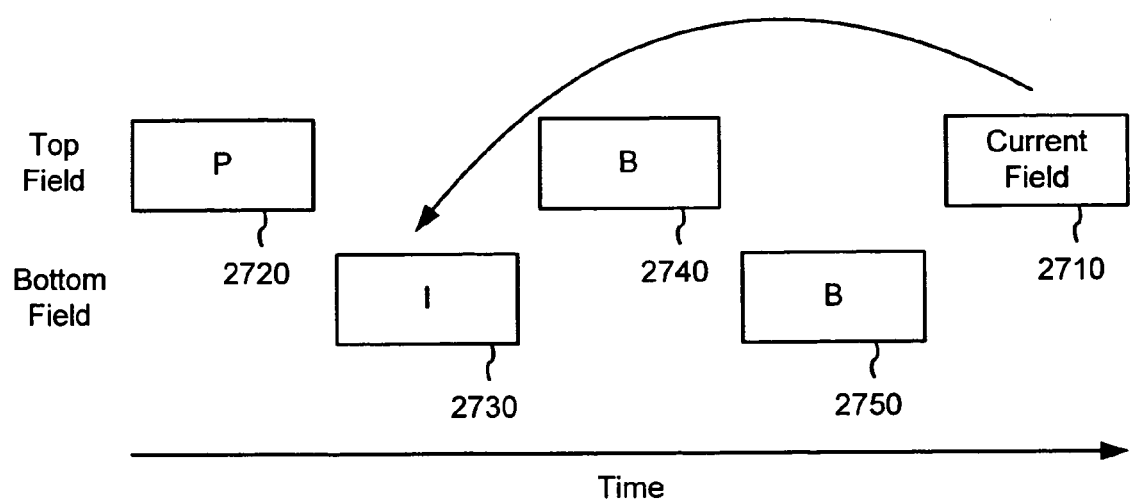
FIGS. 27 and 28 are diagrams showing interlaced P-fields using the most recent allowable reference field.
Figure 28:
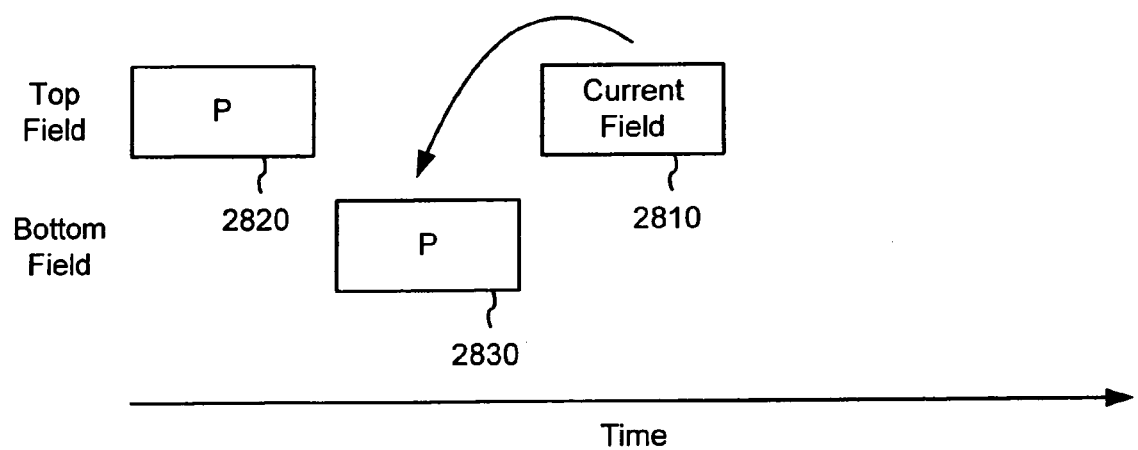

FIGS. 27 and 28 show examples of interlaced P-fields having one reference field—the temporally most recent allowable reference field. In FIG. 27, current field 2710 refers to a bottom field 2730 in a temporally previous interlaced video frame, but does not refer to the less recent top field 2720 in the interlaced video frame. In the example shown in FIG. 27, fields 2740 and 2750 are interlaced B-fields and are not allowable reference fields. In FIG. 28, current field 2810 refers to bottom field 2830 in an interlaced video frame immediately previous to the interlaced video frame containing the current field 2810, rather than the less recent top field 2820.

Figure 29:
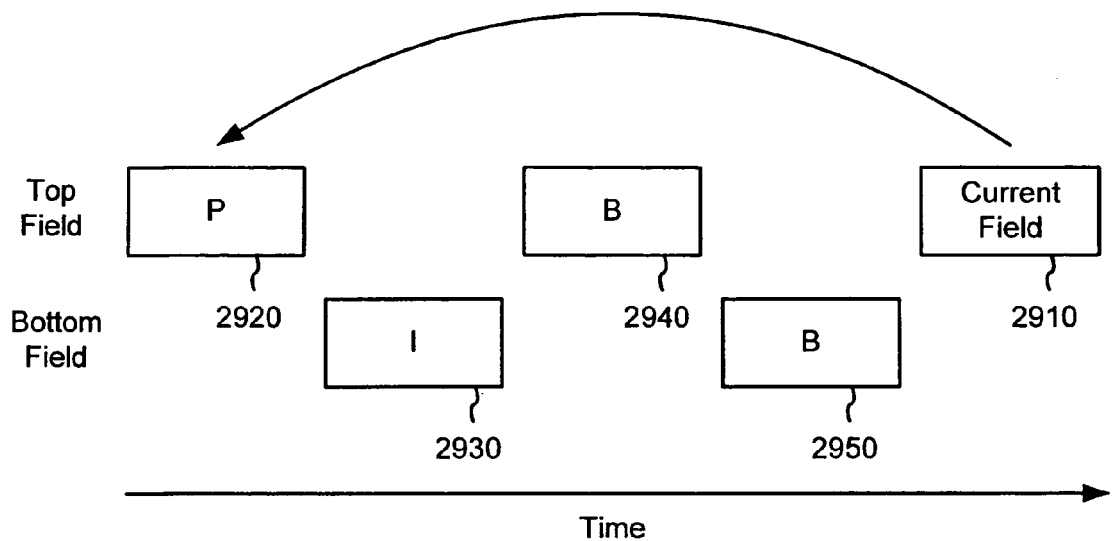
FIGS. 29 and 30 are diagrams showing interlaced P-fields using the second most recent allowable reference field.
Figure 30:
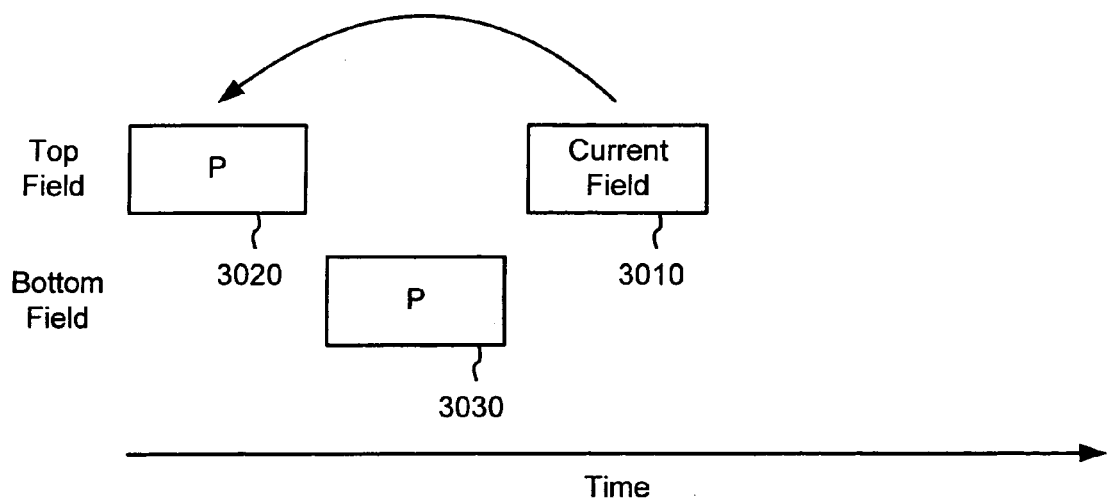

FIGS. 29 and 30 show examples of interlaced P-fields that use the second most recent allowable reference field. In FIG. 29, current field 2910 refers to a top field 2920 in a temporally previous interlaced video frame, but does not refer to the more recent bottom field 2930. In the example shown in FIG. 29, fields 2940 and 2950 are interlaced B-fields and are not allowable reference fields. In FIG. 30, current field 3010 refers to top field 3020 rather than the more recent bottom field 3030.

In one implementation, all the scenarios shown in FIGS. 25-30 are allowed in an interlaced P-field syntax. Other implementations are possible. For example, pictures may use fields from other pictures of different types or temporal positions as reference fields.

1. Field Picture Coordinate System and Field Polarities

Motion vectors represent horizontal and vertical displacements in quarter-pixel units. For example, if the vertical component of a motion vector indicates a displacement of 6 quarter-pixel units, this inidicates that the reference block is one and a half field lines below the current block position (6*¼=1½).

Figure 31:
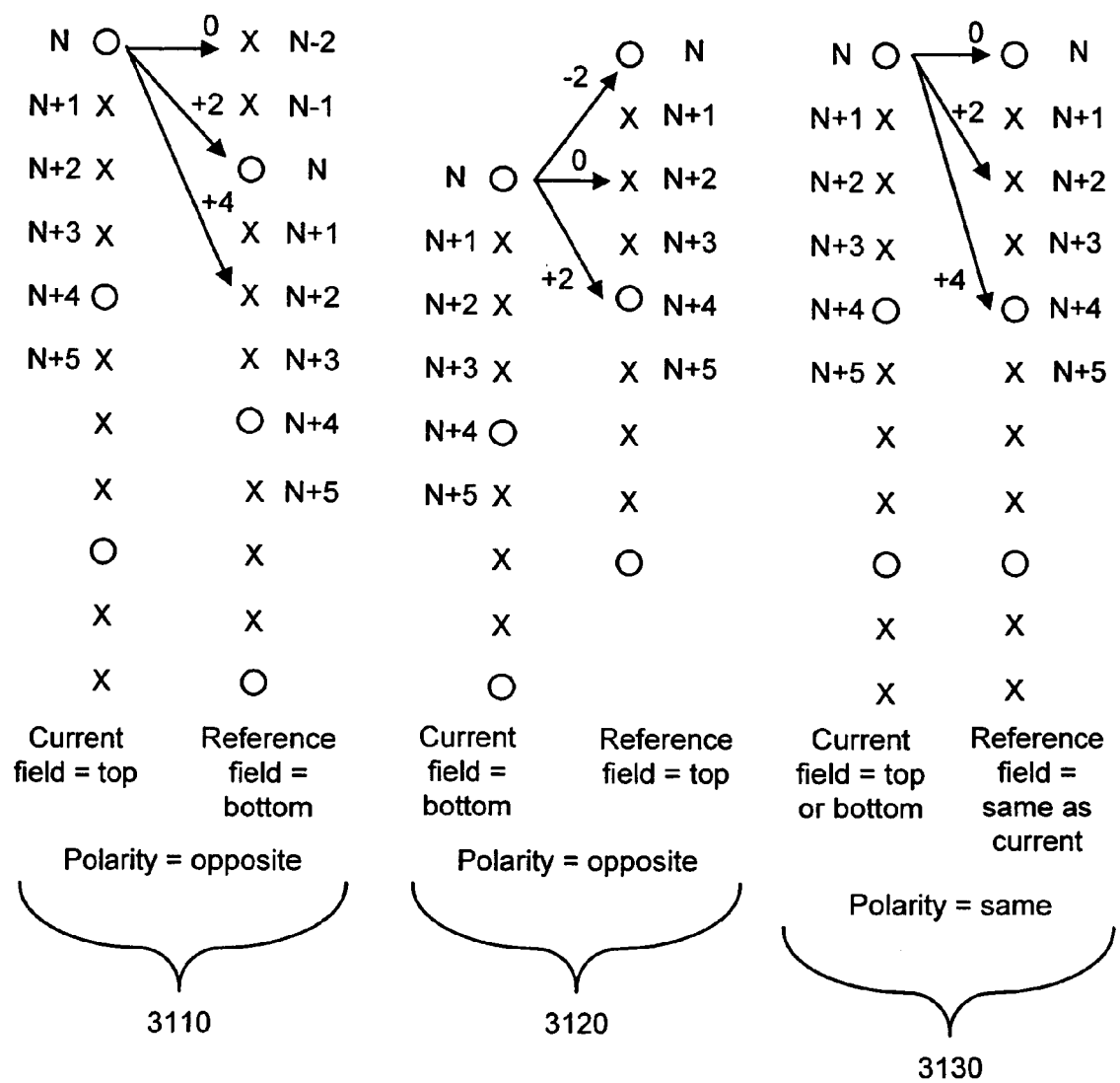
FIG. 31 is a diagram showing relationships between vertical components of motion vectors and a corresponding spatial location for different combinations of current and reference field polarities.

FIG. 31 shows a relationship between vertical components of motion vectors and spatial locations in one implementation. The example shown in FIG. 31 shows three different scenarios 3110, 3120 and 3130 for three different combinations of current and reference field types (e.g., top and bottom). If the field types are different for the current and reference fields, the polarity is "opposite." If the field types are the same, the polarity is "same." For each scenario, FIG. 31 shows one vertical column of pixels in a current field and a second vertical column of pixels in a reference field. In reality, the two columns are horizontally aligned. A circle represents an actual integer-pixel position and an X represents an interpolated half or quarter-pixel position. Horizontal component values (not shown) need not account for any offset due to interlacing, as the respective fields are horizontally aligned. Negative values indicate offsets further above, and in the opposite direction, as the positive value vertical offsets shown.

In scenario 3110, the polarity is "opposite." The current field is a top field and the reference field is a bottom field. Relative to the current field, the position of the reference field is offset by a half pixel in the downward direction due to the interlacing. A vertical motion vector component value of 0 is the "no vertical motion" offset and represents a position in the reference field at the same vertical level (in absolute terms) as the location in the reference field, a vertical motion vector component value of +2 represents a position in the reference field that is offset by a half pixel (in absolute terms) below the location in the current field, which is an actual value in the reference field, and a vertical component value of +4 represents a position offset by a full pixel (in absolute terms) below the location in the current field, which is an interpolated value in the reference field.

In scenario 3120, the polarity is also "opposite." The current field is a bottom field and the reference field is a top field. Relative to the current field, the position of the reference field is offset by a half pixel in the upward direction due to the interlacing. A vertical motion vector component of −2 represents a position in the reference field that is a half pixel (in absolute terms) above the location in the current field, a vertical component value of 0 represents a position at the same level (in absolute terms) as the location in the current field, and a vertical component of +2 represents a position offset by a half pixel below (in absolute terms) the location in the current field.

In scenario 3130, the polarity is "same." Relative to the current field, the position of the reference field is the same in the vertical direction. A vertical motion vector component value of 0 is the "no vertical motion" offset and represents a position in the reference field at the same vertical level (in absolute terms) as the location in the reference field, a vertical motion vector component value of +2 represents a position in the reference field that is offset by a half pixel (in absolute terms) below the location in the current field, which is an interpolated value in the reference field, and a vertical component value of +4 represents a position offset by a full pixel (in absolute terms) below the location in the current field, which is an actual value in the reference field.

Alternatively, displacements for motion vectors are expressed according to a different convention.

2. Motion Vector Prediction in Two-Reference Field Interlaced P-fields

Two-reference field interlaced P-fields reference two fields in the same temporal direction (e.g., the two most recent previous reference fields). Two motion vector predictors are computed for each macroblock. In some implementations, one predictor is from a reference field of same polarity, and the other is from a reference field of opposite polarity. Other combinations of polarities also are possible. (Interlaced B-fields that use two-reference fields per direction are described below. In some implementations, such interlaced B-fields use the same techniques as interlaced P-fields for computing motion vector predictors.)

In some embodiments, an encoder/decoder calculates a motion vector predictor for a current block or macroblock by finding an odd field predictor and an even field predictor, and selecting one of the predictors to process the macroblock. For example, an encoder/decoder determines an odd field motion vector predictor and even field motion vector predictor. One of the motion vector predictors thus has the same polarity as the current field, and the other motion vector predictor has the opposite polarity. The encoder/decoder selects a motion vector predictor from among the odd field motion vector predictor and the even field motion vector predictor. For example, the encoder selects between the motion vector predictors based upon which gives better prediction. The encoder signals which motion vector predictor to use using a simple selection signal or using more complex signaling that incorporates contextual information to improve coding efficiency. The contextual information may indicate which of the odd field or even field, or which of the same polarity field or opposite polarity field, has been used predominately in the neighborhood around the block or macroblock. The decoder selects which motion vector predictor to use based upon the selection signal and/or the contextual information. Then, the encoder/decoder processes the motion vector using the selected motion vector predictor. For example, the encoder encodes a differential between the motion vector and the motion vector predictor. Or, the decoder decodes the motion vector by combining the motion vector differential and the motion vector predictor.

Alternatively, the encoder and/or decoder may skip determining the odd field motion vector predictor or determining the even field motion vector predictor. For example, if the encoder determines that the odd field will be used for motion compensation for a particular block or macroblock, the encoder determines only the odd field motion vector predictor. Or, if the decoder determines from contextual and/or signaled information that the odd field will be used for motion compensation, the decoder determines only the odd field motion vector predictor. In this way, the encoder and decoder may avoid unnecessary operations.

Figure 32:
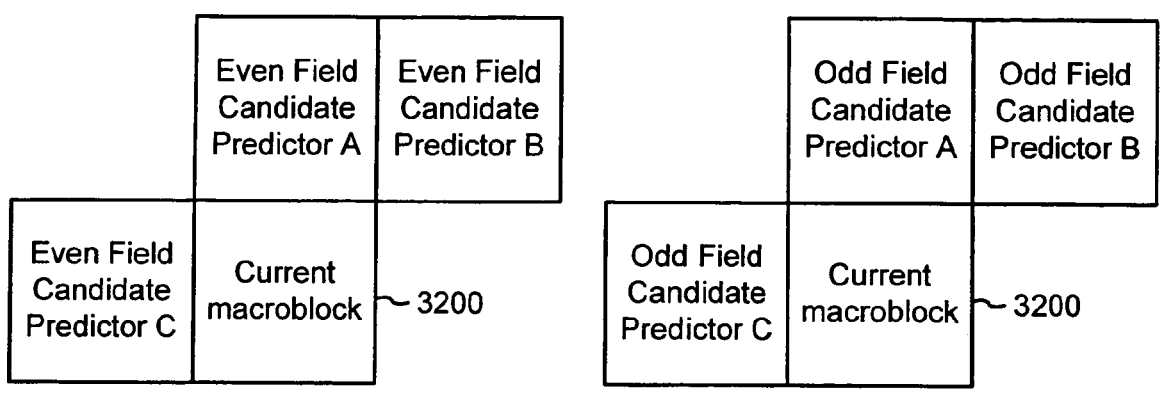
FIG. 32 is a diagram showing two sets of three candidate motion vector predictors for a current macroblock.

A decoder can employ the following technique to determine motion vector predictors for a current interlaced P-field:

For each block or macroblock with a motion vector in an interlaced P-field, two sets of three candidate motion vector predictors are obtained. The positions of the neighboring macroblocks from which these candidate motion vector predictors are obtained relative to a current macroblock 3200 are shown in FIG. 32. Three of the candidates are from the even reference field and three are from the odd reference field. Since the neighboring macroblocks in each candidate direction (A, B or C) will either be intra-coded or have an actual motion vector that references either the even field or the odd field, there is a need to derive the other field's motion vector (or derive both odd field and even field motion vector candidates for an intra-coded macroblock). For example, for a given macroblock, suppose predictor A has a motion vector which references the odd field. In this case, the "even field" predictor candidate A is derived from the motion vector of "odd field" predictor candidate A. This derivation is accomplished using a scaling operation. (See, for example, the explanation of FIGS. 34A and 34B below.) Alternatively, the derivation is accomplished in another manner.

Once the three odd field candidate motion vector predictors have been obtained, a median operation is used to derive an odd field motion vector predictor from the three odd field candidates. Similarly, once the three even field candidate motion vector predictors have been obtained, a median operation is used to derive an even field motion vector predictor from the three even field candidates. Alternatively, another mechanism is used to select the field motion vector predictor based upon the candidate field motion vector predictors. The decoder decides whether to use the even field or odd field as the motion vector predictor (e.g., by selecting the dominant predictor), and the even or odd motion vector predictor is used to reconstruct the motion vector.

The pseudo-code 3300 in FIGS. 33A-33F illustrates a process used to generate motion vector predictors from predictors A, B, and C as arranged in FIG. 32. While FIG. 32 shows a neighborhood for a typical macroblock in the middle of the current interlaced P-field, the pseudo-code 3300 of FIGS. 33A-33F addresses various special cases for macroblock locations. In addition, the pseudo-code 3300 may be used to compute a motion vector predictor for the motion vector of a block in various locations.

In the pseudo-code 3300, the terms "same field" and "opposite field" are to be understood relative to the field currently being coded or decoded. If the current field is an even field, for example, the "same field" is the even reference field and the "opposite field" is the odd reference field. The variables samefieldpred_x and samefieldpred_y in the pseudo-code 3300 represent the horizontal and vertical components of the motion vector predictor from the same field, and the variables oppositefieldpred_x and oppositefieldpred_y represent the horizontal and vertical components of the motion vector predictor from the opposite field. The variables samecount and oppositecount track how many of the motion vectors for the neighbors of the current block or macroblock reference the "same" polarity reference field for the current field and how many reference the "opposite" polarity reference field, respectively. The variables samecount and oppositecount are initialized to 0 at the beginning of the pseudo-code.

The scaling operations scaleforsame( ) and scaleforopposite( ) mentioned in the pseudo-code 3300 are used to derive motion vector predictor candidates for the "other" field from the actual motion vector values of the neighbors. The scaling operations are implementation-dependent. Example scaling operations are described below with reference to FIGS. 34A, 34B, 35, and 36. Alternatively, other scaling operations are used, for example, to compensate for vertical displacements such as those shown in FIG. 31. (Scaling operations specifically used for interlaced B-fields are described in detail below.)

FIGS. 33A and 33B show pseudo-code for computing a motion vector predictor for a typical block or macroblock in an interior position within the frame. The motion vectors for "intra" neighbors are set to 0. For each neighbor, the same field motion vector predictor and opposite field motion vector predictor are set, where one is set from the actual value of the motion vector for the neighbor, and the other is derived therefrom. The median of the candidates is computed for the same field motion vector predictor and for the opposite field motion vector predictor, and the "dominant" predictor is determined from samecount and oppositecount. The variable dominantpredictor indicates which field contains the dominant motion vector predictor. A motion vector predictor is dominant if it has the same polarity as the majority of the three candidate predictors. (The signaled value predictor_flag, which is decoded along with the motion vector differential data, indicates whether the dominant or non-dominant predictor is used.)

The pseudo-code in FIG. 33C addresses the situation of a macroblock in an interlaced P-field with only one macroblock per row, for which there are no neighbors B or C. The pseudo-code in FIGS. 33D and 33E addresses the situation of a block or macroblock at the left edge of an interlaced P-field, for which there is no neighbor C. Here, a motion vector predictor is dominant if it has the same polarity as more of the two candidate predictors, with the opposite field motion vector predictor being dominant in the case of a tie. Finally, the pseudo-code in FIG. 33F addresses, for example, the cases of macroblock in the top row of an interlaced P-field.

3. Scaling for Derivation of One Field Motion Vector Predictor from Another Field Motion Vector Predictor In one implementation, an encoder/decoder derives one field motion vector predictor from another field motion vector predictor using the scaling operation illustrated in the pseudo-code 3400 of FIGS. 34A and 34B. The values of SCALEOPP, SCALESAME1, SCALESAME2, SCALEZONE1_X, SCALEZONE1_Y, ZONE1OFFSET_X and ZONE1OFFSET_Y are implementation dependent. Two possible sets of values are shown in table 3500 in FIG. 35 for the case where the current field is first field in the interlaced video frame, and in table 3600 in FIG. 36 for the case where the current field is the second field in the interlaced video frame. For P-frames, the reference frame distance is defined as the number of B-frames (i.e., a video frame containing two B-fields) between the current P-frame and its reference frame. If no B-frames are present, the reference distance is 0. For example, an encoder uses a variable-sized syntax element (e.g., the REFDIST syntax element, which is described in detail in Section XIV below) to encode the reference frame distance.

In the examples shown in tables 3500 and 3600, the value of N (a multiplier for the SCALEZONE1_X, SCALEZONE1_Y, ZONE1OFFSET_X and ZONE1OFFSET_Y values in the tables) depends on a motion vector range. For example, an extended motion vector range can be signaled by the syntax element EXTENDED_MV=1. If EXTENDED_MV=1, the MVRANGE syntax element is present in the picture header and signals the motion vector range. If EXTENDED_MV=0 then a default motion vector range is used. Table 1 below shows the relationship between N and MVRANGE.

TABLE 1

Derivation of N in FIGS. 35 and 36

| MVRANGE | N |
|---|---|
| 0 or default | 1 |
| 10 | 2 |
| 110 | 8 |
| 111 | 16 |

The values shown in tables 3500 and 3600 can be modified depending on implementation.

Alternatively, N is assumed to be 1 (i.e., scaling is not dependent on N), or scaling can be performed in some other way.

B. Interlaced P-frames

In some implementations, macroblocks in interlaced P-frames can be one of five types: 1MV, 2 Field MV, 4 Frame MV, 4 Field MV, and Intra.

In a 1MV macroblock, the displacement of the four luminance blocks in the macroblock is represented by a single motion vector. A corresponding chroma motion vector can be derived from the luma motion vector to represent the displacements of each of the two 8×8 chroma blocks for the motion vector. For example, referring again to the macroblock arrangement shown in FIG. 23, a 1MV macroblock 2300 includes four 8×8 luminance blocks and two 8×8 chrominance blocks. The displacement of the luminance blocks (Y1 through Y4) are represented by single motion vector, and a corresponding chroma motion vector can be derived from the luma motion vector to represent the displacements of each of the two chroma blocks (U and V).

In a 2 Field MV macroblock, the displacement of each field for the four luminance blocks in the macroblock is described by a different motion vector. For example, FIG. 37 shows that a top field motion vector describes the displacement of the even lines of all four of the luminance blocks and that a bottom field motion vector describes the displacement of the odd lines of all four of the luminance blocks. Using the top field motion vector, an encoder can derive a corresponding top field chroma motion vector that describes the displacement of the even lines of the chroma blocks. Similarly, an encoder can derive a bottom field chroma motion vector that describes the displacements of the odd lines of the chroma blocks.

Referring to FIG. 38, in a 4 Frame MV macroblock, the displacement of each of the four luminance blocks is described by a different motion vector (MV1, MV2, MV3 and MV4). Each chroma block can be motion compensated by using four derived chroma motion vectors (MV1', MV2', MV3' and MV4') that describe the displacement of four 4×4 chroma sub-blocks. A motion vector for each 4×4 chroma sub-block can be derived from the motion vector for the spatially corresponding luminance block.

Referring to FIG. 39, in a 4 Field MV macroblock, the displacement of each field in the luminance blocks is described by two different motion vectors. The even lines of the luminance blocks are subdivided vertically to form two 8×8 regions. For the even lines, the displacement of the left region is described by the top left field block motion vector and the displacement of the right region is described by the top right field block motion vector. The odd lines in the luminance blocks also are subdivided vertically to form two 8×8 regions. The displacement of the left region is described by the bottom left field block motion vector and the displacement of the right region is described by the bottom right field block motion vector. Each chroma block also can be partitioned into four regions in the same way as the luminance blocks, and each chroma block region can be motion compensated using a derived motion vector.

For Intra macroblocks, motion is assumed to be zero.

In general, the process of computing the motion vector predictor(s) for a current macroblock in an interlaced P-frame consists of two steps. First, three candidate motion vectors for the current macroblock are gathered from its neighboring macroblocks. For example, in one implementation, candidate motion vectors are gathered based on the arrangement shown in FIGS. 40A-40B (and various special cases for top row macroblocks, etc.). Alternatively, candidate motion vectors can be gathered in some other order or arrangement. Second, the motion vector predictor(s) for the current macroblock is computed from the set of candidate motion vectors. For example, the predictor can be computed using median-of-3 prediction, or by some other method.

For further details on computation of predictors and derivation of chroma motion vectors for macroblocks of interlaced P-frames, see U.S. Provisional Patent Application No. 60/501,081, entitled "Video Encoding and Decoding Tools and Techniques," filed Sep. 7, 2003, and Section XIV, below.

IV. Bi-directional Prediction of Progressive Video Frames

As explained above, macroblocks in progressive B-frames can be predicted using five different prediction modes: forward, backward, direct, interpolated and intra. An encoder selects and signals the different prediction modes in the bit stream at macroblock level or some other level. In forward mode, a macroblock in a current progressive B-frame is derived from a temporally previous anchor. In backward mode, a macroblock in the current progressive B-frame is derived from a temporally subsequent anchor. Macroblocks predicted in direct or interpolated modes use both forward and backward anchors for prediction. Since there are two reference frames in direct and interpolated modes, there are typically at least two motion vectors (either explicitly coded or derived) for each macroblock. (Various aspects of the coding, signaling and decoding used for progressive B-frames may also be used for interlaced B-frames, as described below.)

In some implementations, the encoder implicitly derives motion vectors in direct mode by scaling a co-located motion vector for the forward anchor using a fraction value. The fraction can reflect the relative temporal position of a current progressive B-frame within the interval formed by its anchors, but need not reflect true inter-frame distances. Thus, the encoder does not necessarily assume constant velocity. This allows the encoder an additional degree of freedom to accurately and cheaply describe the true motion between the anchors and the current progressive B-frame by changing the fraction from the "real" temporal position so as to improve motion compensated prediction. The variable BFRACTION represents different fractions that can be sent in a bitstream (e.g., at picture level or some other level) to indicate this relative temporal position. The different fractions are of a limited set of discrete values between 0 and 1.

Referring again to FIG. 17, table 1700 is a variable-length code (VLC) table for the bitstream element BFRACTION. There is no restriction on the uniqueness of BFRACTION among progressive B-frames between the same two anchors; different progressive B-frames with identical anchors may have the same BFRACTION value. The codes in the table 1700 can be altered or rearranged to represent different fractions with different codes. Other possible codes not shown in table 1700 (e.g., 1111110 or 1111111) can be deemed invalid codes, or can be used for other purposes. For example, the entry 1111110 can be used to explicitly code BFRACTION in a fixed point format. As another example, the entry 1111111 can be used to signal a specific frame type (e.g., an intra-coded progressive B-frame).

Referring again to FIG. 18, the decoder finds a scaling factor according to the pseudo-code 1800. Referring again to FIG. 19, the decoder uses the scaling factor to scale the x- and y-elements of the motion vector for the co-located macroblock in the subsequent reference picture. The function Scale_Direct_MV in pseudo-code 1900 takes the inputs MV_X and MV_Y and derives two motion vectors in direct mode, with one referencing the forward (previous) anchor picture, (MV_$X_F$, MV_$Y_F$) and the other referencing the backward (subsequent) anchor picture (MV_$X_B$, MV_$Y_B$)

A "skipped" macroblock signal in a progressive B-frame indicates that no motion vector prediction error is present for a given macroblock. The predicted motion vectors will be exactly the ones the encoder/decoder uses in reconstructing the macroblock (i.e., no motion vector prediction error is applied). The encoder still signals a prediction mode for the macroblock because the macroblock can be skipped using direct, forward, backward or interpolated prediction.

V. Overview of Innovations in Predictive Coding/Decoding of Interlaced B-pictures Described embodiments include techniques and tools for coding and decoding interlaced B-pictures (e.g., interlaced B-fields, interlaced B-frames). Described embodiments implement one or more of the described techniques and tools for coding and/or decoding bi-directionally predicted interlaced pictures including, but not limited to, the following:

1. For interlaced B-frames, an encoder/decoder switches prediction modes between the top and bottom field in a macroblock of an interlaced B-frame.
2. For interlaced B-frames, an encoder/decoder computes direct mode motion vectors for a current macroblock by selecting one representative motion vector for each of the top and bottom fields of the co-located macroblock of the previously decoded, temporally subsequent anchor. The selecting can be performed based at least in part on the mode of coding the current interlaced B-frame's macroblock (e.g., 1MV mode, 2 Field MV mode, etc.).
3. For interlaced B-fields or interlaced B-frames, an encoder/decoder uses 4MV coding. For example, 4MV can be used in one-direction prediction modes (forward or backward modes), but not in other available prediction modes (e.g., direct, interpolated).
4. For interlaced B-fields or interlaced B-frames, forward motion vectors are predicted using previously reconstructed (or estimated) forward motion vectors from a forward motion vector buffer, and backward motion vectors are predicted using previously reconstructed (or estimated) backward motion vectors from a backward motion vector buffer. The resulting motion vectors are added to the corresponding buffer, and holes in motion vector buffers are filled in with estimated motion vector values.
   a. For interlaced B-frames, when forward prediction is used to predict a motion vector and the motion vector is added to the forward buffer, the corresponding position in a backward buffer is filled in ("hole-filling") with what would be the predicted motion vector using only backward motion vectors as predictors. Similarly, when backward prediction is used to predict a motion vector and the motion vector is added to the backward buffer, the corresponding position in a forward buffer is filled in with what would be the predicted motion vector using only forward motion vectors as predictors.
   b. For interlaced B-fields, to choose between different polarity motion vectors (e.g., "same polarity" or "opposite polarity") for hole-filling, an encoder/decoder selects a dominant polarity field motion vector. The distance between anchors and current frames is computed using various syntax elements, and the computed distance is used for scaling reference field motion vectors.
5. For interlaced B-fields, an encoder/decoder uses "self-referencing" frames. For example, a second B-field in a current frame references the first B-field from the current frame in motion compensated prediction.
6. For interlaced B-fields, an encoder sends binary information (e.g., at B-field level in a compressed bitplane) indicating whether a prediction mode is forward or not-forward for one or more macroblocks in the interlaced B-field. A decoder performs corresponding decoding.
7. For interlaced B-fields, an encoder/decoder selects direct mode motion vectors using logic that favors the dominant polarity if the corresponding macroblock in the corresponding field of the next anchor picture was coded using four motion vectors.
8. Intra-coded fields: when no good motion compensation is possible for a B field, it may be coded as an intra (i.e., non-predicted) B-field ("BI-field").

The described techniques and tools can be used in combination with one another or with other techniques and tools, or can be used independently.

VI. Switching Prediction Modes Within Field-coded Macroblocks in Interlaced B-frames In some implementations, an encoder performs prediction mode switching within macroblocks in interlaced B-frames. For example, an encoder allows switching of prediction mode from forward to backward, or backward to forward, in going from the top to the bottom field in a macroblock in an interlaced B-frame. Instead of encoding an entire macroblock with a single prediction direction mode, a combination of prediction direction modes is used to code a single macroblock. The ability to change prediction direction modes among individual fields in a macroblock leads to more efficient coding of interlaced B-frames in many scenarios.

FIG. 41 shows a technique 4100 for predicting motion vectors for individual fields in a field-coded macroblock in an interlaced B-frame using different prediction modes. At 4110, in an interlaced B-frame, an encoder/decoder predicts a motion vector for a first field in the field-coded macroblock using a first prediction mode. In some implementations, the "first field" may be either the top field or the bottom field, the decision for which is separately signaled. At 4120, the encoder/decoder predicts a motion vector for a second field in the same macroblock using a different prediction mode.

For example, for a macroblock field-coded using two motion vectors, the top field can be forward-predicted (i.e., the top field motion vector refers to a previous anchor picture), and the bottom field can be backward-predicted (i.e., the bottom field refers to a subsequent anchor picture). In some implementations, field-coded macroblocks in interlaced B-frames are not encoded using four motion vectors. Alternatively, if the macroblock is field-coded using four motion vectors (e.g., two motion vectors for each field), then the two motion vectors for the top field would refer to one anchor (forward or backward), and the bottom field motion vectors would refer to the other anchor.

This switching of prediction mode requires only one additional bit in the case where the macroblock type is not direct or interpolated to begin with, as is further illustrated in the following pseudo-code for interlaced B-frames:

If MB is field-coded AND MB Type is forward or backward then
    If MVSwitch=1 then prediction mode switches (from forward to backward or vice versa) between top and bottom field Limiting prediction mode switching to forward and backward modes therefore avoids the need for more bits to signal the second mode since the second mode is implied from the first mode (previously signaled) and the switch value.

If there is high motion in the area covered by a macroblock of an interlaced B-frame, the macroblock is likely to be coded in field mode. Under these circumstances, either forward or backward prediction is more likely to give an accurate motion compensation result than the direct or interpolated modes, which involve pixel averaging. Since averaging results in smoothing (e.g., loss of high-frequency elements that accompany high motion), direct and interpolated modes may not be the best way to code such macroblocks. Experimental results indicate inefficiency through the increased overhead of signaling all four prediction modes as switching options at the field level within field-coded macroblocks.

Alternatively, an encoder can switch between more than two prediction modes within field-coded macroblocks of interlaced B-frames, or can switch between different prediction modes.

VII. Computing Direct Mode Motion Vectors in Interlaced B-frames

In some implementations, an encoder/decoder buffers motion vectors from a previously decoded anchor I-frame or P-frame (which is the reference frame that is forward in time, used as the backward prediction reference frame) and selects one or more of the buffered motion vectors for use in computing direct mode motion vectors for a current macroblock in an interlaced B-frame. For example, the encoder/decoder buffers a representative motion vector for each of the top and bottom fields from each macroblock of the anchor frame, and uses one or more of the buffered motion vectors to compute motion vectors for the current direct mode macroblock. The selecting is performed based at least in part on the coding mode of the current macroblock (e.g., 1MV mode, 2 Field MV mode, etc.).

Figure 42:
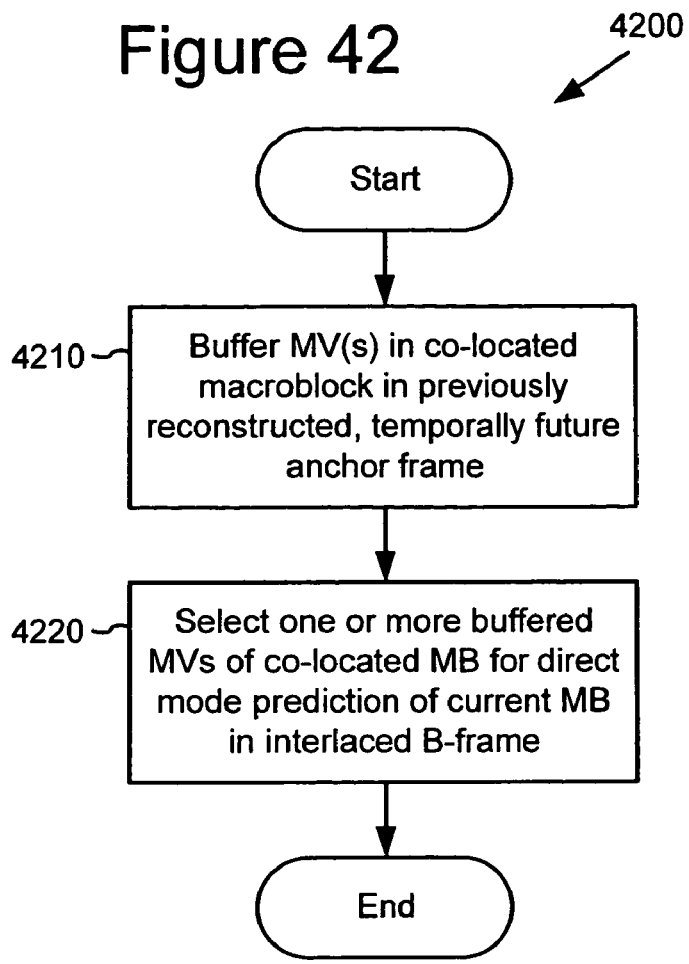
FIG. 42 is a flow chart showing a technique for computing direct mode motion vectors for macroblocks of interlaced B-frames.

FIG. 42 shows a technique 4200 for computing direct mode motion vectors for macroblocks in interlaced B-frames in one implementation. At 4210, an encoder/decoder buffers plural motion vectors per macroblock of a co-located macroblock in a previously reconstructed, temporally future anchor frame. If the co-located macroblock only has one motion vector, that motion vector is buffered as the motion vector value for the various blocks of the co-located macroblock, if necessary. At 4220, the encoder/decoder selects one or more of the buffered motion vectors of the co-located macroblock for direct mode prediction of the current macroblock in the interlaced B-frame, depending in part on the number of motion vectors needed for the current macroblock.

In one implementation, the decoder buffers two motion vectors in the co-located macroblock, or half of the maximum possible number of decoded luma motion vectors, from the future anchor frame. The macroblocks in the anchor frame can be coded in different ways, with up to four motion vectors per macroblock, but only up to two motion vectors are buffered, as described below. And, the number of forward/backward motion vector pairs generated for the current macroblock depends on the coding mode of the current macroblock, rather than just on the coding mode of the co-located macroblock in the previously decoded, future anchor frame.

For example, if the current direct mode macroblock is 1MV coded, a decoder takes the buffered motion vector from the top field of the co-located macroblock in the anchor frame, and generates one pair of direct motion vectors—one each for the forward and backward directions. If the current direct mode macroblock is field coded, a decoder takes both the buffered bottom field and top field motion vectors from the co-located macroblock in the anchor frame and generates two pairs of motion vectors, giving a total of four motion vectors for the current direct mode macroblock—one for each field in both forward and backward directions.

Figure 43:
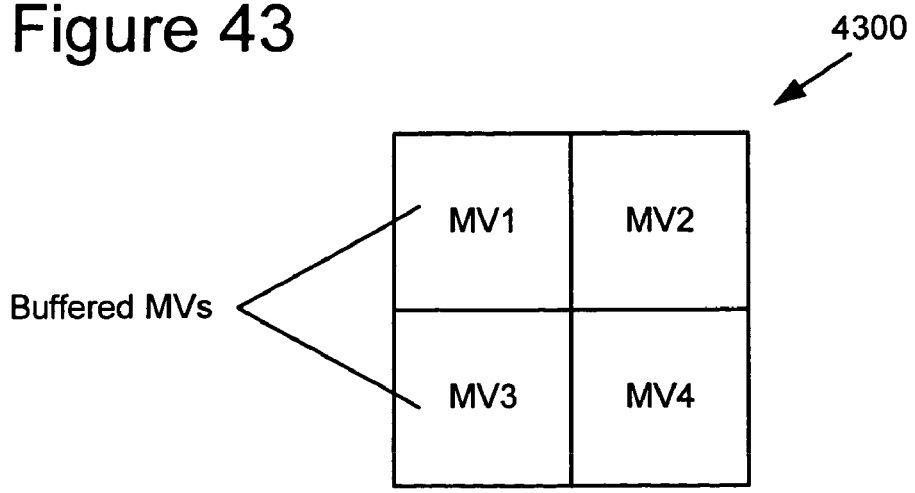
FIG. 43 is a diagram showing buffered motion vectors for the blocks of a co-located macroblock of a previously decoded, temporally subsequent anchor frame, for use in computing direct mode motion vector(s) for a macroblock of an interlaced B-frame.

FIG. 43 shows motion vectors MV1, MV2, MV3 and MV4 for the blocks of a co-located macroblock 4300 of a previously decoded, temporally future anchor frame. If the co-located macroblock is a 1MV macroblock, MV1, MV2, MV3 and MV4 are all equal. If the co-located macroblock is a 2 Field MV macroblock, MV1 and MV2 are equal to one value and MV3 and MV4 are equal to another. If the co-located macroblock of the anchor frame is a 4 Field MV or 4 Frame MV macroblock, MV1, MV2, MV3 and MV4 may all be different values. Even if MV1, MV2, MV3, and MV4 are available, however, the decoder buffers only MV1 and MV3.

In the example shown in FIG. 43, the decoder buffers MV1 and MV3. If the current macroblock uses 1MV mode, the decoder chooses MV1 to compute the forward and backward direct mode motion vectors for the current macroblock, and ignores MV3. If the current macroblock uses 2 Field MV mode, the decoder uses both MV1 and MV3 to compute the four direct mode motion vectors. This operation yields a good representation of motion for the top and bottom fields of the current macroblock.

When the motion vectors from the co-located macroblock in the anchor frame have been selected, the decoder applies scaling logic to derive the corresponding forward and backward pointing motion vectors for the B frame macroblock's direct mode prediction. For example, the decoder can apply function Scale_Direct_MV in FIG. 19. Or, the decoder applies a different scaling function.

Alternatively, an encoder/decoder can buffer four motion vectors per macroblock of an anchor frame. For example, if the current macroblock is 1MV coded, the encoder/decoder can take the top-left motion vector of the co-located macroblock in the anchor frame and generate one pair of direct motion vectors, or take the average of the four motion vectors for the macroblock of the anchor frame. If the current macroblock is field-coded, the encoder/decoder can take the top-left and bottom-left motion vectors and generate two pairs (one for each field), or take the average of the top motion vectors and the average of the bottom motion vectors for the macroblock of the anchor frame.

Direct mode motion vectors are treated as (0, 0) when the co-located macroblock in the anchor frame is Intra, or when the anchor frame is an I-frame.

VIII. 4MV Coding in Interlaced B-fields and Interlaced B-frames

In some implementations, an encoder encodes interlaced B-fields and interlaced B-frames using a four-motion-vector (4MV) coding mode. 4MV coding can allow more accurate representation of complex motion trajectories than one-motion-vector (1MV) coding (e.g., by allowing the four luma blocks in a macroblock to be predicted and motion compensated independently). The use of 4MV can be limited to certain prediction modes. For example, in some implementations, an encoder uses 4MV for forward and backward modes (both field and frame varieties) but not direct or interpolated modes. This differs from progressive coding modes where 4MV is not used in progressive B-frames.

Direct and interpolated modes involve pixel averaging when computing a motion-compensated prediction, which tends to smooth over fine details. If such smoothing is acceptable, it is likely that 1MV mode can be effectively used instead of 4MV mode, because 1MV is cheaper to code and can be used to accurately describe smooth motion trajectories. Experimentation has shown a benefit for using 4MV mode for macroblocks of interlaced B-fields and interlaced B-frames, but restricting 4MV mode to forward- and backward-predicted macroblocks. Another factor in favor of restricting 4MV to forward and backward modes is that combining 4MV with direct or interpolated modes would result in a total of eight motion vectors in each case. The signaling overhead (for interpolated mode) and implementation and decoding complexity associated with eight motion vectors generally offsets accuracy benefits. Moreover, it often is not practical to encode interlaced B-pictures with eight motion vectors when P-pictures, which are usually coded at a higher quality setting (i.e., quantized less severely), can usually use only one or four motion vectors for motion compensation.

Restricting 4MV to certain prediction modes has other benefits as well. For example, if 4MV is restricted to only forward and backward prediction modes, and if a forward/non-forward mode decision has already been signaled (e.g., in a bitplane coding technique such as one described below in Section XI), an encoder does not need to send any additional bits to signal the prediction mode for a 4MV macroblock.

The following pseudo-code is applicable to macroblocks of interlaced B-fields where the forward/non-forward decisions are bitplane-coded and sent ahead of any macroblock-level information (e.g., sent at picture level):

If MB is 4MV coded AND prediction mode is NOT forward
Then prediction mode=Backward (don't send any more bits to signal mode)

In some implementations, direct/non-direct prediction mode decisions are sent ahead of any macroblock-level information (e.g., in a compressed bitplane at picture level). (For more information on coding direct/non-direct information, see U.S. patent application Ser. No. 10/622,378, entitled, "Advanced Bi-Directional Predictive Coding of Video Frames," filed Jul. 18, 2003.) The following pseudo-code is applicable to macroblocks of interlaced B-frames where 4MV is restricted to forward and backward modes in such implementations:

If MB is 4MV coded AND prediction mode is NOT direct
Then send one additional bit to signal prediction mode (forward or backward)

Alternatively, 4MV is used for prediction modes other than or in addition to forward or backward modes, is not used for forward mode, is not used for backward mode, or is not used for any prediction mode. For example, in some implementations, 4MV is used for interlaced B-fields but not for interlaced B-frames. In other alternatives, other codes or code-lengths can be used to signal prediction modes in combination with 4MV coding.

IX. Predicting Motion Vectors in Interlaced B-pictures Using Separate Forward and Backward Motion Vector Buffers Motion vectors for interlaced B-pictures are predicted using separate forward and backward motion vector contexts. In general, forward motion vectors are predicted using motion vectors stored in a forward motion vector buffer, and backward motion vectors are predicted using motion vectors stored in a backward motion vector buffer. The resulting motion vectors for current macroblocks are then stored in the appropriate buffers, and can be used in subsequent motion vector prediction for other macroblocks. Typically, corresponding spaces in both forward and backward motion vector buffers are filled for each macroblock, even if a given macroblock is predicted with only forward motion vectors (in the case of a forward-predicted macroblock) or only backward motion vectors (in the case of backward-predicted macroblock). The following sections describe techniques for predicting motion vectors in interlaced B-pictures (e.g., interlaced B-fields, interlaced B-frames) and for "filling in" corresponding spaces in motion vector buffers for "missing" forward or backward motion vectors.

A. Forward and Backward Buffers

When predicting motion vectors for interlaced B-pictures, an encoder/decoder uses previously reconstructed motion vectors in a forward motion vector buffer and/or backward motion vector buffer. In forward mode, the encoder/decoder uses reconstructed forward motion vectors from the forward motion vector buffer to predict current motion vectors for forward motion compensation. In backward mode, the encoder/decoder uses reconstructed backward motion vectors from the backward motion vector buffer to predict current motion vectors for backward motion compensation. For direct mode or interpolated mode macroblocks, the encoder/decoder uses both the forward motion vector buffer to predict a forward motion vector component (or potentially multiple forward motion components) and predict the backward motion vector buffer to predict a backward component (or potentially multiple backward motion components).

After reconstructing motion vectors for interlaced B-pictures, an encoder/decoder buffers the reconstructed forward motion vectors in a forward motion vector buffer and buffers the reconstructed backward motion vectors in a backward motion vector buffer. In forward mode, the encoder/decoder stores reconstructed forward motion vectors in the forward motion vector buffer. In backward mode, the encoder/decoder stores reconstructed backward motion vectors in the backward motion vector buffer. For macroblocks that use either direct or interpolated prediction modes, the encoder/decoder stores both forward motion vector component(s) in the forward motion vector buffer and backward motion vector component(s) in the backward motion vector buffer.

For example, if an encoder is encoding a forward-predicted macroblock at macroblock coordinate position (12, 13) in an interlaced B-picture, the encoder computes a forward motion vector predictor and sends a residual (assuming the macroblock is not "skipped") for the forward motion vector in the bitstream. The decoder decodes the residual (i.e., differential), and reconstructs the motion vector. The encoder/decoder inserts the reconstructed motion vector in the forward motion vector buffer. The encoder/decoder then uses motion vector prediction logic to compute a backward motion vector predictor to be a fill-in backward motion vector, and puts the backward motion vector in the backward motion vector buffer at position (12, 13). For example, in a median-of-3 prediction scenario, the encoder/decoder can take the median of the buffered backward motion vectors at positions (11, 13), (12, 12) and (13,12) (the left, top, and top-right neighbors of the current forward-predicted macroblock) to fill in the backward motion vector for (12, 13).

Figure 44:
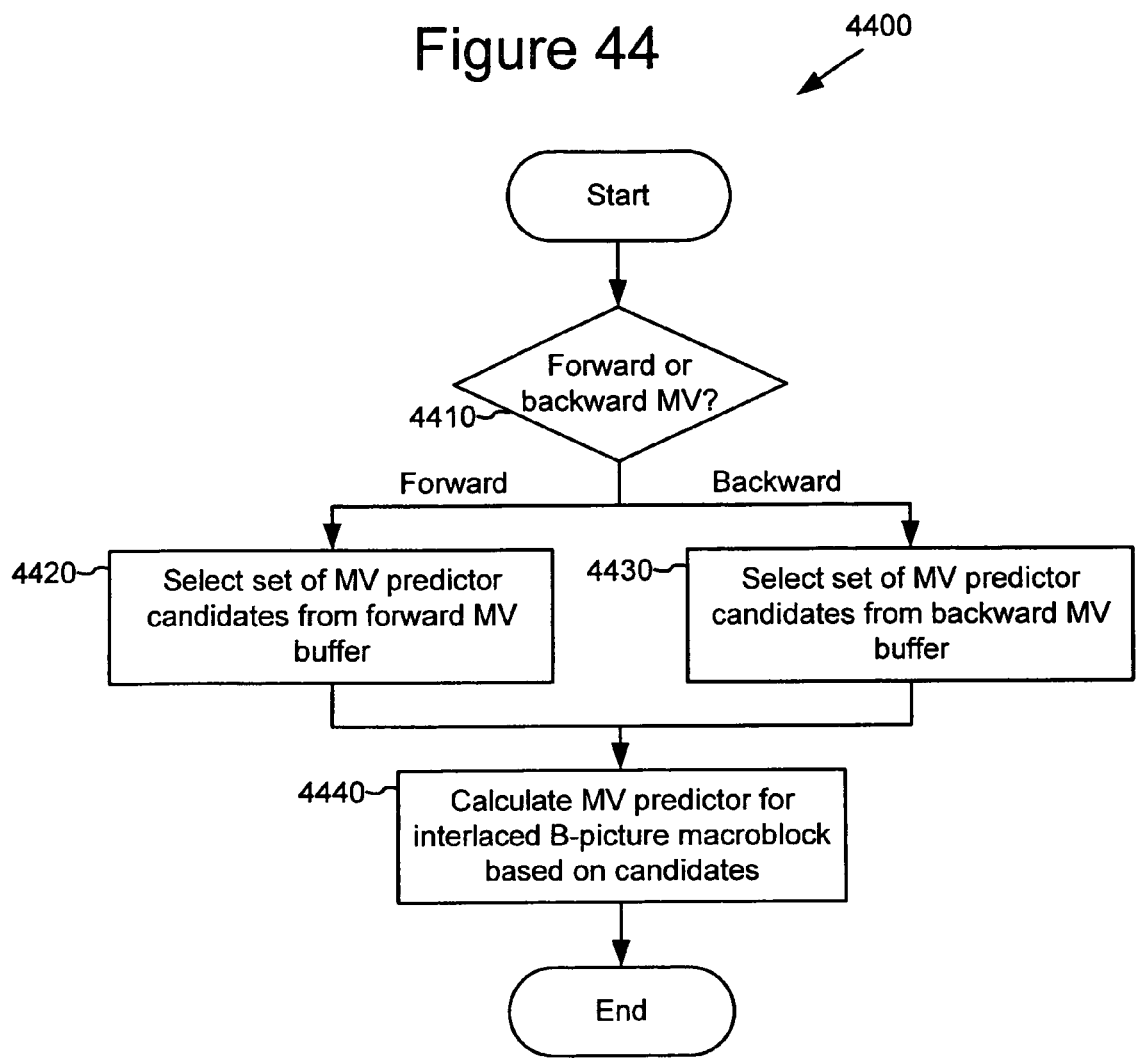
FIG. 44 is a flow chart showing a technique for predicting motion vectors for a current macroblock in an interlaced B-picture using a forward and/or backward motion vector buffer.

FIG. 44 shows a technique 4400 for predicting motion vectors for a current macroblock in an interlaced B-picture using a forward and/or backward motion vector buffer. At 4410, depending on whether the motion vector to be predicted is a forward or backward motion vector, the encoder/decoder chooses whether to use the forward or backward motion vector buffer. If the current motion vector is a forward motion vector, the encoder/decoder selects a set of motion vector predictor candidates from the forward motion vector buffer at 4420. If the current motion vector is a backward motion vector, the encoder/decoder selects a set of motion vector predictor candidates from the backward motion vector buffer at 4430. At 4440, the encoder/decoder calculates a motion vector predictor based on the set of set of motion vector predictor candidates. For example, the encoder/decoder computes the median of the set of motion vector predictor candidates. In a simple case, the encoder/decoder computes a motion vector predictor for a 1MV current macroblock based upon predictors that were all 1MV macroblocks. More complex variations are described below in which the current macroblock and/or neighboring macroblocks have different modes.

Figure 45:
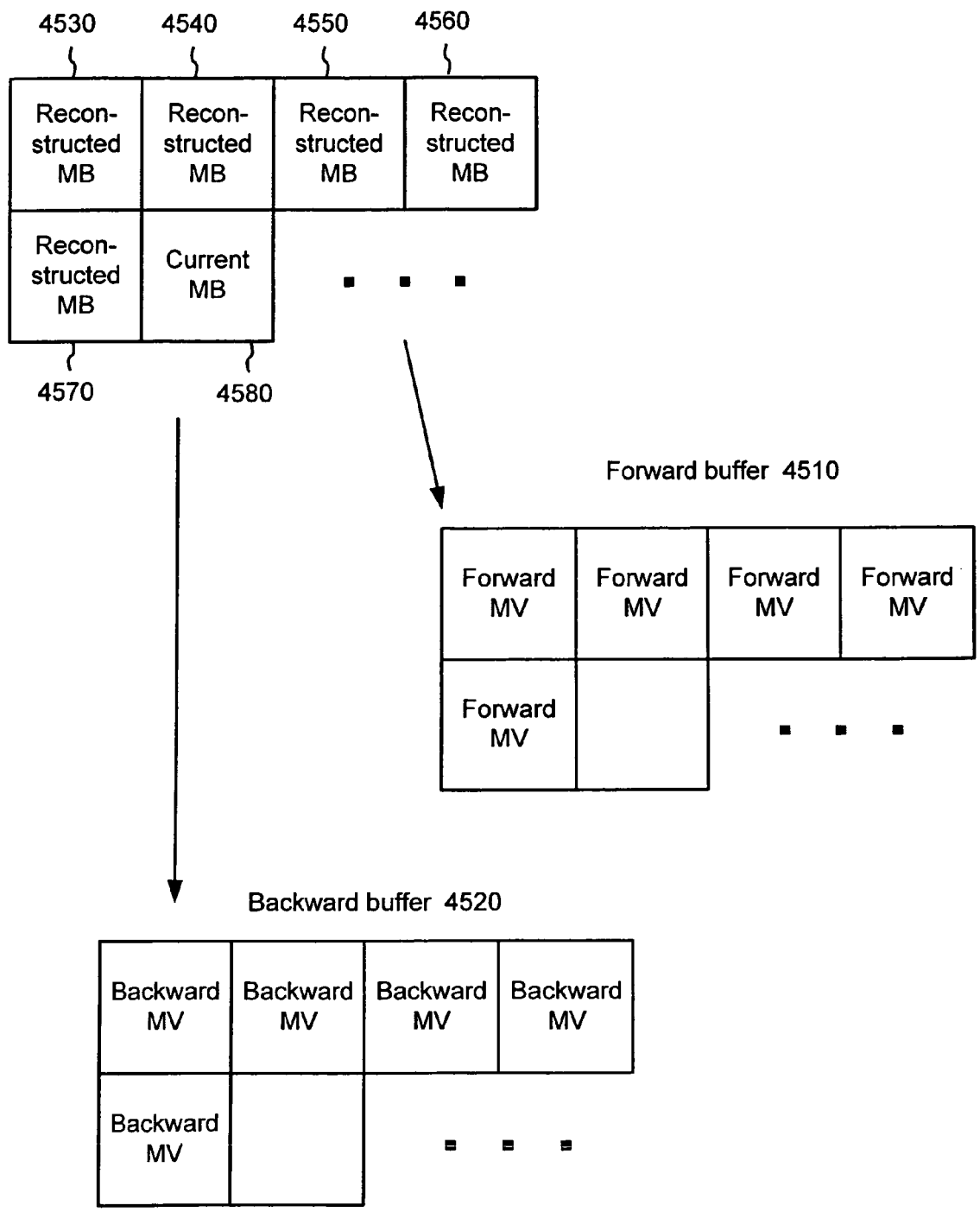
FIG. 45 is a diagram showing motion vectors in a forward motion vector buffer and a backward motion vector buffer for predicting motion vectors for macroblocks.

FIG. 45 shows motion vectors in a forward motion vector buffer 4510 and a backward motion vector buffer 4520. In the example shown in FIG. 45, for the reconstructed macroblocks 4530-4570, an encoder/decoder stores forward motion vectors in the forward motion vector buffer 4510 and backward motion vectors in the backward motion vector buffer 4520. To predict the motion vector for the current macroblock 4580, the encoder/decoder uses candidate predictors from neighboring macroblocks. For example, if the current macroblock 4580 is predicted in forward mode, the encoder can predict the forward motion vector using neighboring forward motion vectors in the forward motion vector buffer (e.g., using median-of-3 prediction), then later fill in the current macroblock position in the forward motion vector buffer with the reconstructed motion vector value. To fill in the corresponding current macroblock position in the backward motion vector buffer 4520, the encoder/decoder can predict a backward motion vector using neighboring backward motion vectors in the backward motion buffer and put the predictor in the position for the current macroblock in the backward motion vector buffer.

B. Motion Vector Prediction in Interlaced B-frames

In some implementations, an encoder/decoder employs the following scheme for predicting motion vectors for macroblocks (including separate fields thereof) in interlaced B-frames, which uses separate forward and backward motion vector contexts. FIGS. 40A-40B show neighboring macroblocks from which the candidate motion vectors are gathered.

If a 1MV macroblock is forward-predicted, an encoder/decoder predicts its forward motion vector from candidate motion vectors of the forward motion vector buffer (e.g., using median-of-3 prediction and prediction patterns such as those shown in FIGS. 40A and 40B or elsewhere). The encoder/decoder stores the forward motion vector (after adding the motion vector prediction error) in the forward motion vector buffer. The encoder/decoder fills in "holes" by predicting a backward motion vector from candidate motion vectors of the backward motion vector buffer (e.g., as in the forward-prediction case), and stores the backward motion vector (here, the predictor) in the backward motion vector buffer.

If the 1MV macroblock is backward-predicted, an encoder/decoder predicts its backward motion vector from candidate motion vectors of the backward motion vector buffer (e.g., as in the forward-prediction case). The encoder/decoder stores the backward motion vector (after adding the prediction error) in the backward motion vector buffer. The encoder/decoder fills in holes by predicting a forward motion vector from candidate motion vectors of the forward motion vector buffer, and stores the forward motion vector (here, the predictor) in the forward motion vector buffer.

Neighbors that are intra-coded macroblocks are ignored in the forward and backward motion vector buffers.

Various special cases address combinations of 1MV and field-coded 2MV macroblocks in interlaced B-frames. If a neighboring macroblock in position A, B, or C for a current 1MV macroblock is a field-coded 2MV macroblock, the encoder/decoder takes the average of the field motion vectors for the 2MV macroblock as the motion vector predictor for that position.

For a forward-predicted current 2 Field MV macroblock, for example, for each of two forward-predicted field motion vectors, the candidate motion vectors from the neighbors are collected from the forward motion vector buffer. The encoder/decoder selects a set of candidate motion vectors based on the coding mode (e.g., intra, 1MV, 2 Field MV) of the neighboring macroblocks, which are stored in the forward motion vector buffer. If a neighboring macroblock exists and is not intra coded, the encoder/decoder looks to the motion vector(s) for the macroblock to add to the set of candidates. In some embodiments, the encoder/decoder proceeds as follows. For the top field forward motion vector, if a neighboring macroblock in position A, B, or C is a 1MV macroblock, the encoder adds the macroblock's motion vector from the corresponding position of the forward motion vector buffer to the set of candidates. For a neighboring macroblock in position A, B, or C that is a 2 Field MV macroblock, the encoder/decoder adds the top field MV from the corresponding position of the forward motion vector buffer to the set.

For the bottom field forward motion vector, if a neighboring macroblock in position A, B, or C is a 1MV macroblock, the encoder adds the macroblock's motion vector from the corresponding position of the forward motion vector buffer to the set of candidates. For a neighboring macroblock in position A, B, or C that is a 2 Field MV macroblock, the encoder/decoder adds the bottom field motion vector from the corresponding position of the forward motion vector buffer to the set.

To compute predictors for field motion vectors in 2 Field MV macroblocks, the encoder/decoder then computes the medians of the sets of candidates.

To compute a backward-predicted motion vectors for a 2 Field MV macroblock, the logic is the same as the forward-prediction case, but the candidate motion vectors from the neighbors are collected from the backward motion vector buffer.

Again, neighbors in position A, B, or C that are intra-coded are ignored for motion vector prediction.

After reconstruction of the motion vectors for a 2 field MV macroblock (e.g., by adding motion vector differential information), the reconstructed actual motion vectors are put in the forward motion vector buffer or backward motion vector buffer, as appropriate for the prediction direction of the reconstructed motion vectors. The corresponding empty slots of the motion vector buffer for the missing direction are filled by computing motion vector predictors for the missing direction and storing the motion vector predictors in the empty slots.

An exception applies for hole-filling for field-coded macroblocks within interlaced B-frames if prediction mode switching is being used (see Section VI, above). In this case, a given field-coded 2MV macroblock has one forward motion vector and one backward motion vector. After reconstruction of a field-coded macroblock of an interlaced B-frame, where the field-coded macroblock switches prediction directions between the top and bottom fields, the encoder/decoder fills in both the top and bottom motion vector "slots" of the forward motion vector buffer with the forward motion vector, and fills in both the top and bottom motion vector slots of the backward buffer with the backward motion vector. Although the forward motion vector is sent only for one field (e.g., the top field), the encoder puts the same motion vector into both top and bottom field motion vector slots for the forward motion vector buffer. Similarly, although the backward motion vector is sent only for the bottom field, the encoder puts it into both top and bottom field slots of the backward motion vector buffer.

Figure 46:
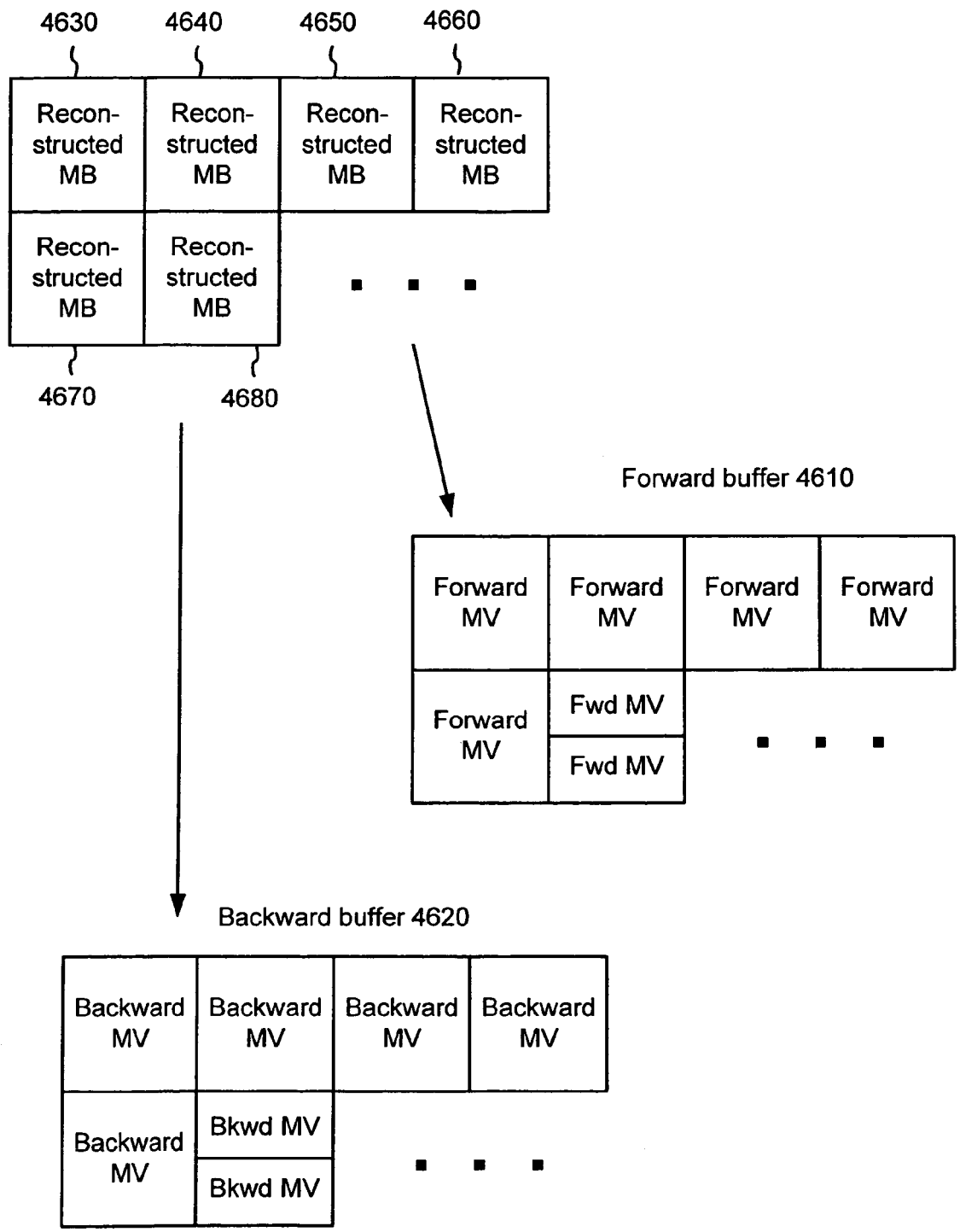
FIG. 46 is a diagram showing top and bottom field motion vectors for a reconstructed macroblock in a forward motion vector buffer and a backward motion vector buffer.

For example, FIG. 46 shows top and bottom field motion vectors for a reconstructed macroblock 4680 in a forward motion vector buffer 4610 and a backward motion vector buffer 4620. In the example shown in FIG. 46, for the reconstructed macroblocks 4630-4670, an encoder/decoder stores forward motion vectors in the forward motion vector buffer 4610 and backward motion vectors in the backward buffer 4620. Reconstructed macroblock 4680 is field coded with prediction switching, and its top field motion vector is stored in the top and bottom locations in either the forward or the backward motion vector buffer (depending on the prediction direction of the top field motion vector). The bottom field motion vector of the macroblock 4680 is stored in the top and bottom locations of the other motion vector buffer. In this example, reconstructed macroblock 4680 uses prediction mode switching. Although the forward motion vector and backward motion vector are each sent for only one field, the encoder puts the same motion vector into both top and bottom field motion vector slots for the respective forward and backward motion vector buffers.

If the current macroblock is interpolated, an encoder/decoder uses the forward motion vector buffer to predict the forward motion vector (or forward motion vectors for a 2 Field MV macroblock), uses the backward motion vector buffer to predict the backward motion vector (or backward motion vectors for a 2 Field MV macroblock), and stores the forward and backward motion vectors (after adding the prediction errors, once these have been calculated), in the forward and backward motion vector buffers, respectively.

If the macroblock is direct-predicted in an interlaced B-frame, an encoder/decoder can use a technique described in Section VII, above.

In some implementations, 1MV macroblocks, 2 Field MV macroblocks, and intra macroblocks are allowed for interlaced B-frames (but not other MV macroblock types), which simplifies the logic for predicting motion vectors since fewer current/neighbor mode combinations need to be addressed. Alternatively, other and/or additional MV modes such as 4 Frame MV macroblocks and 4 Field MV macroblocks are allowed. For example, parts of the pseudocode shown in FIGS. 64, 69, and 70 may be used to address such other combinations in interlaced B-frames.

C. Motion Vector Prediction for Interlaced B-fields

In general, for an interlaced B-field, previously reconstructed (or derived) forward field motion vectors are used as predictors for current forward field motion vectors, and previously reconstructed (or derived) backward field motion vectors are used as predictors for current backward field motion vectors. In forward or backward mode, the current forward or backward field motion vectors are added to the appropriate motion vector buffer, and a motion vector for the other (missing) direction (e.g., the backward direction in forward mode, or the forward direction in backward mode) is derived for later use as a predictor.

In some implementations, field motion vector prediction selection is performed according to the two-reference-field motion vector prediction logic described above in Section III.A.2 of the Detailed Description and below at Section XIV.B.3. For example, the pseudo-code shown in FIGS. 33A-33F is used to compute two field forward motion vector predictors for a macroblock of an interlaced B-field, and one motion vector predictor is selected for use in reconstructing the forward field motion vector. The reconstructed motion vector value is then put in the forward motion vector buffer. The pseudo-code is also used to compute two field backward motion vector predictors for the macroblock, and one predictor is selected for use as a fill-in value for the backward motion vector buffer. For interlaced B-fields, to fill in "holes" in a missing-direction motion vector buffer, an encoder/decoder chooses between motion vector predictors of the same polarity and the opposite polarity. This choice between polarities arises because two predictors are generated in a given missing direction-one of the same polarity as the current field, and one of the opposite polarity as the current field. Therefore, in some implementations, the encoder/decoder chooses the majority or "dominant" polarity predictor for the missing-direction motion vector. In this way, a complete set of both forward and backward motion vectors is present for use in motion vector prediction. Alternatively, the dominant polarity is determined and predictor selection is performed first, and only the selected motion vector predictor is computed.

The processes of real-value buffering and hole-filling by selecting from among field motion vector predictors of different polarities in one implementation is shown in the pseudo-code 4700 in FIG. 47. The pseudo-code 4700 shows that during hole-filling prediction, no actual motion vector is present for the missing direction, so the predicted missing-direction motion vector having the dominant polarity is chosen by the encoder/decoder.

In some implementations, the overall scheme for interlaced B-field motion vector prediction is as follows.

If the macroblock is forward-predicted, an encoder/decoder predicts its forward motion vector from candidate same and/or opposite polarity motion vectors of the forward motion vector buffer (e.g., using median-of-3 prediction from the left, top, and top-right neighbors for most cases) or motion vectors derived from the buffered motion vectors. The encoder/decoder stores the reconstructed forward motion vector in the forward motion vector buffer and computes and stores the dominant backward motion vector predictor (similarly predicted with median-of-3 from the spatial neighborhood of the backward motion vector buffer) in the corresponding position in the backward motion vector buffer.

If the macroblock is backward-predicted, an encoder/decoder predicts its backward motion vector from candidate same and/or opposite polarity motion vectors of the backward motion vector buffer (e.g., using median-of-3 prediction from the left, top, and top-right neighbors for most cases) or motion vectors derived from the buffered motion vectors. The encoder/decoder stores the reconstructed backward motion vector in the backward motion vector buffer and computes and stores the dominant forward motion vector predictor (similarly predicted with median-of-3 from the spatial neighborhood of the forward motion vector buffer) in the corresponding position in the forward motion vector buffer.

If the macroblock is interpolated, an encoder/decoder uses the forward motion vector buffer to predict the forward motion vector component, uses the backward motion vector buffer to predict the backward motion vector component, and stores the reconstructed forward and backward motion vectors (after adding prediction errors, once these have been calculated), in the forward and backward motion vector buffers, respectively.

If the macroblock is direct predicted, the encoder/decoder computes the direct mode motion vectors for the current field and stores the forward and backward motion vector components in the respective motion vector buffers.

Neighbors that are intra-coded macroblocks are ignored in the motion vector prediction.

Various special cases address combinations of 1MV and 4MV macroblocks in interlaced B-fields. FIGS. 6A-10 show predictor patterns for motion vector prediction for progressive P-frames. These same patterns show the locations of the blocks or macroblocks considered for the candidate motion vectors for motion vector prediction for a motion vector for a 1MV or 4MV macroblock in Mixed-MV interlaced B-fields. For the special case where the frame is one macroblock wide, the predictor is always Predictor A (the top predictor). Various other rules address other special cases such as top row blocks for top row 4MV macroblocks, top row 1MV macroblocks, and intra-coded predictors.

The predictor patterns shown in FIGS. 6A-10 are used for forward prediction using candidates from positions in the forward motion vector buffer, and also for backward prediction using candidates from positions in the backward motion vector buffer. Moreover, the predictor patterns shown in FIGS. 6A-10 are used in conjunction with the two-reference-field motion vector prediction logic discussed above for interlaced B-fields.

FIGS. 6A and 6B show locations of blocks considered for candidate motion vector predictors for a 1MV current macroblock in a Mixed-MV interlaced B-field. The neighboring macroblocks may be 1MV or 4MV macroblocks. FIGS. 6A and 6B show the locations for the candidate motion vectors assuming the neighbors are 4MV (i.e., predictor A is the motion vector for block 2 in the macroblock above the current macroblock, and predictor C is the motion vector for block 1 in the macroblock immediately to the left of the current macroblock). If any of the neighbors is a 1MV macroblock, then the motion vector predictor shown in FIGS. 5A and 5B is taken to be the motion vector predictor for the entire macroblock. As FIG. 6B shows, if the macroblock is the last macroblock in the row, then Predictor B is from block 3 of the top-left macroblock instead of from block 2 in the top-right macroblock as is the case otherwise.

FIGS. 7A-10 show the locations of blocks considered for candidate motion vector predictors for each of the 4 luminance blocks in a 4MV macroblock of a Mixed-MV interlaced B-field. FIGS. 7A and 7B are diagrams showing the locations of blocks considered for candidate motion vector predictors for a block at position 0; FIGS. 8A and 8B are diagrams showing the locations of blocks considered for candidate motion vector predictors for a block at position 1; FIG. 9 is a diagram showing the locations of blocks considered for candidate motion vector predictors for a block at position 2; and FIG. 10 is a diagram showing the locations of blocks considered for candidate motion vector predictors for a block at position 3. Again, if a neighbor is a 1MV macroblock, the motion vector predictor for the macroblock is used for the blocks of the macroblock.

For the case where the macroblock is the first macroblock in the row, Predictor B for block 0 is handled differently than block 0 for the remaining macroblocks in the row (see FIGS. 7A and 7B). In this case, Predictor B is taken from block 3 in the macroblock immediately above the current macroblock instead of from block 3 in the macroblock above and to the left of current macroblock, as is the case otherwise. Similarly, for the case where the macroblock is the last macroblock in the row, Predictor B for block 1 is handled differently (FIGS. 8A and 8B). In this case, the predictor is taken from block 2 in the macroblock immediately above the current macroblock instead of from block 2 in the macroblock above and to the right of the current macroblock, as is the case otherwise. In general, if the macroblock is in the first macroblock column, then Predictor C for blocks 0 and 2 are set equal to 0.

Again, neighbors in position A, B, or C that are intra-coded are ignored for motion vector prediction.

After reconstruction of the motion vectors for a 4MV macroblock (e.g., by adding motion vector differential information), the reconstructed actual motion vectors are put in the forward motion vector buffer or backward motion vector buffer, as appropriate for the prediction direction of the reconstructed motion vectors. The corresponding empty slots of the motion vector buffer for the missing direction are filled by computing motion vector predictors for the missing direction for the same and opposite polarities, selecting between the different polarity motion vector predictors, and storing the motion vector predictors in the empty slots.

Referring again to FIGS. 34A and 34B, for motion vector prediction, an encoder/decoder derives one field motion vector predictor from another field motion vector predictor using the scaling operation illustrated in the pseudo-code 3400. Two possible sets of values are shown in table 3500 in FIG. 35 for the case where the current field is first field in the interlaced video frame, and in table 3600 in FIG. 36 for the case where the current field is the second field in the interlaced video frame. In tables 3500 and 3600, the values of SCALEOPP, SCALESAME1, SCALESAME2, SCALEZONE1_X, SCALEZONE1_Y, ZONE1OFFSET_X and ZONE1OFFSET_Y depend on reference frame distance.

In some implementations, the reference frame distances for forward and backward references in interlaced B-fields are calculated using fraction coding. The BFRACTION syntax element (which is signaled for forward or backward prediction mode macroblocks of interlaced B-fields, not just direct mode macroblocks of interlaced B-fields) is used to derive forward and backward reference picture distances as shown in the following pseudo-code:

Forward Reference Frame distance (*FRFD*)=*NINT*
((*BFRACTION* numerator/*BFRACTION* denominator)*Reference Frame Distance)−1 if (*FRFD*<0) then *FRFD*=0

Backward Reference Frame Distance (*BRFD*)=Reference Frame Distance−*FRFD*−1

(where NINT is a nearest integer operator.)

The BFRACTION numerator and denominator are decoded from the BFRACTION syntax element. The element BFRACTION can be used to represent different fractions that can be sent in a bitstream (e.g., at frame level for interlaced B-fields). The fraction takes on a limited set of discrete values between 0 and 1 and denotes the relative temporal position of the B-picture within the interval formed by its anchors.

For forward prediction and for backward prediction of the second field in a frame having interlaced B-fields, the encoder/decoder performs motion vector scaling according to the pseudo-code 3400 in FIGS. 34A and 34B. However, in some implementations an encoder/decoder performing backward motion vector prediction for the first field uses the functions scaleforopposite_x, scaleforopposite_y, scaleforsame_x and scaleforsame_y as defined in the pseudo-code 4800 shown in FIG. 48. The values of SCALESAME, SCALEOPP1, SCALEOPP2, SCALEZONE1_X, SCALEZONE1_Y, ZONE1OFFSET_X and ZONE1OFFSET_Y for a first interlaced B-field in one implementation are shown in the table 4900 in FIG. 49. In table 4900 the relationship between the variable N and the motion vector range is the same as the relationship described with reference to FIGS. 35 and 36 and Table 1, above Alternatively, reference frame distances are calculated in another way or scaling is performed according to different algorithms. For example, scaling is performed without regard to the value of N (i.e., N is assumed to be 1).

X. "Self-referencing" Frames with Interlaced B-fields

Frames having interlaced B-fields are encoded as two separate (and somewhat independently coded) fields. The top field consists of the even raster lines (starting with line 0) of the frame, and the bottom field consists of odd raster lines of the frame. Because the fields in "field pictures" are independently decodable, they need not be sent in any pre-set order. For example, an encoder can send the bottom field first followed by the top field, or vice-versa. In some implementations, the order of the two fields is indicated by a "top field first" syntax element, which is either true or false depending on the correct temporal order for decoding the two fields of a frame.

Prior encoders and decoders have used the previous and next anchor frames (e.g., I- or P-frames) or fields in the previous and next anchor frames as the "reference" pictures to perform motion compensation for a current B-picture. Prior encoders and decoders also have restricted B-pictures or any parts thereof from being used as motion compensation references for any picture. In some implementations of the described techniques and tools, however, one or more of these "rules" are relaxed.

For example, in some implementations, a first interlaced B-field references the first and second fields from the previous and next anchor pictures. The second interlaced B-field references the first interlaced B-field from the current picture as the "opposite polarity" field and the same polarity field of the previous anchor frame as the "same polarity" field, in addition to the first and second fields of the next anchor picture.

Figure 50A:
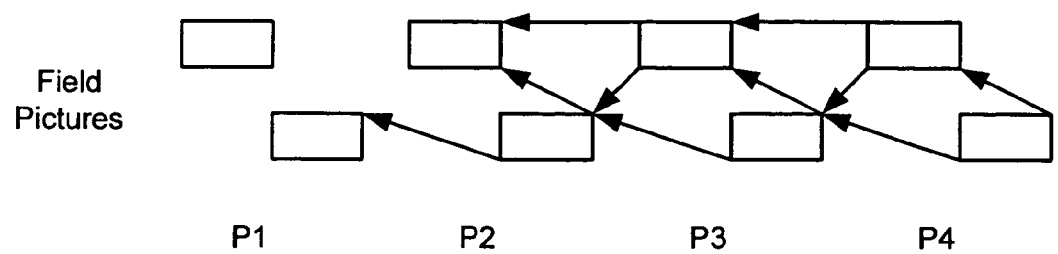
FIGS. 50A and 50B are diagrams showing reference fields for an interlaced B-field.
Figure 50B:
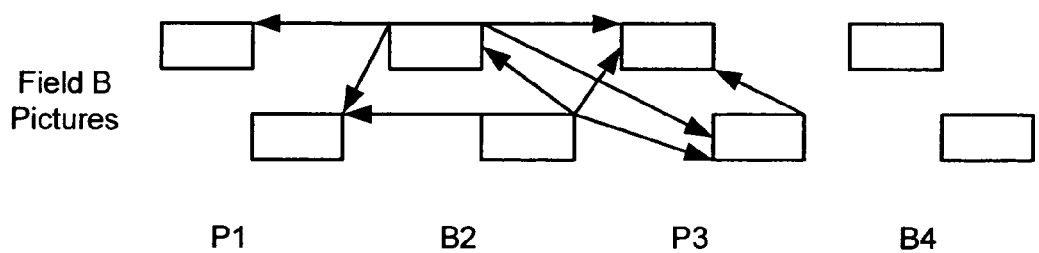

FIG. 50B is a diagram showing reference fields for each of two interlaced B-fields in an interlaced video frame B2. In the example shown in FIG. 50B, the first B-field to be decoded (here, the top field) is allowed to refer to two reference fields in the forward (temporal past) anchor P1 and two reference fields from the backward (temporal future) anchor P3, for a total of four reference fields. The second interlaced B-field to be decoded for B2 is allowed to reference the first field from the same interlaced video frame (thus breaking with the convention of not allowing parts of B-pictures to act as references) and one reference field from the previous anchor P1, as well as both fields from the future anchor P3. For the sake of comparison, FIG. 50A shows a convention followed by interlaced P-fields of interlaced video frames.

Techniques and tools that implement these interlaced B-field reference rules can provide better compression. Field coding of interlace video is most efficient for encoding high motion, i.e., when there is considerable movement between top and bottom fields. In this scenario, for example, the top (and first coded) field of a frame will be a much better predictor for the pixels in the bottom field of the same frame than the top field taken from the previous frame, which comes from a greater temporal distance away. Because of their greater temporal distance, these temporally further predictors offer much weaker prediction when motion is high. Moreover, the probability of occlusions is magnified for predictors that are more temporally remote, which results in more intra coded macroblocks that are expensive to code. In particular, experimentation verifies that allowing the second temporal interlaced B-field of a frame to refer to the first temporal interlaced B-field of the same frame can yield significant compression gains.

XI. Bitplane Coding of Forward Mode in Interlaced B-fields

As mentioned in Section X above, in some implementations a second coded interlaced B-field of a current frame can reference the first coded interlaced B-field of the current frame. This "self-referencing" technique is effective in interlaced B-fields in frames having high motion because the temporally closer B-field within the current frame is often a better predictor than temporally further anchor fields. When frames with interlaced B-fields have high motion and the second temporal interlaced B-field prefers the first temporal interlaced B-field as a predictive reference, then the more efficient prediction mode for the macroblocks in the second interlaced B-field will often be "forward."

Because forward mode prediction in interlaced B-fields is an effective tool for reducing bit rate, it is advantageous to reduce signaling overhead to reduce the overall cost of signaling forward mode prediction, especially in low bit rate situations. Accordingly, in some embodiments, an encoder encodes forward mode prediction information using a unified bitplane coding technique. For example, an encoder encodes forward mode prediction information in a compressed bitplane, where each bit in the bitplane is associated with a macroblock, and the value of each bit signals whether the macroblock was coded in forward mode or a non-forward prediction mode.

The compressed bitplane can be sent at the frame level, field level or at some other level. The bitplane coding technique takes advantage of forward mode bias compared to other prediction modes for interlaced B-fields. For example, if most of the macroblocks an interlaced B-field use forward prediction, an encoder can reduce signaling overhead to less than one bit per macroblock by bitplane coding the forward/non-forward decision.

Figure 51:
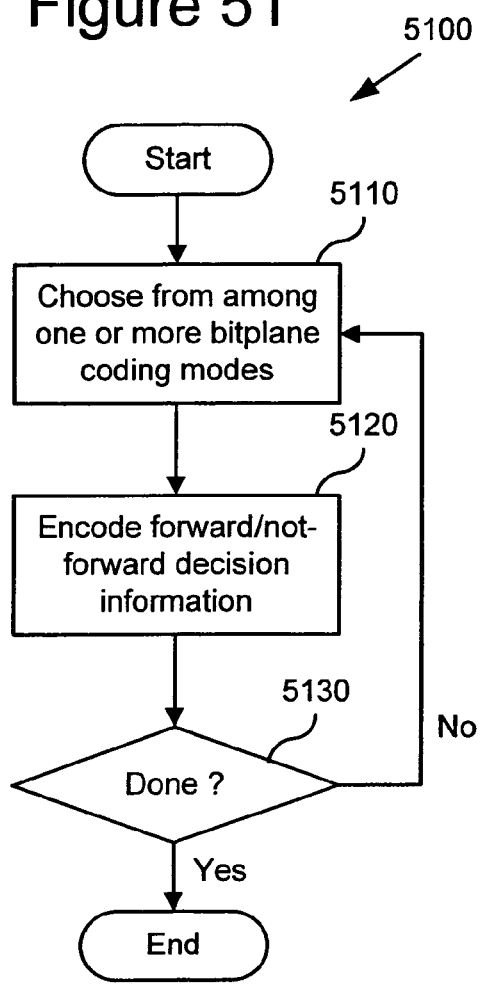
FIG. 51 is a flowchart showing a technique for encoding forward/not-forward prediction mode decision information for macroblocks of an interlaced B-field in a video encoder having one or more bitplane coding modes.
Figure 52:
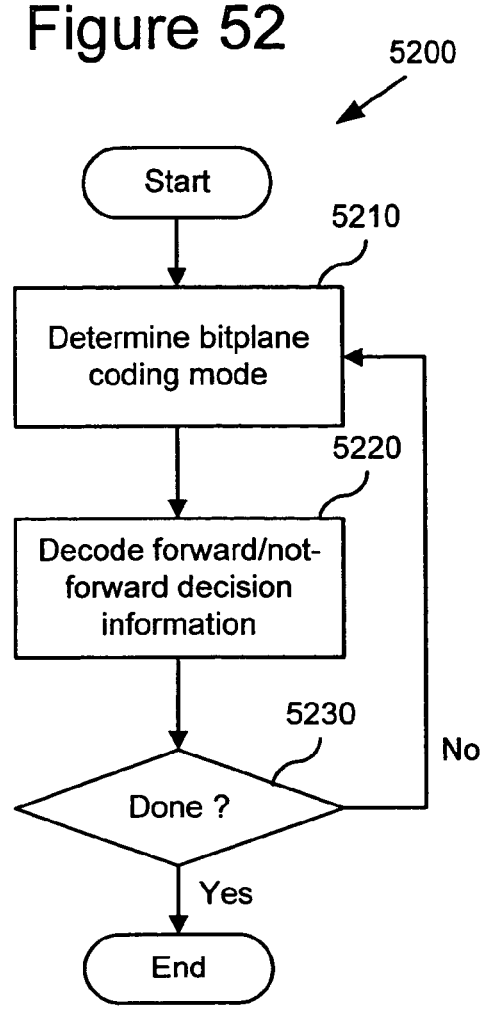
FIG. 52 is a flowchart showing a technique for decoding forward/not-forward prediction mode decision information for macroblocks of an interlaced B-field, which was encoded by a video encoder having one or more bitplane coding modes.

FIG. 51 shows a technique 5100 for encoding forward/not-forward prediction mode decision information for macroblocks of an interlaced B-field in a video encoder having one or more bitplane coding modes. FIG. 52 shows a corresponding technique 5200 for decoding forward/not-forward prediction mode decision information encoded by a video encoder having one or more bitplane coding modes.

With reference to FIG. 51, the encoder selects a bitplane coding mode for coding forward/not-forward prediction mode decision information 5110. After the coding mode is selected, the encoder encodes the forward/not-forward prediction mode decision information 5120 in the selected mode. The encoder selects bitplane coding modes on a field-by-field basis. Alternatively, the encoder selects bitplane coding modes on some other basis (e.g., at the sequence level). Or, if only one bitplane coding mode is used, no selection of bitplane coding modes is performed. When the encoder is done encoding the forward/not-forward prediction mode decision information 5130, encoding of the forward/not-forward prediction mode decision information ends.

With reference to FIG. 52, the decoder determines the bitplane coding mode used by (and signaled by) the encoder to encode the forward/not-forward prediction mode decision information 5210. The decoder then decodes the forward/not-forward prediction mode decision information 5220 in the selected mode. The decoder determines bitplane coding modes on a field-by-field basis. Alternatively, the decoder determines bitplane coding modes on some other basis (e.g., at the sequence level). Or, if only one bitplane coding mode is available, no selection of bitplane coding modes is performed. When the decoder is done decoding the forward/not-forward prediction mode decision information 5230, decoding of the forward/not-forward prediction mode decision information ends.

For additional details on signalling and decoding for various bitplane coding modes according to several combined implementations, see section XIV below. For more information on bitplane coding in general, see U.S. patent application Ser. No. 10/321,415, entitled, "Skip Macroblock Coding," filed Dec. 16, 2002, the disclosure of which is hereby incorporated by reference. Alternatively, bits representing forward/non-forward mode information can be sent uncompressed and/or at some other level (e.g., macroblock level).

If non-forward prediction is indicated, the encoder specifies the non-forward prediction mode (e.g., backward mode, direct mode, interpolated mode, or intra mode) for the macroblock. In some embodiments, an encoder codes non-forward prediction modes at macroblock level with reference to a VLC table, as shown in Table 2 below.

TABLE 2

Motion Prediction Mode VLC Table

| BMVTYPE VLC | Motion Prediction Mode |
|---|---|
| 0 | Backward |
| 10 | Direct |
| 11 | Interpolated |

In the example shown in Table 2, backward mode is the preferred non-forward prediction mode. The encoder represents backward mode with a one-bit signal and represents direct and interpolated modes with two-bit signals. Alternatively, the encoder uses different codes to represent different prediction modes and/or prefers a different non-forward prediction mode.

In some embodiments, intra mode is signaled by a special differential motion vector value, which indicates by the manner in which it is coded that the prediction mode is intra mode. The differential motion vector value is therefore used to infer that the macroblock is intra coded, but as a convention the encoder sets the prediction type to backward, so as not to have any undefined prediction types.

XII. Selection of Co-located Motion Vectors for Direct Mode in Interlaced B-fields In some implementations, direct mode motion vectors for macroblocks in field-coded B-pictures are selected using special logic. For a current macroblock in an interlaced B-field, if the co-located macroblock in the corresponding field of the next anchor picture was coded using four motion vectors, the logic favors the more dominant polarity (e.g., same or opposite) among the up to four motion vectors for the co-located macroblock. Once a motion vector to use for the current macroblock is selected, the encoder/decoder can apply scaling operations to give the direct mode motion vectors.

In some implementations, for a direct mode 1MV macroblock of an interlaced B-field, an encoder/decoder calculates the motion vector to use for direct mode scaling based on one or more motion vectors for the co-located macroblock in a reference field (e.g., the temporally next P-field) with the same polarity. If the co-located macroblock in the reference field is a 1MV macroblock, the encoder/decoder uses the single motion vector to derive direct mode motion vectors for the macroblock in the interlaced B-field. If, on the other hand, the co-located macroblock in the reference field is a 4MV macroblock, the encoder/decoder considers the polarities of the four motion vectors, favoring the dominant polarity, in selecting the motion vector used to derive the direct mode motion vectors for the macroblock in the interlaced B-field. The encoder/decoder may apply the selection logic to 4MV macroblocks in the reference field when needed during decoding of the interlaced B-field. Or, the encoder/decoder may apply the selection logic after decoding of the reference field, then buffering only the value to be used in later interlaced B-field decoding.

For example, for the co-located 4MV macroblock in the reference field, if the number of motion vectors (out of four) from the same polarity field outnumber those from the opposite polarity field, an encoder/decoder can use median-of-4, median-of-3, arithmetic-mean-of-2 or the values of the same polarity field motion vector to calculate a motion vector for use in direct mode interlaced B-field decoding, if the number of same polarity motion vectors is four, three, two, or one, respectively. Otherwise, if the motion vectors from the opposite polarity field outnumber those from the same polarity field, an encoder/decoder can use similar operations to get a representative motion vector from the opposite polarity field motion vectors for use in direct mode interlaced B-field decoding. If more than two of the original set of four motion vectors for the co-located macroblock (irrespective of polarity) are intra, then the encoder/decoder can simply treat the co-located representative motion vector as intra (i.e., (0, 0)). However, in some implementations, all intra MB's in interlaced B-fields are coded as 1MV, so the case where more than two of an original four motion vectors being intra leads to the co-located representative motion vector being treated as intra never arises in practice.

The pseudo-code 5300 in FIG. 53 shows a selection process for a motion vector to use as a basis for direct mode motion vectors in interlace B-fields. In some implementations, this selection process is a pre-cursor to scaling operations that produce forward and backward pointing direct mode motion vectors.

XIII. Intra-coded B-fields in Interlaced Video Frames

An interlaced BI-field (or "intra B-field") is a field that is coded independently from its reference pictures. Interlaced BI-fields are different than other intra fields (e.g., interlaced I-fields) in the sense that they may not be used as anchors to predict other pictures. There is no inter-picture dependency on the interlaced BI-field, and its presence in a bitstream does not represent the start of an independently decodable segment or group of pictures. However, a first field in an interlaced video frame, if coded as a BI-field, could be used to predict the second field in the frame, which may be coded as an interlaced B-field. This innovation also improves overall compression by only using intra coding for half of the frame (the first coded field) in many cases, rather than encoding an entire frame as an intra frame or encoding both fields as intra fields. In some implementations, a frame can comprise two B-fields, two BI-fields, or one B- and one BI-field.

There are reasons for using interlaced BI-fields rather than interlaced I-fields. One is to avoid sacrificing temporal scalability. For example, when a decoder is rendering digital video and needs to immediately drop some pictures to keep up with processing demands, it might look for a sequence of fields that it can potentially drop. If intra fields in the sequence turn out to be key fields, the decoder will be forced to decode them to use as references for other fields, and cannot drop them. However, if intra fields in the sequence are coded as BI-fields, the decoder will still have the option of dropping them without compromising subsequent motion compensation.

Interlaced BI-fields are different than interlaced B-fields with intra macroblocks in the sense that interlaced BI-fields more efficiently signal the syntax elements used for intra coding and decoding, since motion compensation-related elements within a BI-field (or elements signalling the absence thereof) may be avoided. In other words, a reason for using interlaced BI-fields (rather than regular B-fields) arises when coding an interlaced B-field at a point in a video sequence where inter-field prediction breaks down (e.g., due to scene changes or complex motion). Often, most macroblocks in such a field will need to be coded as intra macroblocks. In this scenario, it is often cheaper in terms of bit rate to code the entire B-field as a BI-field than to send prediction mode information for each macroblock in the field. When no good prediction or motion compensation is possible for an interlaced B-field, it can be coded as a BI-field.

In some implementations, an encoder can signal the occurrence of a BI-field in the bitstream as one of the possible values of the picture type. Alternatively, the presence of a BI-field can be indicated in some other way.

XIV. Combined Implementations

A detailed combined implementation for a bitstream syntax, semantics, and decoder are now described, in addition to an alternative combined implementation with minor differences from the main combined implementation.

A. Bitstream Syntax

In various combined implementations, data for interlaced B-pictures is presented in the form of a bitstream having plural layers (e.g., sequence, frame, field, macroblock, block and/or sub-block layers).

Figure 54:
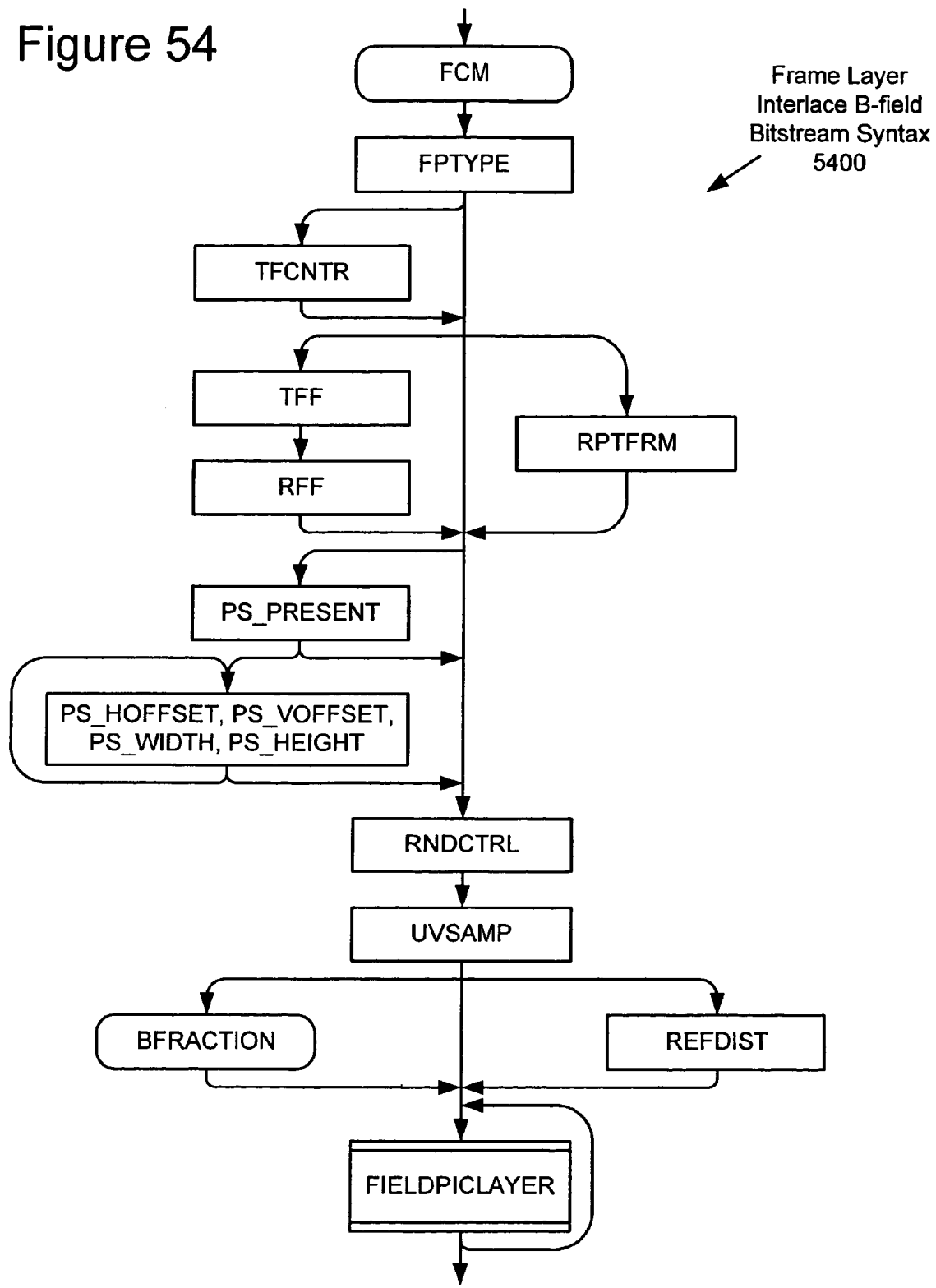
FIG. 54 is a diagram showing a frame-layer bitstream syntax for interlaced B-field or BI-fields in a combined implementation.
Figure 55:
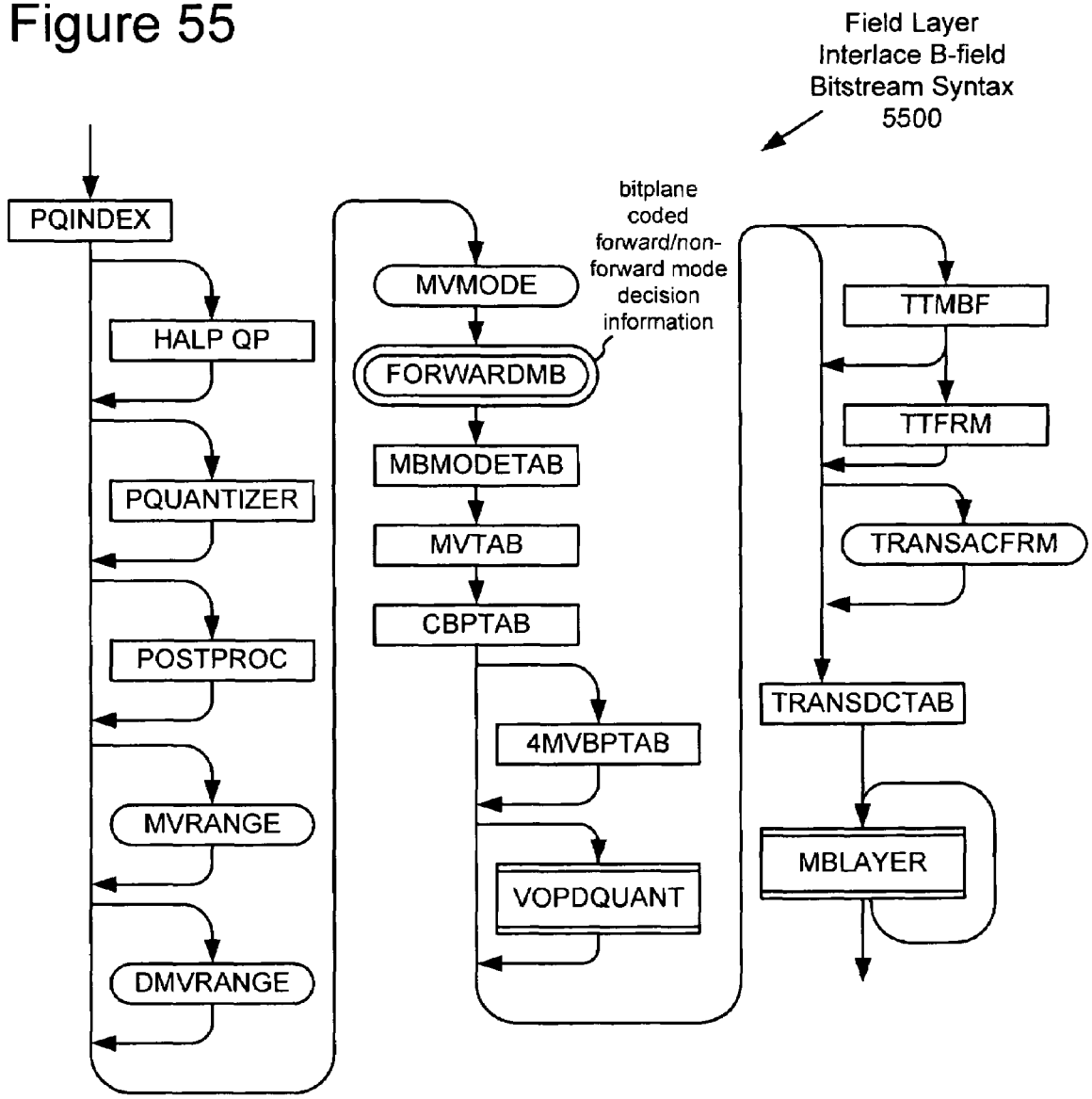
FIG. 55 is a diagram showing a field-layer bitstream syntax for interlaced B-fields in a combined implementation.
Figure 56:
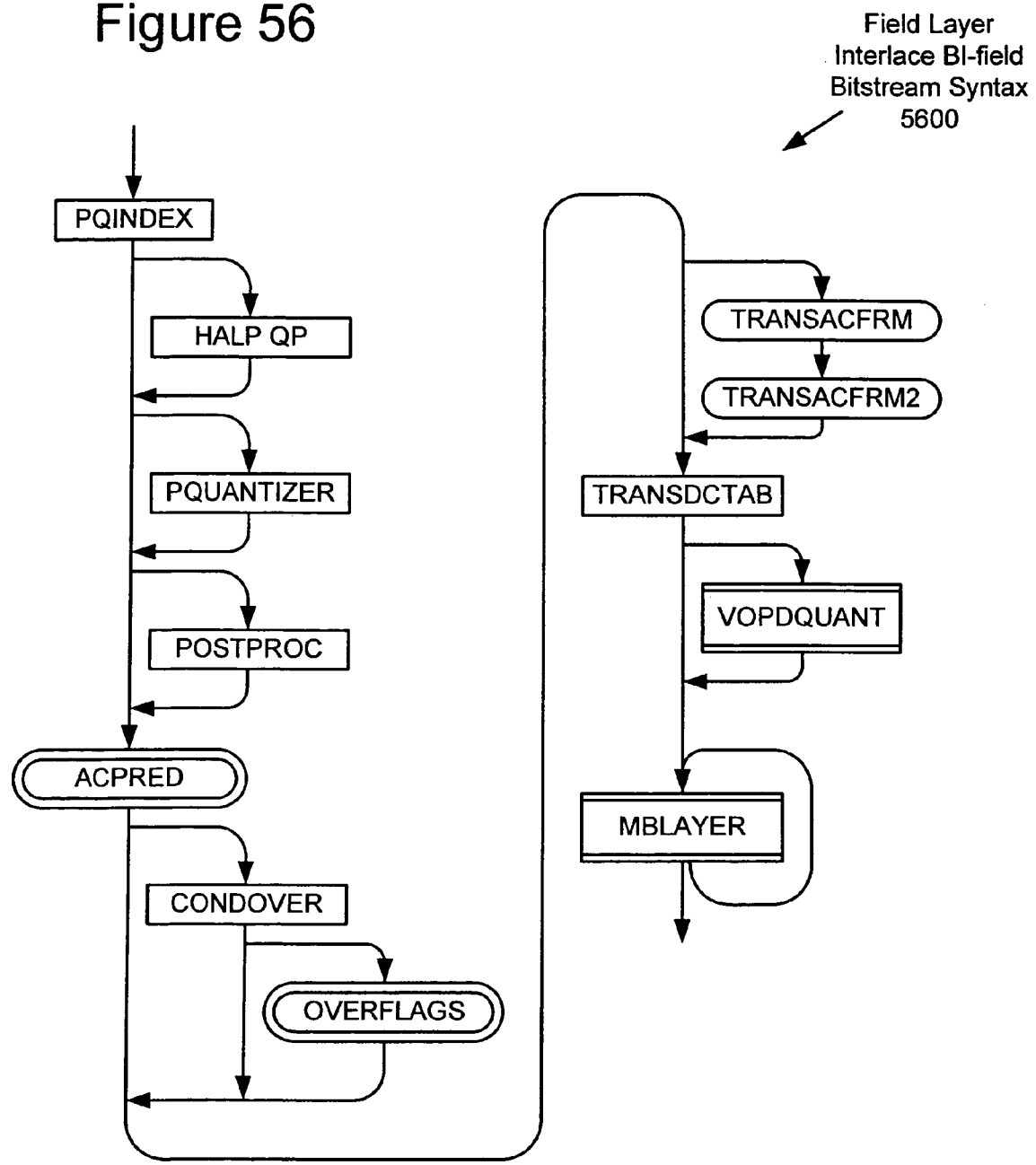
FIG. 56 is a diagram showing a field-layer bitstream syntax for interlaced BI-fields in a combined implementation.
Figure 57:
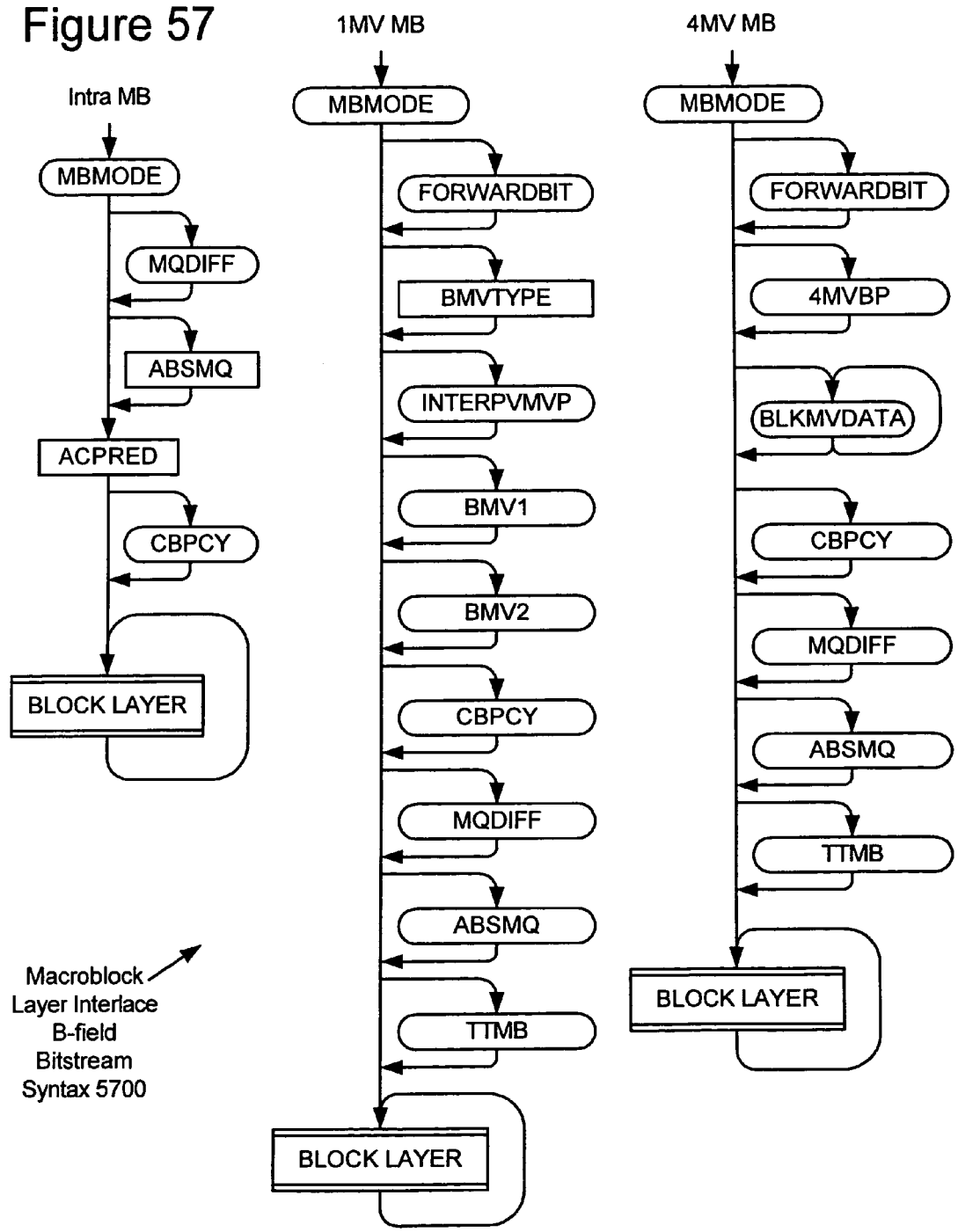
FIG. 57 is a diagram showing a macroblock-layer bitstream syntax for macroblocks of interlaced B-fields in a combined implementation.
Figure 58:
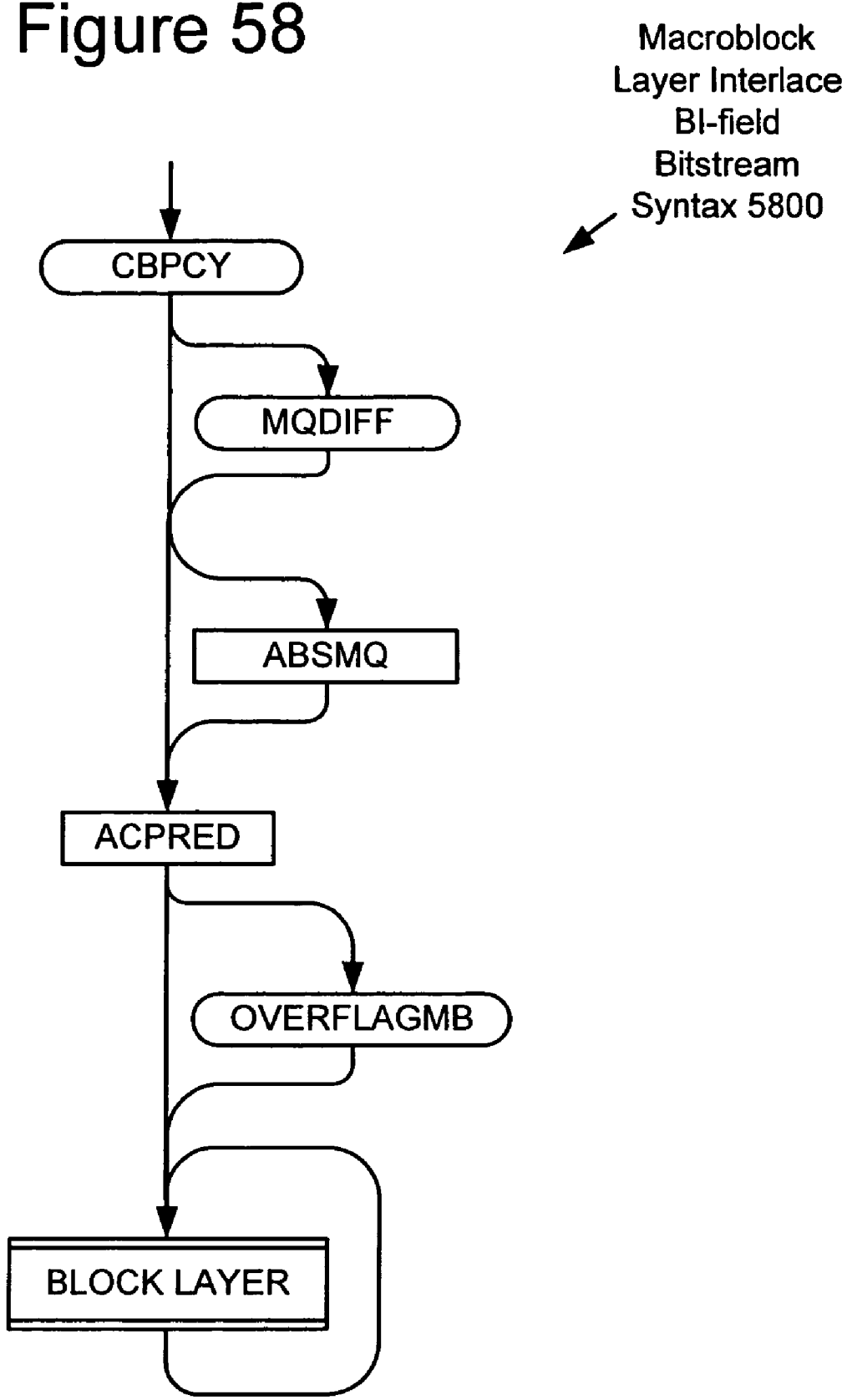
FIG. 58 is a diagram showing a macroblock-layer bitstream syntax for macroblocks of interlaced BI-fields in a combined implementation.

For interlaced video frames with interlaced B-fields and/or BI-fields, frame-level bitstream elements are shown in FIG. 54. Data for each frame consists of a frame header followed by data for the field layers (shown as the repeated "FieldPicLayer" element per field). The bitstream elements that make up the field headers for interlaced B-fields and BI-fields are shown in FIGS. 55 and 56, respectively. The bitstream elements that make up the macroblock layer for interlaced B-fields (whether for intra, 1MV, or 4MV macroblocks) and BI-fields are shown in FIGS. 57 and 58, respectively.

Figure 59:
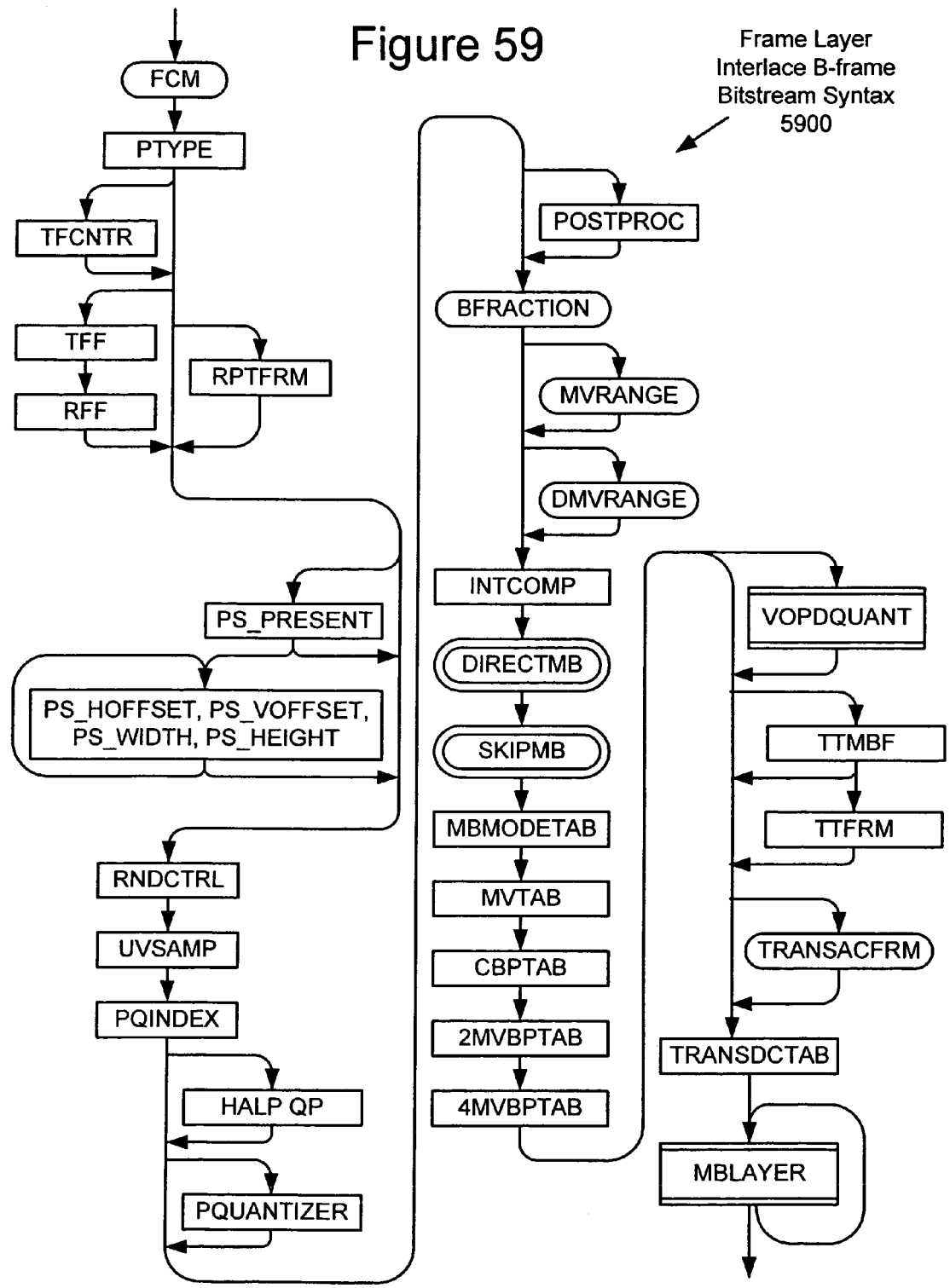
FIG. 59 is a diagram showing a frame-layer bitstream syntax for interlaced B-frames in a combined implementation.
Figure 60:
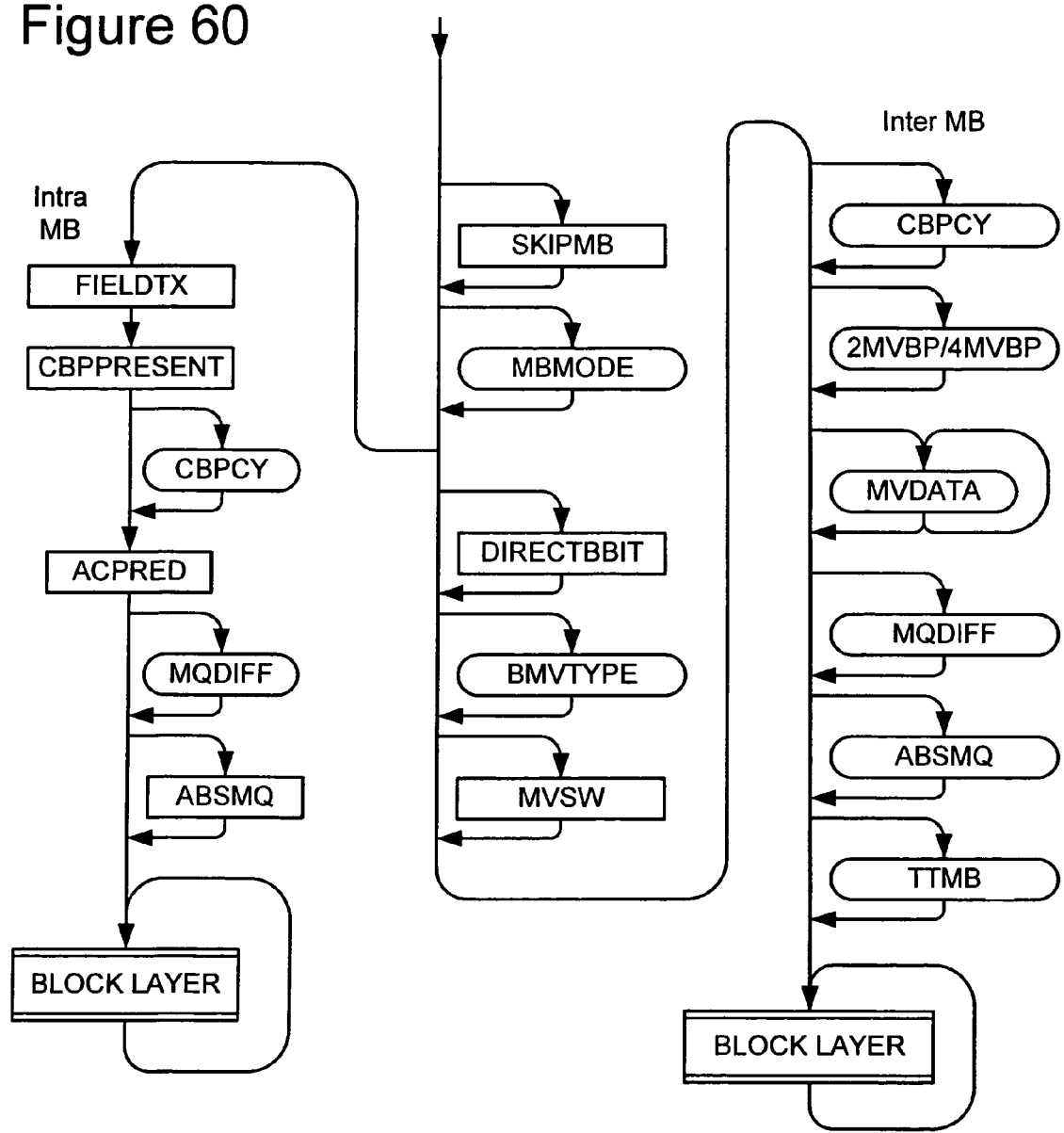
FIG. 60 is a diagram showing a macroblock-layer bitstream syntax for macroblocks of interlaced B-frames in a combined implementation.

For interlaced B-frames, frame-level bitstream elements are shown in FIG. 59. Data for each frame consists of a frame header followed by data for the macroblock layer. The bitstream elements that make up the macroblock layer for interlaced B-frames (whether for intra or various inter type macroblocks) are shown in FIG. 60.

The following sections describe selected bitstream elements in the frame, field and macroblock layers that are related to signaling relating to bi-directionally predicted interlaced pictures. Although the selected bitstream elements are described in the context of a particular layer, some bitstream elements can be used in more than one layer.

1. Selected Frame Layer Elements

FIG. 54 is a diagram showing a frame-level bitstream syntax for frames containing interlaced B-fields and/or BI-fields (or potentially other kinds of interlaced fields). FIG. 59 is a diagram showing a frame-level bitstream syntax for interlaced B-frames. Specific bitstream elements are described below.

Frame Coding Mode (FCM) (Variable Size)

FCM is a variable length codeword ["VLC"] used to indicate the picture coding type. FCM takes on values for frame coding modes as shown in Table 3 below:

TABLE 3

Frame Coding Mode VLC

| FCM value | Frame Coding Mode |
|---|---|
| 0 | Progressive |
| 10 | Frame-Interlace |
| 11 | Field-Interlace |

Field Picture Type (FPTYPE) (3 Bits)

FPTYPE is a three-bit syntax element present in the frame header for a frame including interlaced P-fields, interlaced I-fields, interlaced B-fields, and/or interlaced BI fields. FPTYPE takes on values for different combinations of field types in the interlaced video frame, according to Table 4 below.

TABLE 4

Field Picture Type FLC

| FPTYPE FLC | First Field Type | Second Field Type |
|---|---|---|
| 000 | I | I |
| 001 | I | P |
| 010 | P | I |
| 011 | P | P |
| 100 | B | B |
| 101 | B | BI |
| 110 | BI | B |
| 111 | BI | BI |

Reference Distance (REFDIST) (Variable Size)

REFDIST is a variable sized syntax element. This element indicates the number of frames between the current frame and the reference frame. Table 5 shows the VLC used to encode the REFDIST values.

TABLE 5

REFDIST VLC Table

| Reference Frame Dist. | VLC Codeword (Binary) | VLC Size |
|---|---|---|
| 0 | 00 | 2 |
| 1 | 01 | 2 |
| 2 | 10 | 2 |
| N | 11[(N − 3) 1s]0 | N |

The last row in Table 5 indicates the codewords used to represent reference frame distances greater then 2. These are coded as (binary) 11 followed by N-3 1s, where N is the reference frame distance. The last bit in the codeword is 0. For example:

N=3, VLC Codeword=110, VLC Size=3
N=4, VLC Codeword=1110, VLC Size=4
N=5, VLC Codeword=11110, VLC Size=5

Picture Type (PTYPE) (Variable Size)

PTYPE is a variable size syntax element present in the frame header for an interlaced B-frame (or other kind of interlaced frame such as interlaced I-frame or interlaced P-frame). PTYPE takes on values for different frame types according to Table 6 below.

TABLE 6

Picture Type VLC

| PTYPE VLC | Picture Type |
|---|---|
| 110 | I |
| 0 | P |
| 10 | B |
| 1110 | BI |
| 1111 | Skipped |

If PTYPE indicates that the frame is skipped then the frame is treated as a P frame which is identical to its reference frame. The reconstruction of the skipped frame is equivalent conceptually to copying the reference frame. A skipped frame means that no further data is transmitted for this frame.

B-frame Direct Mode MB Bit Syntax Element (DIRECTMB) (Variable Size)

The DIRECTMB syntax element uses bitplane coding to indicate the macroblocks in the B picture (here, an interlaced B-frame) that are coded in direct mode. The DIRECTMB syntax element may also signal that the direct mode is signaled in raw mode, in which case the direct mode is signaled at the macroblock level for the macroblocks of the interlaced B-frame.

Extended MV Range Flag (MVRANGE) (Variable Size)

MVRANGE is a variable-sized syntax element present when the sequence-layer EXTENDED_MV bit is set to 1. The MVRANGE VLC represents a motion vector range.

Extended Differential MV Range Flag (DMVRANGE) (Variable Size)

DMVRANGE is a variable sized syntax element present if the sequence level syntax element EXTENDED_DMV=1. The DMVRANGE VLC represents a motion vector differential range.

Macroblock Mode Table (MBMODETAB) (2 or 3 Bits)

The MBMODETAB syntax element is a fixed length field. For interlace P-fields, MBMODETAB is a 3 bit value that indicates which one of the eight Huffman tables is used to decode the macroblock mode syntax element (MBMODE) in the macroblock layer.

Motion Vector Table (MVTAB) (2 or 3 Bits)

The MVTAB syntax element is a 2 or 3 bit value. For interlace P-fields in which NUMREF=1, MVTAB is a 3 bit syntax element that indicates which of eight interlace Huffman tables are used to decode the motion vector data.

2MV Block Pattern Table (2MVBPTAB) (2 Bits)

The 2MVBPTAB syntax element is a 2 bit value that signals which of four Huffman tables is used to decode the 2MV block pattern (2MVBP) syntax element in 2MV field macroblocks.

4MV Block Pattern Table (4MVBPTAB) (2 Bits)

The 4MVBPTAB syntax element is a 2 bit value that signals which of four Huffman tables is used to decode the 4MV block pattern (4MVBP) syntax element in 4MV macroblocks.

In an alternative combined implementation, the picture type information is signaled at the beginning of the field level for an interlaced B-field, instead of at the frame level for the interlaced video frame including the interlaced B-field, and reference distance is omitted.

2. Selected Field Layer Elements

FIG. 55 is a diagram showing a field-level bitstream syntax for interlaced B-fields in the combined implementation. Specific bitstream elements are described below.

Motion Vector Mode (MVMODE) (Variable Size or 1 Bit)

The MVMODE syntax element signals one of four motion vector coding modes or one intensity compensation mode (fewer possibilities for some types of pictures). Several subsequent elements provide additional motion vector mode and/or intensity compensation information.

B-field Forward Mode MB Bit Syntax Element (FORWARDMB) (Variable Size)

The FORWARDMB syntax element uses bitplane coding to indicate the macroblocks in the B-field that are coded in forward mode. The FORWARDMB syntax element may also signal that the forward mode is signaled in raw mode, in which case the forward/non-forward mode decision is signaled at the macroblock level.

FIG. 56 is a diagram showing a field-level bitstream syntax for interlaced BI-fields in the combined implementation. In the combined implementation, the field-level bitstream syntax for interlaced BI-fields uses the same syntax elements as interlaced I-fields.

3. Selected Macroblock Layer Elements

FIG. 57 is a diagram showing a macroblock-level bitstream syntax for macroblocks of interlaced B-fields in the combined implementation. FIG. 60 is a diagram showing a macroblock-level bitstream syntax for macroblocks interlaced B-frames in the combined implementation. Specific bitstream elements are described below. Data for a macroblock consists of a macroblock header followed by block layer data.

Macroblock Mode (MBMODE) (Variable Size)

The MBMODE syntax element indicates the macroblock type (e.g., 1MV, 4MV or Intra for interlaced B-fields) and also the presence of the CBP flag and motion vector data.

Forward B Field Coding Mode (FORWARDBIT) (1 Bit)

FORWARDBIT is a 1-bit syntax element present in interlace B-field macroblocks if the field level syntax element FORWARDMB indicates that the raw mode is used. If FORWARDBIT=1, then the macroblock is coded using forward mode.

B Macroblock Motion Prediction Type (BMVTYPE) (Variable Size)

BMVTYPE is a variable-sized syntax element present in interlaced B-frame macroblocks and interlaced B-field macroblocks that indicates whether the macroblock uses forward, backward or interpolated prediction. As Table 7 shows, for the macroblocks of interlaced B-frames, the value of BFRACTION along with BMVTYPE determines which type is used.

TABLE 7

| | BMVTYPE VLC | |
|---|---|---|
| | Motion Prediction Type | |
| BMVTYPE | BFRACTION <=1/2 | BFRACTION >1/2 |
| 0 | Backward | Forward |
| 10 | Forward | Backward |
| 11 | Interpolated | Interpolated |

In interlaced B-fields, BMVTYPE is sent if the macroblock mode is not forward (as indicated by the FORWARDMB or FORWARDBIT syntax element) and 4MV is not being used. In this case, BMVTYPE is used to signal if the B macroblock is backward, direct or interpolated. This is a simple VLC, where backward=0, direct=10, interpolated=11. In the case where the macroblock mode is not forward and 4MV is in use, BMVTYPE is backward because only forward and backward modes are allowed with 4MV.

Interpolated MV Present (INTERPMVP) (1 Bit)

INTERPMVP is a 1-bit syntax element present in B-field macroblocks if the field-level syntax element BMVTYPE indicates that the macroblock type is interpolated. If INTERPMVP=1, then the interpolated MV is present, otherwise it is not present.

B Macroblock Motion Vector 1 (BMV1) (Variable Size)

BMV1 is a variable-sized syntax element that differentially encodes the first motion vector for the macroblock.

B Macroblock Motion Vector 2 (BMV2) (Variable Size)

BMV2 is a variable sized syntax element present in interlaced B-frame macroblocks and interlaced B-field macroblocks if the interpolated mode is used. This syntax element differentially encodes the second motion vector for the macroblock.

4MV Block Pattern (4MVBP) (4 Bits)

The 4MVBP syntax element indicates which of the 4 luminance blocks contain non-zero motion vector differentials, the use of which is described in detail below.

Block-level Motion Vector Data (BLKMVDA TA) (Variable Size)

BLKMVDATA is a variable-size syntax element that contains motion information for the block, and is present in 4MV macroblocks.

Field Transform Flag (FIELDTX) (1 Bit)

FIELDTX is a 1-bit syntax present in interlaced B-frame intra-coded macroblocks. This syntax element indicates whether a macroblock is frame or field coded (basically, the internal organization of the macroblock). FIELDTX=1 indicates that the macroblock is field-coded. Otherwise, the macroblock is frame-coded. In inter-coded macroblocks, this syntax element can be inferred from MBMODE.

Direct B Frame Coding Mode (DIRECTBBIT) (1 Bit)

DIRECTBBIT is a 1-bit syntax element present in interlaced B-frame macroblocks if the frame level syntax element DIRECTMB indicates that the raw mode is used. If DIRECTBBIT=1, then the macroblock is coded using direct mode.

B Frame MV Switch (MVSW) (1 Bit)

MVSW is a 1-bit syntax element present in interlaced B-frame macroblocks if the MB is in field mode and if the BMVTYPE is forward or backward. If MVSW=1, then the MV type and prediction type changes from forward to backward (or backward to forward) in going from the top to the bottom field.

Two Motion Vector Block Pattern (2MVBP) (Variable Size)

2MVBP is a variable sized syntax element present in interlaced B-frame macroblocks. This syntax element is present if the MBMODE syntax element indicates that the macroblock contains one motion vector, and if the macroblock is an interpolated macroblock. In this case, 2MVBP indicates which of the two motion vectors (forward and backward motion vectors) are present.

Motion Vector Data (MVDA TA) (Variable Size)

MVDATA is a variable sized syntax element that encodes differentials for the motion vector(s) for the macroblock, the decoding of which is described in detail in below.

FIG. 58 is a diagram showing a macroblock-level bitstream syntax for interlaced BI-fields in the combined implementation. In the combined implementation, the macroblock-level bitstream syntax for interlaced BI-fields uses the same syntax elements as interlaced I-fields.

B. Decoding Interlaced B-fields

The following sections describe a process for decoding interlaced B-fields in the combined implementation.

1. Frame/Field Layer Decoding

Interlaced B-fields may be one of two types: 1MV or Mixed-MV.

In 1MV interlaced B-fields, either zero, one or two motion vectors are used to indicate the displacement of the predicted blocks, depending on the prediction type (BMVTYPE) of that macroblock. When BMVTYPE is equal to DIRECT, the forward and backward motion vectors are inferred and no further motion vectors are explicitly signaled. When the BMVTYPE is INTERPOLATED, two motion vectors are decoded: forward and backward. In the forward and backward cases, only one motion vector is decoded. The 1MV mode is signaled by the MVMODE picture layer syntax elements.

In Mixed-MV interlaced B-fields, each macroblock may be encoded as a 1MV or a 4MV macroblock. In 4MV macroblocks, each of the 4 luminance blocks has a motion vector associated with it. Additionally, 4MV macroblocks may only be associated with forward or backward prediction types (BMVTYPE) in interlaced B-fields. The 1MV or 4MV mode for each macroblock is indicated by the MBMODE syntax element at every macroblock. The Mixed-MV mode is signaled by the MVMODE picture layer syntax elements.

2. Macroblock Layer Decoding

Macroblocks in interlaced B-fields may be one of three possible types: 1MV, 4MV, and Intra. Additionally, macroblocks may be one of four prediction types (BMVTYPE): forward, backward, direct or interpolated. The macroblock type is signaled by the MBMODE syntax element in the macroblock layer. The prediction type is signaled by a combination of the frame-level bitplane FORWARDMB which signals forward/non-forward for each macroblock, and the macroblock level BMVTYPE syntax element in case the prediction type is non-forward.

The following sections describe the 1MV and 4MV types and how they are signaled.

1MV Macroblocks in Interlaced B-fields

1MV macroblocks may occur in 1MV and Mixed-MV interlaced B-fields. In a 1MV macroblock, a single motion vector represents the displacement between the current and reference pictures for all six blocks in the macroblock. For a 1MV macroblock, the MBMODE syntax element in the macroblock layer indicates three things:

1) That the macroblock type is 1MV

2) Whether the CBPCY syntax element is present

3) Whether the BMV1 syntax element is present

If the MBMODE syntax element indicates that the BMV1 syntax element is present, then the BMV1 syntax element is present in the macroblock layer in the corresponding position. The BMV1 syntax element encodes the motion vector differential. The motion vector differential is combined with the motion vector predictor to reconstruct the motion vector. If the MBMODE syntax element indicates that the BMV1 syntax element is not present, then the motion vector differential is assumed to be zero and therefore the motion vector is equal to the motion vector predictor.

If the MBMODE syntax element indicates that the CBPCY syntax element is present, then the CBPCY syntax element is present in the macroblock layer in the corresponding position. CBPCY indicates which of the six blocks are coded in the block layer. If the MBMODE syntax element indicates that CBPCY is not present, then CBPCY is assumed to equal 0 and no block data is present for any of the six blocks in the macroblock.

Additionally, if the macroblock type is 1MV and the prediction type of the macroblock is interpolated, the encoder uses the INTERPMVP syntax element to signal whether or not the second motion vector differential, BMV2, is present. If it is present, the decoder decodes BMV2 immediately following BMV1. Otherwise, the motion vector differential for BMV2 is assumed to be zero, and the second motion vector is equal to the motion vector predictor.

When the prediction type is interpolated, BMV1 corresponds to the forward motion vector and BMV2 corresponds to the backward motion vector.

4MV Macroblocks in Interlaced B-fields

4MV macroblocks may only occur in Mixed-MV B-field pictures and are restricted to forward and backward prediction types. In a 4MV macroblock, each of the 4 luminance blocks has an associated motion vector. The displacement for the chroma blocks is derived from the 4 luminance motion vectors. In Mixed-MV interlaced B-fields, 4MV macroblocks may only be associated with forward and backward prediction types.

For a 4MV macroblock, the MBMODE syntax element in the macroblock layer indicates three things:
1) That the macroblock type is 4MV
2) Whether the CBPCY syntax element is present
3) Whether the 4MVBP syntax element is present The 4MVBP syntax element indicates which of the 4 luminance blocks contain non-zero motion vector differentials. The 4MVBP syntax element decodes to a value between 0 and 15. For each of the 4 bit positions in the 4MVBP, a value of 0 indicates that no motion vector differential (BLKMVDATA) is present for that block and the motion vector differential is assumed to be 0. A value of 1 indicates that a motion vector differential (BLKMVDATA) is present for that block in the corresponding position. For example, if 4MVBP decodes to a value of 1100 (binary), then the bitstream contains BLKMVDATA for blocks 0 and 1 and no BLKMVDATA is present for blocks 2 and 3.

If the MBMODE syntax element indicates that the 4MVBP syntax element is not present, then it is assumed that motion vector differential data (BLKMVDATA) is present for all 4 luminance blocks.

Depending on whether the MVMODE syntax element indicates mixed-MV or all-1MV the MBMODE signals the information as follows. Table 8 below shows how the MBMODE element signals information about a macroblock in an all-1MV picture.

TABLE 8

Macroblock Mode in All-1 MV Pictures

| Index | Macroblock Type | CBP Present | MV Present |
|---|---|---|---|
| 0 | Intra | No | NA |
| 1 | Intra | Yes | NA |
| 2 | 1 MV | No | No |
| 3 | 1 MV | No | Yes |
| 4 | 1 MV | Yes | No |
| 5 | 1 MV | Yes | Yes |

Table 9 below shows how the MBMODE element signals information about a macroblock in a mixed-MV picture.

TABLE 9

Macroblock Mode in Mixed-1 MV Pictures

| Index | Macroblock Type | CBP Present | MV Present |
|---|---|---|---|
| 0 | Intra | No | NA |
| 1 | Intra | Yes | NA |
| 2 | 1 MV | No | No |
| 3 | 1 MV | No | Yes |
| 4 | 1 MV | Yes | No |
| 5 | 1 MV | Yes | Yes |
| 6 | 4 MV | No | NA |
| 7 | 4 MV | Yes | NA |

TABLE 9-continued

Macroblock Mode in Mixed-1 MV Pictures

| Index | Macroblock Type | CBP Present | MV Present |
|---|---|---|---|

One of 8 coding tables is used to signal the MBMODE. The specific table used is signaled via the BMODETAB syntax element.

The following sections describe prediction type decoding and decoding of direct mode motion vectors.

Prediction Type Decoding (BMVTYPE) in Interlaced B-fields

The prediction type is decoded according to the following rules. If the picture level bitplane FORWARDMB indicates that a macroblock is of forward type, then the prediction type for that macroblock is set to forward. If the FORWARDMB element is coded as raw, then an encoder/decoder uses an additional bit at the macroblock level, FORWARDBIT, to decide whether the prediction type is forward or not.

If the prediction type is non-forward, and if the macroblock uses 4MV, as signaled by the MBMODE syntax element (only possible in a Mixed-MV B picture), then a decoder can directly infer that the prediction type is backward, because only forward and backward types may be associated with 4MV mode. Otherwise, the decoder explicitly decodes the BMVTYPE syntax element.

Decoding Direct Mode Motion Vectors in Interlaced B-fields

To decode direct mode motion vectors in interlaced B-fields, a decoder first buffers motion vectors from the previously decoded (i.e., temporally future) anchor (I or P) picture. Of these, the decoder uses the buffered motion vectors corresponding to the top field as predictors in order to compute the direct mode motion vectors in the top B-field, and uses those corresponding to the bottom field to compute the motion vectors of the bottom B-field. For example, macroblock (x, y) in field z (z=top/bottom) will refer to the motion vectors buffered from macroblock (x, y) of the previously decoded I or P field z (i.e., a co-located macroblock in an anchor field of the same polarity as the current field).

If the buffered motion vector from the anchor picture is intra (such as when the previously decoded field z is an I-field) or if the anchor picture is a P-field but macroblock (x, y) is intra-coded, the decoder treats the buffered motion vector as (0, 0). If the co-located macroblock is 1MV, the decoder uses that motion vector. If the co-located macroblock is 4MV, the decoder uses the logic described in the pseudo-code 5300 in FIG. 53 to calculate the motion vector predictor.

In the pseudo code 5300, SelectDirectModeMVFromColocatedMB derives the motion vector predictor to use in direct mode calculations. The decoder can either buffer all the motion vectors from the previously decoded anchor picture and then apply the above direct mode rules during decoding of B-fields, or the decoder can apply the above direct mode rules while decoding the anchor fields and buffer the resulting motion vectors for the B-fields.

With the motion vector obtained above, the decoder applies scaling logic (Scale_Direct_MV in FIG. 19). Scale_Direct_MV obtains the forward and backward pointing motion vectors. Scale_Direct_MV can result in forward and backward motion vectors that point at both top and bottom fields. This is effective because direct motion vectors are evaluated by the encoder and selected only when they give good prediction, and also because interlaced B-fields use two reference fields in both forward and backward directions.

In an alternative implementation, any other process for generating the motion vectors to scale in direct mode could be used, including processes which do not involve any buffering, which may be useful in memory constrained devices (e.g., using a random number generator to simulate a zero-biased Laplacian distribution). Such a process would still work, because a good encoder would discard bad guesses for direct mode motion vectors, leaving more accurate ones in the bitstream.

3. Motion Vector Decoding Process

The following sections describe the motion vector decoding process for blocks and macroblocks of interlaced B-fields in the combined implementation.

Populating the Forward and Backward Prediction Contexts

Forward and backward motion vectors are buffered separately and are used to predict forward and backward motion vectors, respectively. The use of separate buffers for forward and backward contexts is described, for example, at Section X above. Techniques for selection of motion vector predictors are described in the Background at Section III, the Detailed Description at Section III, and in other parts of the specification.

There are two additional details to add when filling the backward buffer (the "missing-direction" buffer) with the predicted motion vector when a forward motion vector is decoded (or to fill the forward buffer when a backward motion vector is decoded). Typically, an encoder/decoder can use both motion vector type information (e.g., 1MV, etc.) as well as the polarity of the previously decoded motion vector to form the prediction. However, in the "hole-filling" case, an encoder/decoder does not have motion vector type information or polarity information (e.g., same polarity or opposite polarity) because the encoder/decoder did not actually decode a motion vector of the missing-direction type. In this combined implementation, the encoder/decoder sets the motion vector type to 1MV and chooses the dominant field motion vector as the predictor. The pseudo-code 4700 in FIG. 47 describes the polarity selection process in this combined implementation.

For intra coded macro blocks, the "intra motion vector" is used to fill in both forward and backward motion prediction planes. Any consistent representation of "intra motion vector" can be chosen by the decoder implementation. For example, if the motion vectors are being stored in a 2-byte short array, then "intra motion vector" could be represented as a unique large constant that is filled into the motion vector array to indicate that the macroblock was coded as intra.

Forward Motion Vector Prediction in B-fields

The forward reference frame distance is computed from the BFRACTION syntax element and from the REFDIST syntax element. Forward motion vector prediction proceeds as described above in Section X.

Backward Motion Vector Prediction in B-fields

The backward reference frame distance is computed from the BFRACTION syntax element and from the REFDIST syntax element. Forward motion vector prediction proceeds as described above in Section X.

Decoding Motion Vector Differentials

The BMV1, BMV2, or BLKMVDATA syntax elements encode motion information for macroblocks or the blocks in the macroblock. 1MV macroblocks have a BMV1 and a BMV2 syntax element, and 4MV macroblocks may have between zero and four BLKMVDATA elements.

When the prediction type (BMVTYPE) is interpolated, BMV1 corresponds to the forward and BMV2 corresponds to the backward motion vector residual.

The following sections describe how to compute the motion vector differential for the two-reference case that applies to B-pictures.

Motion Vector Differentials in Two-Reference Field Pictures

Two-reference field pictures occur in the coding of interlace frames using field pictures. Each frame of the sequence is separated into two fields, and each field is coded using what is essentially the progressive code path.

In field pictures that have two reference fields (such as pictures with interlaced B-fields), each MVDATA or BLKMVDATA syntax element in the macroblock layer jointly encodes three things: 1) the horizontal motion vector differential component, 2) the vertical motion vector differential component and 3) whether the dominant or non-dominat predictor is used, i.e., which of the two fields is referenced by the motion vector.

The MVDATA or BLKMVDATA syntax element is a variable length Huffman codeword followed by a fixed length codeword. The value of the Huffman codeword determines the size of the fixed length codeword. The MVTAB syntax element in the picture layer specifies the Huffman table used to decode the variable sized codeword. The pseudo-code 6100 in FIG. 61A illustrates how the motion vector differential and dominant/non-dominant predictor information are decoded.

The values predictor_flag, dmv_x and dmv_y are computed in the pseudo-code 6100 in FIG. 61A. The values in pseudo-code 6100 are defined as follows:

dmv_x: differential horizontal motion vector component, dmv_y: differential vertical motion vector component, k_x, k_y: fixed length for long motion vectors, k_x and k_y depend on the motion vector range as defined by the MVRANGE symbol.

TABLE 10 k_x and k_y specified by MVRANGE

| MVRANGE | k_x | k_y | range_x | Range_y |
|---|---|---|---|---|
| 0 (default) | 9 | 8 | 256 | 128 |
| 10 | 10 | 9 | 512 | 256 |
| 110 | 12 | 10 | 2048 | 512 |
| 111 | 13 | 11 | 4096 | 1024 | extend_x: extended range for horizontal motion vector differential, extend_y: extended range for vertical motion vector differential, extend_x and extend_y are derived from the DMVRANGE picture field syntax element. If DMVRANGE indicates that extended range for the horizontal component is used, then extend_x=1. Otherwise extend_x=0. Similarly, if DMVRANGE indicates that extended range for the vertical component is used, then extend_y=1 otherwise extend_y=0.

The variable predictor_flag is a binary flag indicating whether the dominant or non-dominant motion vector predictor is used (0=dominant predictor used, 1=non-dominant predictor used). The offset_table array and the size_table array are defined as shown in FIG. 61A.

The pseudo-code 6110 in FIG. 61B illustrates how the motion vector differential is decoded for a two-reference field in an alternative combined implementation. Pseudo-code 6110 decodes motion vector differentials in a different way. For example, pseudo-code 6110 omits handling of extended motion vector differential ranges.

Motion Vector Predictors

Motion vectors are computed by adding the motion vector differential computed in the previous section to a motion vector predictor. The following sections describe how the motion vector predictors are calculated for macroblocks in 1MV and Mixed-MV interlaced B-fields in this combined implementation.

Motion Vector Predictors in 1MV Interlaced B-fields

FIGS. 5A and 5B are diagrams showing the locations of macroblocks considered for candidate motion vector predictors for a 1MV macroblock. The candidate predictors are taken from the left, top and top-right macroblocks, except in the case where the macroblock is the last macroblock in the row. In this case, Predictor B is taken from the top-left macroblock instead of the top-right. For the special case where the frame is one macroblock wide, the predictor is always Predictor A (the top predictor). The special cases for the current macroblock being in the top row (with no A and B predictors, or with no predictors at all) are addressed above with reference to FIGS. 33A-33F and below with reference to FIGS. 62A-62F.

Motion Vector Predictors In Mixed-MV Interlaced B-fields

FIGS. 6A-10 show the locations of the blocks or macroblocks considered for the candidate motion vectors for a motion vector for a 1MV or 4MV macroblock in Mixed-MV interlaced B-fields.

Dominant and Non-Dominant MV Predictors in Interlaced B-fields

For each inter-coded macroblock, two motion vector predictors are derived. One is from the dominant field and the other is from the non-dominant field. The dominant field is considered to be the field containing the majority of the actual-value motion vector predictor candidates in the neighborhood. In the case of a tie, the motion vector predictor for the opposite field is considered to be the dominant predictor (because it is temporally closer). Intra-coded macroblocks are not considered in the calculation of the dominant/non-dominant predictor. If all candidate predictor macroblocks are intra-coded, then the dominant and non-dominant motion vector predictors are set to zero and the dominant predictor is taken to be from the opposite field.

Calculating the Motion Vector Predictor in Interlaced B-fields

Two motion vector predictors are calculated for each motion vector of a block or macroblock—one for each reference. The pseudo-code 6200 in FIGS. 62A-62F describes how the motion vector predictors are calculated for the two-reference case in the combined implementation. (The pseudo-code 3300 in FIGS. 33A-33F describes how the motion vector predictors are calculated for the two-reference case in another implementation). In two-reference pictures the current field may reference the two most recent fields. One predictor is for the reference field of the same polarity and the other is for the reference field with the opposite polarity.

Reconstructing Motion Vectors in Interlaced B-fields

The following sections describe how to reconstruct the luminance and chroma motion vectors for 1MV and 4MV macroblocks. After a motion vector is reconstructed, it may be subsequently used as a neighborhood motion vector to predict the motion vector for a nearby macroblock. The motion vector will have an associated polarity of "same" or "opposite," and may be used to derive a motion vector predictor for the other field polarity for motion vector prediction.

Luminance Motion Vector Reconstruction in Interlaced B-fields

In all cases (1MV and 4MV macroblocks) the luminance motion vector is reconstructed by adding the differential to the predictor as follows:

mv_x=(dmv_x+predictor_x) smod range_x
mv_y=(dmv_y+predictor_y) smod range_y

The modulus operation "smod" is a signed modulus, defined as follows:

A smod b=((A+b) % (2*b))−b

This ensures that the reconstructed vectors are valid. (A smod b) lies within −b and b-1. range_x and range_y depend on MVRANGE.

Figure 63:
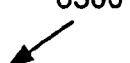
FIG. 63 is a code listing showing pseudo-code for determining a reference field for an interlaced B-field in a combined implementation.

Since the interlaced B-field picture uses two reference pictures, the predictor_flag derived after decoding the motion vector differential is combined with the value of dominant-predictor derived from motion vector prediction to determine which field is used as reference. The pseudo-code 6300 in FIG. 63 describes how the reference field is determined.

In 1MV macroblocks there will be a single motion vector for the four blocks that make up the luminance component of the macroblock. If the MBMODE syntax element indicates that no MV data is present in the macroblock layer, then dmv_x=0 and dmv_y=0 (mv_x=predictor_x and mv_y=predictor_y).

In 4MV macroblocks, each of the inter-coded luminance blocks in a macroblock will have its own motion vector. Therefore there will be between zero and four luminance motion vectors in each 4MV macroblock. If the 4MVBP syntax element indicates that no motion vector information is present for a block, then dmv_x=0 and dmv_y=0 for that block (mv_x=predictor_x and mv_y=predictor_y).

Chroma Motion Vector Reconstruction

The chroma motion vectors are derived from the luminance motion vectors. Also, for 4MV macroblocks, the decision on whether to code the chroma blocks as Inter or Intra is made based on the status of the luminance blocks or fields.

C. Decoding Interlaced P-frames

Before describing the process for decoding interlaced B-frames in the combined implementation, a process for decoding interlaced P-frames is described. The section describing the process for decoding interlaced B-frames will proceed with reference to concepts discussed in this section.

1. Macroblock Layer Decoding of Interlaced P-frames

In an interlaced P-frame, each macroblock may be motion compensated in frame mode using one or four motion vectors or in field mode using two or four motion vectors. A macroblock that is inter-coded does not contain any intra blocks. In addition, the residual after motion compensation may be coded in frame transform mode or field transform mode. More specifically, the luminance components of the residual are re-arranged according to fields if it is coded in field transform mode and it remains unchanged in frame transform mode while the chroma component remains the same. A macroblock may also be coded as intra.

Motion compensation may be restricted to not include four (both field/frame) motion vectors, and this is signaled through 4MVSWITCH. The type of motion compensation and residual coding is jointly indicated for each macroblock through MBMODE and SKIPMB. MBMODE employs a different set of tables according to 4MVSWITCH.

Macroblocks in interlaced P-frames are classified into five types: 1MV, 2 Field MV, 4 Frame MV, 4 Field MV, and Intra. The first four types of macroblock are inter-coded while the last type indicates that the macroblock is intra-coded. The macroblock type is signaled by MBMODE syntax element in the macroblock layer along with the skip bit. MBMODE jointly encode macroblock types along with various pieces of information regarding the macroblock for different types of macroblock.

Skipped Macroblock Signaling

The SKIPMB field indicates the skip condition for a macroblock. If the SKIPMB field is 1, then the current macroblock is said to be skipped and there are no other information sent after the SKIPMB field. The skip condition implies that the current macroblock is 1MV with zero differential motion vector (i.e. the macroblock is motion compensated using its 1MV motion predictor) and there are no coded blocks (CBP=0).

On the other hand, if the SKIPMB field is not 1, the MBMODE field is decoded to indicate the type of macroblock and other information regarding the current macroblock, such as information described in the following section.

Macroblock Mode Signaling

There are fifteen possible events that are indicated by MBMODE; MBMODE jointly specifies the type of macroblock (1MV, 4 Frame MV, 2 Field MV, 4 Field MV, or intra), types of transform for inter-coded macroblock (i.e. field or frame or no coded blocks), and whether there is a differential motion vector for the 1MV macroblock.

Let <MVP> denote a binary event that signals whether there is nonzero 1MV differential motion vector or not. Let <Field/Frame transform> denote a ternary event that signals whether the residual of the macroblock is frame transform coded, field transform coded, or zero coded blocks (i.e. CBP=0). MBMODE signals the following set of events jointly:

MBMODE={<1MV, MVP, Field/Frame transform>, <2 Field MV, Field/Frame transform>, <4 Frame MV, Field/Frame transform>, <4 Field MV, Field/Frame transform>, <INTRA>}; excluding the event where <1MV, MVP=0, CBP=0>, which is signaled by the skip condition.

For inter-coded macroblocks, the CBPCY syntax element is not decoded when the Field/Frame Transform event in MBMODE indicates no coded blocks. On the other hand, if the Field/Frame transform event in MBMODE indicates field or frame transform, then CBPCY is decoded. The decoded event <field/frame Transform> is used to set the flag FIELDTX. If this event indicates that the macroblock is field transform coded, FIELDTX is set to one. If the event indicates that the macroblock is frame transform coded, FIELDTX is set to zero. If the event indicates a zero-coded block, FIELDTX is set to the same type as the motion vector, i.e., FIELDTX is set to 1 if it is a FIELDMV, and set to 0 if it is a FRAME MV.

For non-1MV inter-coded macroblocks, an additional field is sent to indicate the zero differential motion vectors event. In the case of 2 Field MV macroblocks, the 2MVBP field is sent to indicate which of the two motion vectors contain nonzero differential motion vectors. Similarly, the 4MVBP field is sent to indicate which of the four motion vectors contain nonzero differential motion vectors.

For intra-coded macroblocks, the Field/Frame transform and zero coded blocks are coded in separate fields.

2. Motion Vector Decoding for Interlaced P-frames

Motion Vector Predictors for Interlaced P-frames

The process of computing the motion vector predictor(s) for the current macroblock consists of two steps. First, three candidate motion vectors for the current macroblock are gathered from its neighboring macroblocks. Second, the motion vector predictor(s) for the current macroblock is computed from the set of candidate motion vectors. FIGS. 40A-40B show neighboring macroblocks from which the candidate motion vectors are gathered. The order of the collection of candidate motion vectors is important. In this combined implementation, the order of collection always starts at A, proceeds to B, and ends at C. Note that a predictor candidate is considered to be non-existent if the corresponding block is outside the frame boundary or if the corresponding block is part of a different slice. Thus, motion vector prediction is not performed across slice boundaries.

The following sections describe how the candidate motion vectors are collected for different types of macroblocks and how the motion vector predictors are computed.

1MV Candidate Motion Vectors

In this combined implementation, the pseudo-code 6400 in FIG. 64 is used to collect the up to three candidate motion vectors for the motion vector:

4 Frame MV Candidate Motion Vectors

For 4 Frame MV macroblocks, for each of the four frame block motion vectors in the current macroblock, the candidate motion vectors from the neighboring blocks are collected. In this combined implementation, the pseudo-code 6500 in FIG. 65 is used to collect the up to three candidate motion vectors for the top left frame block motion vector. The pseudo-code 6600 in FIG. 66 is used to collect the up to three candidate motion vectors for the top right frame block motion vector. The pseudo-code 6700 in FIG. 67 is used to collect the up to three candidate motion vectors for the bottom left frame block motion vector. The pseudo-code 6800 in FIG. 68 is used to collect the up to three candidate motion vectors for the bottom right frame block motion vector.

2 Field MV Candidate Motion Vectors Derivation

For 2 Field MV macroblocks, for each of the two field motion vectors in the current macroblock, the candidate motion vectors from the neighboring blocks are collected. The pseudo-code 6900 in FIG. 69 is used to collect the up to three candidate motion vectors for the top field motion vector. The pseudo-code 7000 in FIG. 70 is used to collect the up to three candidate motion vectors for the bottom field motion vector.

4 Field MV Candidate Motion Vectors Derivation

For 4 Field MV macroblocks, for each of the four field blocks in the current macroblock, the candidate motion vectors from the neighboring blocks are collected. The pseudo-code 7100 in FIG. 71 is used to collect the up to three candidate motion vectors for the top left field block motion vector. The pseudo-code 7200 in FIG. 72 is used to collect the up to three candidate motion vectors for the top right field block motion vector. The pseudo-code 7300 in FIG. 73 is used to collect the up to three candidate motion vectors for the bottom left field block motion vector. The pseudo-code 7400 in FIG. 74 is used to collect the up to three candidate motion vectors for the bottom right field block motion vector.

Average Field Motion Vectors

Given two field motion vectors ($MVX_1$, $MVY_1$) and ($MVX_2$, $MVY_2$), the average operation used to form a candidate motion vector ($MVX_A$, $MVY_A$) is:

$$MVX_A = (MVX_1 + MVX_2 + 1) >> 1;$$

$$MVY_A = (MVY_1 + MVY_2 + 1) >> 1;$$

Computing Frame MV Predictors from Candidate Motion Vectors

This section describes how motion vector predictors are calculated for frame motion vectors given a set of candidate motion vectors. In this combined implementation, the operation is the same for computing the predictor for 1MV or for each one of the four frame block motion vectors in 4 Frame MV macroblocks.

The pseudo-code 7500 in FIG. 75 describes how the motion vector predictor ($PMV_x$, $PMV_y$) is computed for frame motion vectors. In the pseudo-code 7500, TotalValidMV denotes the total number of motion vectors in the set of candidate motion vectors (TotalValidMV=0, 1, 2, or 3), and the ValidMV array denotes the motion vector in the set of candidate motion vectors.

Computing Field MV Predictors from Candidate Motion Vectors

This section describes how motion vector predictors are computed for field motion vectors given the set of candidate motion vectors. The operation is the same for computing the predictor for each of the two field motion vectors in 2 Field MV macroblocks or for each of the four field block motion vectors in 4 Field MV macroblocks.

First, the candidate motion vectors are separated into two sets, where one set contains only candidate motion vectors that point to the same field as the current field and the other set contains candidate motion vectors that point to the opposite field. Assuming that the candidate motion vectors are represented in quarter pixel units, the encoder or decoder can check whether a candidate motion vector points to the same field by the following check on its y-component:

```
if (ValidMV_y & 4) {
    ValidMV points to the opposite field.
} else {
    ValidMV points to the same field.
}
```

The pseudo-code 7600 in FIG. 76 describes how the motion vector predictor ($PMV_x$, $PMV_y$) is computed for field motion vectors. In the pseudo-code 7600, SameFieldMV and OppFieldMV denote the two sets of candidate motion vectors and NumSameFieldMV and NumOppFieldMV denote the number of candidate motion vectors that belong to each set. The order of candidate motion vectors in each set starts with candidate A if it exists, followed by candidate B if it exists, and then candidate C if it exists. For example, if the set of SameFieldMV candidate motion vectors contains only candidate B and candidate C, then SameFieldMV[0] is candidate B.

Decoding Motion Vector Differentials

The MVDATA syntax elements contain motion vector differential information for the macroblock. Depending on the type of motion compensation and motion vector block pattern signaled at each macroblock, there may be up to four MVDATA syntax elements per macroblock. More specifically, For 1MV macroblocks, there may be either 0 or 1 MVDATA syntax element present depending on the MVP field in MBMODE.

For 2 Field MV macroblocks, there may be either 0, 1, or 2 MVDATA syntax element(s) present depending on 2MVBP.

For 4 Frame/Field MV macroblocks, there may be either 0, 1, 2, 3, or 4 MVDATA syntax element(s) present depending on 4MVBP.

In this combined implementation, the motion vector differential is decoded in the same way as a one reference field motion vector differential for interlaced P-fields. (The pseudo-code 7700 in FIG. 77A illustrates how the motion vector differential is decoded for a one-reference field. The pseudo-code 7710 in FIG. 77B illustrates how the motion vector differential is decoded for a one-reference field in an alternative combined implementation. Pseudo-code 7710 decodes motion vector differentials in a different way. For example, pseudo-code 7710 omits handling of extended motion vector differential ranges.)

Reconstructing Motion Vectors

Given the motion vector differential dmv, the luminance motion vector is reconstructed by adding the differential to the predictor as described in Section XV.B.3 above. Given a luma frame or field motion vector, a corresponding chroma frame or field motion vector is derived to compensate a portion of or the entire Cb/Cr block. The pseudo-code 7800 in FIG. 78 describes how a chroma motion vector CMV is derived from a luma motion vector LMV in interlace P-frames.

D. Decoding Interlaced B-frames

This section describes the process for decoding interlaced B-frames in the combined implementation, with reference to concepts discussed in the previous section.

1. Macroblock Layer Decoding of Interlaced B-frames

At the macroblock level, the interlaced B-frame syntax is similar to the interlace P-frame syntax described above. Macroblocks in interlaced B-frames are classified into 3 types. 1MV, 2 Field MV, and Intra. 4 Frame MV and 4 Field MV modes are not allowed for interlaced B-frames in this combined implementation. The three modes are joint coded with the MBMODE syntax element, as in interlaced P-frames. Each macroblock is also predicted as forward, backward, direct or interpolated (using DIRECTMB and BMVTYPE syntax elements). If a 1MV macroblock is either forward or backward, it uses a single motion vector. If it is 1MV but direct or interpolated, it uses two motion vectors. If it is of type 2 Field MV and either forward or backward predicted, then it uses two motion vectors. If it is of type 2 Field MV and direct or interpolated, then it uses four motion vectors.

The following sections describe characteristics of different inter-coded macroblock types in interlaced B-frames.

1MV Macroblocks in Interlaced B-frames

In a 1MV macroblock in an interlaced B-frame, the displacement of the luminance blocks is represented by a single motion vector when the prediction type is forward or backward, and by two motion vectors when the type is direct or interpolated. Corresponding chroma motion vectors are derived in each case. In the case of interpolated and direct prediction, the motion compensated pixels from forward and backward reference pictures are averaged to form the final prediction.

2 Field MV Macroblocks in Interlaced B-frames

In 2 Field MV macroblocks in interlaced B-frames, the displacement of each field of the luminance blocks is described by a different motion vector, as shown in FIG. 37. Additionally, the prediction type is allowed to switch from forward to backward or vice-versa in going from the top to the bottom field, thus allowing the top field to be motion compensated from one reference picture and the bottom field to be motion compensated from the other reference picture, as discussed in Section VII, above.

Interpretation of 2MVBP, 4MVBP and Order of Motion Vectors in Interlaced B-frames In a 1MV macroblock, an encoder uses the 2MVBP syntax element in interpolated mode to indicate which of the two motion vectors are present. Bit 1 corresponds to the forward motion vector and bit 0 corresponds to the backward motion vector.

In a 2 Field MV macroblock, an encoder uses the 2MVBP syntax element in forward and backward mode to indicate which of the two field's motion vectors are present. Bit 1 corresponds to the top field motion vector and bit 0 corresponds to the bottom field motion vector. The encoder uses the same top/bottom signaling when the MVSW syntax element is used to switch from forward prediction for the top field to backward prediction for the bottom field, or vice-versa. The encoder uses the 4MVBP syntax element in interpolated mode to indicate which of the four motion vectors are present. Bit 3 corresponds to the top field forward motion vector, bit 2 corresponds to the top field backward motion vector, bit 1 corresponds to the bottom field forward motion vector, and bit 0 corresponds to the bottom field backward motion vector.

The bits of 2MVBP and 4MVBP set to '1' signify that the corresponding motion vector differential is present, while the bits set to '0' signify that the corresponding motion vector is equal to the predicted motion vector, i.e. there is no corresponding motion vector differential present. The actual decoded motion vectors are sent in the same order as the bits in 2MVBP or 4MVBP. For example, in a 2 field MV macroblock using interpolated mode, the first motion vector to be received by the decoder is the top field forward motion vector, and the last (i.e., fourth) motion vector to be received is the bottom field backward motion vector.

Skipped Macroblock Signaling

Skipped macroblocks are signaled the same way as with P frames. However, skipped macroblocks in interlaced B-frames are restricted to 1MV frame type, i.e. field types are not allowed. The motion vector is coded with a zero differential motion vector (i.e. the macroblock is motion compensated using its 1MV motion predictor) and there are no coded blocks (CBP=0). If a macroblock is skipped, the encoder sends only the BMVTYPE information for that macroblock, so that the motion vectors may be correctly predicted as forward, backward, direct or interpolated.

Macroblock Mode Signaling

Macroblock mode signaling is performed in the same way as interlaced P-frames, as described in Section XV.C. above.

Prediction Type Decoding (BMVTYPE and MVSW)

The prediction type is decoded for interlaced B-frames according to the following rules. If the picture level bitplane DIRECTMB indicates that a macroblock is of direct type, then the prediction type for that macroblock is set to direct. If the direct/not-direct decision is coded in raw mode, the encoder uses an additional bit at the macroblock level, DIRECTBBIT, to indicate whether the prediction type is direct or not.

If the prediction type is non-direct, then the decoder decodes the BMVTYPE syntax element. If the macroblock mode is "2MV field coded" and if the BMVTYPE is either forward or backward, the decoder also decodes the MVSW bit to decide whether or not the prediction type will change (i.e., flip from forward to backward, or vice-versa) in going from the top to the bottom field for that macroblock.

Decoding Direct Mode Motion Vectors

To decode direct mode motion vectors, a decoder first buffers motion vectors from the previously decoded anchor frame. Specifically, for a previously decoded future P-frame, the decoder buffers half of the maximum possible number of decoded luma motion vectors from the future P-frame (i.e., (2*NumberOfMBs) motion vectors). The method of selecting these motion vectors to buffer from the anchor frame is described in Section XIII above.

With the motion vectors obtained above, the decoder applies the scaling logic in Scale_Direct_MV, as shown in the pseudo-code 1900 in FIG. 19, to obtain forward and backward-pointing motion vectors, without motion vector pullback.

In this combined implementation, there is no calculation of direct mode motion vectors for macroblocks that are not using direct mode prediction, such as forward and backward-predicted macroblocks. Instead, motion vectors for non-direct macroblocks are predicted based on the forward or backward motion vector buffers.

2. Motion Vector Decoding for Interlaced B-frames

Motion Vector Predictors for Interlaced B-frames

As with interlaced P-frames, the process of computing the motion vector predictors for a current macroblock in an interlaced B-frame includes gathering candidate motion vectors for the current macroblock from its neighboring macroblocks, and computing the motion vector predictors for the current macroblock from the set of candidate motion vectors. FIGS. 40A-40B show neighboring macroblocks from which the candidate motion vectors are gathered. In this combined implementation, motion vector predictors for interlaced B-frames are selected from a set of candidates according the rules described in Section XV.C. above for interlace P-frames.

Separate prediction contexts are used for forward and backward mode motion vectors. The decoder uses the forward prediction context to predict forward motion vectors and the backward prediction context to predict backward motion vectors.

Populating the Forward and Backward Prediction Contexts in Interlaced B-frames

The decoder buffers the forward and backward motion vectors separately and uses them to predict forward and backward motion vectors, respectively. For interpolated macroblocks, the decoder uses the forward prediction buffer to predict the forward motion vector (the first decoded MVDATA element) and the backward buffer to predict the backward motion vector (the second decoded MVDATA element). When the macroblock is direct or interpolated, the decoder buffers the forward MV component in the forward buffer and the backward MV component in the backward buffer. The actual prediction logic in each case (e.g., for 1MV macroblocks, 2 Field MV macroblocks, etc.) for selecting a motion vector predictor from among a set of candidates is described above in Section XV.C.

The scheme for populating the forward and backward motion vector buffers and predicting motion vectors from the motion vectors in these buffers is described above in Section X.C.

Decoding Motion Vector Differentials in Interlaced B-frames

Motion vector differentials in interlaced B-frames are decoded according to the pseudo-code 7700 and 7710 in FIGS. 77A and 77B as discussed above in Section XV.C.2.

Reconstructing Motion Vectors in Interlaced B-frames

Figure 78:
FIG. 78 is a code listing showing pseudo-code for deriving a chroma motion vector in an interlaced P-frame in a combined implementation.

Motion vectors are reconstructed in interlaced B-frames are decoded according to the pseudo-code 7800 in FIG. 78 and discussed above in Sections XV.B.3 and XV.C.2.

E. Bitplane Coding

Macroblock-specific binary information such as (1) forward/not forward decisions for the macroblocks of interlaced B-fields (i.e., the FORWARDMB flag), and (2) direct/not direct decisions for the macroblocks of interlaced B-frames (i.e., the DIRECTMB flag), may be encoded in one binary symbol per macroblock. For example, whether or not a macroblock of an interlaced B-field is motion compensated in forward mode (versus another mode such as backward, direct, or interpolated) may be signaled with one bit. In these cases, the status for all macroblocks in a field or frame may be coded as a bitplane and transmitted in the field or frame header. One exception for this rule is if the bitplane coding mode is set to Raw Mode, in which case the status for each macroblock is coded as one bit per symbol and transmitted along with other macroblock level syntax elements at the macroblock level.

Field/frame-level bitplane coding is used to encode two-dimensional binary arrays. The size of each array is rowMB× colMB, where rowMB and colMB are the number of macroblock rows and columns, respectively, in the field or frame in question. Within the bitstream, each array is coded as a set of consecutive bits. One of seven modes is used to encode each array. The seven modes are:

1. raw mode—information coded as one bit per symbol and transmitted as part of MB level syntax;
2. normal-2 mode—two symbols coded jointly;
3. differential-2 mode—differential coding of the bitplane, followed by coding two residual symbols jointly;
4. normal-6 mode—six symbols coded jointly;
5. differential-6 mode—differential coding of the bitplane, followed by coding six residual symbols jointly;
6. rowskip mode—one bit skip to signal rows with no set bits; and
7. columnskip mode—one bit skip to signal columns with no set bits.

The syntax elements for a bitplane at the field or frame level are in the following sequence: INVERT, IMODE, and DATABITS.

Invert Flag (INVERT)

The INVERT syntax element is a 1-bit value, which if set indicates that the bitplane has more set bits than zero bits. Depending on INVERT and the mode, the decoder shall invert the interpreted bitplane to recreate the original. Note that the value of this bit shall be ignored when the raw mode is used. Description of how the INVERT value is used in decoding the bitplane is provided below.

Coding Mode (IMODE)

The IMODE syntax element is a variable length value that indicates the coding mode used to encode the bitplane. Table 11 shows the code table used to encode the IMODE syntax element. Description of how the IMODE value is used in decoding the bitplane is provided below.

TABLE 11

IMODE VLC Codetable

| IMODE VLC | Coding mode |
| --- | --- |
| 10 | Norm-2 |
| 11 | Norm-6 |
| 010 | Rowskip |
| 011 | Colskip |
| 001 | Diff-2 |
| 0001 | Diff-6 |
| 0000 | Raw |

Bitplane Coding Bits (DATABITS)

The DATABITS syntax element is variable sized syntax element that encodes the stream of symbols for the bitplane. The method used to encode the bitplane is determined by the value of IMODE. The seven coding modes are described in the following sections.

Raw Mode

In this mode, the bitplane is encoded as one bit per symbol scanned in the raster-scan order of macroblocks, and sent as part of the macroblock layer. Alternatively, the information is coded in raw mode at the field or frame level and DATABITS is rowMB×colMB bits in length.

Normal-2 Mode

If rowMB×colMB is odd, the first symbol is encoded raw. Subsequent symbols are encoded pairwise, in natural scan order. The binary VLC table in Table 12 is used to encode symbol pairs.

TABLE 12

Norm-2/Diff-2 Code Table

| Symbol 2n | Symbol 2n + 1 | Codeword |
| --- | --- | --- |
| 0 | 0 | 0 |
| 1 | 0 | 100 |
| 0 | 1 | 101 |
| 1 | 1 | 11 |

Diff-2 Mode

The Normal-2 method is used to produce the bitplane as described above, and then the $Diff^{-1}$ operation is applied to the bitplane as described below.

Normal-6 Mode

Figure 79A:
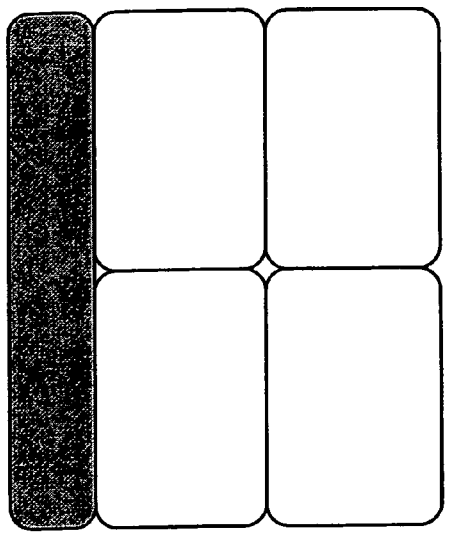
FIGS. 79A-79C are diagrams showing tiles for Norm-6 and Diff-6 bitplane coding modes for forward/not-forward prediction mode decision information for macroblocks of an interlaced B-field.
Figure 79B:
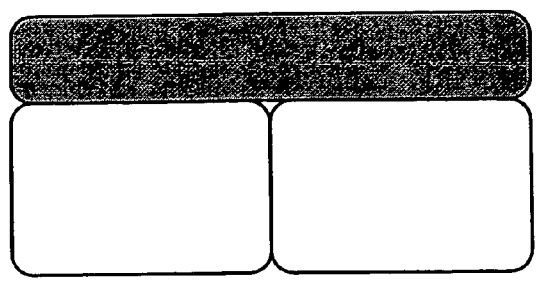
Figure 79C:
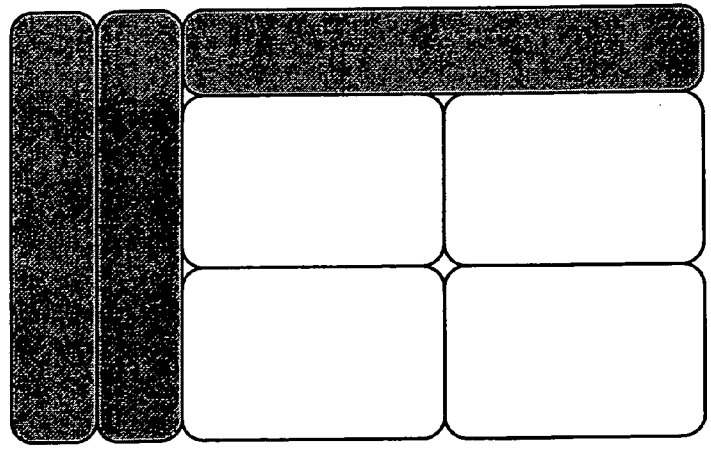

In the Norm-6 and Diff-6 modes, the bitplane is encoded in groups of six pixels. These pixels are grouped into either 2×3 or 3×2 tiles. The bitplane is tiled maximally using a set of rules, and the remaining pixels are encoded using a variant of row-skip and column-skip modes. 2×3 "vertical" tiles are used if and only if rowMB is a multiple of 3 and colMB is not. Otherwise, 3×2 "horizontal" tiles are used. FIG. 79A shows a simplified example of 2×3 "vertical" tiles. FIGS. 79B and 79C show simplified examples of 3×2 "horizontal" tiles for which the elongated dark rectangles are 1 pixel wide and encoded using row-skip and column-skip coding. For a plane tiled as shown in FIG. 79C, with linear tiles along the top and left edges of the picture, the coding order of the tiles follows the following pattern. The 6-element tiles are encoded first, followed by the column-skip and row-skip encoded linear tiles. If the array size is a multiple of 2×3 or of 3×2, the latter linear tiles do not exist and the bitplane is perfectly tiled.

The 6-element rectangular tiles are encoded using an incomplete Huffman code, i.e., a Huffman code which does not use all end nodes for encoding. Let N be the number of set bits in the tile, i.e. $0 \leq N \leq 6$. For N<3, a VLC is used to encode the tile. For N=3, a fixed length escape is followed by a 5 bit fixed length code, and for N>3, a fixed length escape is followed by the code of the complement of the tile. The rectangular tile contains 6 bits of information. Let k be the code associated with the tile, where $k=b_i 2^i$, $b_i$ is the binary value of the $i^{th}$ th bit in natural scan order within the tile. Hence $0 \leq k < 64$. A combination of VLCs and escape codes please fixed length codes is used to signal k.

Diff-6 Mode

The Normal-6 method is used to produce the bitplane as described above, and then the $\text{Dif}^{-1}$ operation is applied to the bitplane as described below.

Rowskip Mode

In the rowskip coding mode, all-zero rows are skipped with one bit overhead. The syntax is as follows: for each row, a single ROWSKIP bit indicates if the row is skipped; if the row is skipped, the ROWSKIP bit for the next row is next; otherwise (the row is not skipped), ROWBITS bits (a bit for each macroblock in the row) are next. Thus, if the entire row is zero, a zero bit is sent as the ROWSKIP symbol, and ROWBITS is skipped. If there is a set bit in the row, ROWSKIP is set to 1, and the entire row is sent raw (ROWBITS). Rows are scanned from the top to the bottom of the field or frame.

Columnskip Mode

Columnskip is the transpose of rowskip. Columns are scanned from the left to the right of the field or frame.

Diff$^1$:: Inverse Differential Decoding

If either differential mode (Diff-2 or Diff-6) is used, a bitplane of "differential bits" is first decoded using the corresponding normal modes (Norm-2 or Norm-6 respectively). The differential bits are used to regenerate the original bitplane. The regeneration process is a 2-D DPCM on a binary alphabet. In order to regenerate the bit at location (i, j), the predictor $b_p(i,j)$ is generated as follows (from bits b(i, j) at positions (i, j)):

$$b_p(i,j) = \begin{cases} A & i-j=0, \text{ or } b(i,j-1) \neq b(i-1,j) \\ b(0,j-1) & i == 0 \\ b(i-1,j) & \text{otherwise} \end{cases}$$

For the differential coding mode, the bitwise inversion process based on INVERT is not performed. However, the INVERT flag is used in a different capacity to indicate the value of the symbol A for the derivation of the predictor shown above. More specifically, A equal to 0 if INVERT equals to 0 and A equals to 1 if INVERT equals to 1. The actual value of the bitplane is obtained by xor'ing the predictor with the decoded differential bit value. In the above equation, b(i,j) is the bit at the i,jth position after final decoding (i.e. after doing Norm-2/Norm-6, followed by differential xor with its predictor).

Having described and illustrated the principles of my invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of my invention may be applied, I claim as my invention all such embodiments as may come within the scope and spirit of the following claims and equivalents thereto.

I claim:

1. A method of decoding compressed video information with a video decoder, the method comprising:
   receiving, at the video decoder, compressed video information in a bitstream; and
   with the video decoder, decoding a bi-directionally predicted picture that includes plural macroblocks using the compressed video information, wherein the decoding includes decoding a set of bits that represents binary decision information signifying whether the plural macroblocks in the bi-directionally predicted picture are motion compensated using forward mode prediction or one of plural types of non-forward mode prediction, wherein, for each of the plural macroblocks of the bi-directionally predicted picture, a single bit within the set of bits is associated with the macroblock as part of the binary decision information of the set of bits, the single bit indicating whether motion-compensated prediction type for the macroblock is (a) the forward mode prediction or (b) one of the plural types of non-forward mode prediction, wherein the set of bits is signaled as one or more picture-level syntax elements, wherein a combination of picture-level and macroblock-level syntax elements indicates the motion-compensated prediction types for the plural macroblocks of the bi-directionally predicted picture, and wherein:
   for a first macroblock of the plural macroblocks of the bi-directionally predicted picture, the motion-compensated prediction type is forward mode prediction, and the single bit for the macroblock indicates the motion-compensated prediction type for the macroblock; and
   for a second macroblock of the plural macroblocks of the bi-directionally predicted picture, the single bit for the macroblock and a macroblock-level variable length code for the macroblock together indicate the motion-compensated prediction type for the macroblock.

2. The method of claim 1 wherein the bi-directionally predicted picture is an interlaced B-field.

3. The method of claim 1 wherein the decoding the bi-directionally predicted picture with the video decoder further comprises selecting a coding mode from among plural available coding modes for processing the set of bits.

4. The method of claim 1 wherein the set of bits is signaled in a field header.

5. The method of claim 1 wherein the decoding the bi-directionally predicted picture with the video decoder further comprises, for at least one of the plural macroblocks of the bi-directionally predicted picture:
   determining that the binary decision information indicates motion compensation using one of the plural types of non-forward mode prediction for the macroblock; and
   decoding the macroblock-level variable length code for the macroblock from a variable length code table, wherein the macroblock-level variable length code represents one of the plural types of non-forward mode prediction for the macroblock.

6. The method of claim 5 wherein the variable length code table reflects a code length preference for backward mode.

7. A method of encoding video information with a video encoder, the method comprising:
   with the video encoder, selecting a coding mode from a group of plural available coding modes;
   with the video encoder, encoding a set of bits for an interlaced B-field according to the selected coding mode, wherein the set of bits represents binary decision information signifying whether plural macroblocks in the interlaced B-field are motion compensated using forward mode prediction or one of plural types of non-forward mode prediction, wherein, for each of the plural macroblocks in the interlaced B-field, a single bit within the set of bits is associated with the macroblock as part of the binary decision information of the set of bits, the single bit indicating whether motion-compensated prediction type for the macroblock is (a) the forward mode prediction or (b) one of the plural types of non-forward mode prediction, wherein the set of bits is signaled as one or more field-level syntax elements, and wherein a combination of field-level and macroblock-level syntax elements indicates the motion-compensated prediction types for the plural macroblocks of the interlaced B-field:
   for a first macroblock of the plural macroblocks of the interlaced B-field, the motion-compensated prediction type is forward mode prediction, and the single bit for the macroblock indicates the motion-compensated prediction type for the macroblock; and
   for a second macroblock of the plural macroblocks of the interlaced B-field, the single bit for the macroblock and a macroblock-level variable length code for the macroblock together indicate the motion-compensated prediction type for the macroblock; and
   with the video encoder, signaling the encoded set of bits in a bitstream.

8. The method of claim 7 wherein at least two of the plural available coding modes involve reduction of bitrate associated with the binary decision information.

9. The method of claim 7 wherein the plural available coding modes include a row-prediction coding mode, a column-prediction coding mode, one or more vector variable length coding modes, and one or more differential coding modes.

10. The method of claim 7 further comprising, for at least one of the plural macroblocks of the interlaced B-field:
    with the video encoder, determining that the binary decision information indicates motion compensation using one of the plural types of non-forward mode prediction the macroblock; and
    signaling, at macroblock level for the macroblock, the macroblock-level variable length code for the macroblock from a variable length code table, wherein the macroblock-level variable length code represents one of the plural types of non-forward mode prediction for the macroblock.

11. The method of claim 10 wherein the variable length code table reflects a code length preference for backward mode.

12. A method of decoding compressed video information with a video decoder, the method comprising:
    receiving, at the video decoder, compressed video information in a bitstream; and
    with the video decoder, decoding a bi-directionally predicted picture that includes plural macroblocks using the compressed video information, including:
       with the video decoder, selecting a coding mode from among plural available coding modes, wherein the plural available coding modes include a raw mode;
       if the selected coding mode is the raw mode, for each of the plural macroblocks of the bi-directionally predicted picture, with the video decoder, decoding at macroblock level binary decision information signifying whether motion-compensated prediction type for the macroblock is (a) forward mode prediction or (b) one of plural types of non-forward mode prediction,
       otherwise, with the video decoder, decoding at picture level the binary decision information as a set of bits according to the selected coding mode, wherein, for each of the plural macroblocks of the bi-directionally predicted picture, a single bit within the set of bits is associated with the macroblock as part of the binary decision information of the set of bits, the single bit indicating whether the motion-compensated prediction type for the macroblock is (a) the forward mode prediction or (b) one of the plural types of non-forward mode prediction, wherein the set of bits is signaled as one or more picture-level syntax elements, wherein a combination of picture-level and macroblock-level syntax elements indicates the motion-compensated prediction types for the plural macroblocks of the bi-directionally predicted picture, and wherein:
          for a first macroblock of the plural macroblocks of the bi-directionally predicted picture, the motion-compensated prediction type is forward mode prediction, and the single bit for the macroblock indicates the motion-compensated prediction type for the macroblock; and
          for a second macroblock of the plural macroblocks of the bi-directionally predicted picture, the single bit for the macroblock and a macroblock-level variable length code for the macroblock together indicate the motion-compensated prediction type for the macroblock.

13. The method of claim 12 wherein the bi-directionally predicted picture is an interlaced B-field.

14. The method of claim 12 wherein the set of bits is signaled in a field header.

15. The method of claim 12 wherein the decoding the bi-directionally predicted picture with the video decoder further comprises, for at least one of the plural macroblocks of the bi-directionally predicted picture:
    with the video decoder, determining that the binary decision information indicates motion compensation using one of the plural types of non-forward mode prediction for the macroblock; and
    with the video decoder, decoding the macroblock-level variable length code for the macroblock from a variable length code table, wherein the macroblock-level variable length code represents one of the plural types of non-forward mode prediction for the macroblock.

16. The method of claim 15 wherein the variable length code table reflects a code length preference for backward mode.

17. The method of claim 1 wherein the plural types of non-forward mode prediction include backward mode, direct mode, and interpolated mode.

18. The method of claim 5 wherein the variable length code table includes a first code for backward mode, a second code for direct mode, and a third code for interpolated mode.

19. The method of claim 10 wherein the variable length code table includes a first code for backward mode, a second code for direct mode, and a third code for interpolated mode.

* * * * *

UNITED STATES PATENT AND TRADEMARK OFFICE
CERTIFICATE OF CORRECTION

PATENT NO. : 7,590,179 B2 Page 1 of 1
APPLICATION NO. : 10/942458
DATED : September 15, 2009
INVENTOR(S) : Kunal Mukerjee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1030 days.

Signed and Sealed this

Twenty-first Day of September, 2010

David J. Kappos
*Director of the United States Patent and Trademark Office*